(12) United States Patent
Nishihara et al.

(10) Patent No.: US 9,024,572 B2
(45) Date of Patent: May 5, 2015

(54) BATTERY MODULE, BATTERY SYSTEM AND ELECTRIC VEHICLE

(75) Inventors: Yoshitomo Nishihara, Osaka (JP); Keiji Kishimoto, Hirakata (JP); Kazumi Ohkura, Nara (JP); Kenji Taguchi, Hirakata (JP)

(73) Assignee: SANYO Electric Co., Ltd., Moriguchi-Shi (JP)

( * ) Notice: Subject to any disclaimer, the term of this patent is extended or adjusted under 35 U.S.C. 154(b) by 797 days.

(21) Appl. No.: 13/262,600

(22) PCT Filed: Mar. 26, 2010

(86) PCT No.: PCT/JP2010/002229
§ 371 (c)(1),
(2), (4) Date: Sep. 30, 2011

(87) PCT Pub. No.: WO2010/113455
PCT Pub. Date: Oct. 7, 2010

(65) Prior Publication Data
US 2012/0019061 A1    Jan. 26, 2012

(30) Foreign Application Priority Data

Mar. 31, 2009  (JP) ................................. 2009-086372
Aug. 31, 2009  (JP) ................................. 2009-200981

(51) Int. Cl.
*H02J 7/00*   (2006.01)
*H01M 10/48*  (2006.01)
*H01M 2/10*   (2006.01)
(Continued)

(52) U.S. Cl.
CPC .......... *H01M 10/482* (2013.01); *H01M 2/1077* (2013.01); *H01M 2/206* (2013.01); *H01M 10/0525* (2013.01); *H01M 10/441* (2013.01); *Y02T 10/7011* (2013.01)

(58) Field of Classification Search
USPC ........................... 320/107, 112, 116; 324/433
See application file for complete search history.

(56) References Cited

U.S. PATENT DOCUMENTS

2004/0009334 A1   1/2004  Miyamoto et al.
2004/0257038 A1  12/2004  Johnson et al.
(Continued)

FOREIGN PATENT DOCUMENTS

EP   2 136 219 A2   12/2009
JP   07050157       2/1995
(Continued)

OTHER PUBLICATIONS

Extended European Search Report dated Apr. 16, 2014 in the counterpart European patent application 10758235.5.
(Continued)

*Primary Examiner* — Richard Isla Rodas
*Assistant Examiner* — Nathaniel Pelton
(74) *Attorney, Agent, or Firm* — NDQ & M Watchstone LLP

(57) ABSTRACT

A battery block composed of a plurality of battery cells and a voltage detecting circuit (state detecting circuit) for detecting a voltage between terminals of each battery cell are included, and a flexible printed circuit board, in which a voltage detecting line for electrically connecting a positive electrode terminal or a negative electrode terminal of the battery cell and the voltage detecting circuit (state detecting circuit) is integrated with a substrate made or a flexible material, is provided.

11 Claims, 55 Drawing Sheets

(51) Int. Cl.
   *H01M 2/20*   (2006.01)
   *H01M 10/44*  (2006.01)
   *H01M 10/0525*    (2010.01)

(56) References Cited

U.S. PATENT DOCUMENTS

| | | |
|---|---|---|
| 2004/0263119 A1 | 12/2004 | Meyer et al. |
| 2005/0007068 A1 | 1/2005 | Johnson et al. |
| 2006/0071634 A1 | 4/2006 | Meyer et al. |
| 2006/0091858 A1 | 5/2006 | Johnson et al. |
| 2006/0103357 A1 | 5/2006 | Johnson et al. |
| 2006/0108975 A1 | 5/2006 | Meyer et al. |
| 2006/0108983 A1 | 5/2006 | Meyer et al. |
| 2006/0108984 A1 | 5/2006 | Johnson et al. |
| 2006/0117580 A1 | 6/2006 | Serdynski et al. |
| 2006/0164032 A1 | 7/2006 | Johnson et al. |
| 2007/0103109 A1 | 5/2007 | Meyer et al. |
| 2007/0103116 A1 | 5/2007 | Johnson et al. |
| 2007/0103121 A1 | 5/2007 | Johnson et al. |
| 2007/0108942 A1 | 5/2007 | Johnson et al. |
| 2007/0184339 A1 | 8/2007 | Scheucher |
| 2007/0188130 A1 | 8/2007 | Scheucher |
| 2007/0188137 A1 | 8/2007 | Scheucher |
| 2007/0273334 A1 | 11/2007 | Meyer et al. |
| 2008/0012530 A1 | 1/2008 | Johnson et al. |
| 2008/0018303 A1 | 1/2008 | Scheucher |
| 2008/0050645 A1 | 2/2008 | Kai et al. |
| 2008/0053716 A1 | 3/2008 | Scheucher |
| 2008/0185993 A1 | 8/2008 | Johnson et al. |
| 2008/0213652 A1 | 9/2008 | Scheucher |
| 2008/0284375 A1* | 11/2008 | Nagaoka et al. .............. 320/116 |
| 2009/0086043 A1 | 4/2009 | Scheucher |
| 2009/0087729 A1 | 4/2009 | Johnson et al. |
| 2009/0153101 A1 | 6/2009 | Meyer et al. |
| 2009/0160452 A1 | 6/2009 | Meyer |
| 2009/0195216 A1 | 8/2009 | Johnson et al. |
| 2009/0197152 A1 | 8/2009 | Johnson et al. |
| 2009/0305086 A1 | 12/2009 | Lee et al. |
| 2009/0309545 A1 | 12/2009 | Kunimitsu |
| 2010/0148729 A1 | 6/2010 | Johnson et al. |
| 2010/0167110 A1 | 7/2010 | Johnson et al. |
| 2010/0236807 A1 | 9/2010 | Johnson et al. |
| 2010/0247979 A1* | 9/2010 | Ha et al. ............................ 429/7 |
| 2010/0250043 A1 | 9/2010 | Scheucher |
| 2010/0255355 A1 | 10/2010 | Park et al. |
| 2010/0327815 A1 | 12/2010 | Johnson et al. |
| 2011/0014501 A1 | 1/2011 | Scheucher |
| 2011/0064981 A1 | 3/2011 | Scheucher |
| 2011/0221384 A1 | 9/2011 | Scheucher |
| 2011/0286168 A1 | 11/2011 | Scheucher |
| 2012/0074902 A1 | 3/2012 | Scheucher |
| 2012/0080941 A1 | 4/2012 | Scheucher |
| 2012/0092018 A1 | 4/2012 | Scheucher |
| 2012/0141848 A1 | 6/2012 | Nagaoka et al. |

FOREIGN PATENT DOCUMENTS

| | | |
|---|---|---|
| JP | 08162171 | 6/1996 |
| JP | 2000208118 A | 7/2000 |
| JP | 200345409 A | 2/2003 |
| JP | 2003047111 | 2/2003 |
| JP | 2004273351 A | 9/2004 |
| JP | 2005150079 A | 6/2005 |
| JP | 2005235463 A | 9/2005 |
| JP | 2007323952 | 12/2007 |
| JP | 200835671 A | 2/2008 |
| JP | 2008530729 A | 8/2008 |
| JP | 2008251305 A | 10/2008 |
| JP | 2008289234 A | 11/2008 |
| JP | 201025925 A | 2/2010 |
| WO | 2008038916 A1 | 4/2008 |

OTHER PUBLICATIONS

International Search Report mailed Jun. 29, 2010. In corresponding application No. PCT/JP2010/002229.
English Abstract and Machine Translation for JP2003-047111, published Feb. 14, 2003 and retrieved on Sep. 14, 2011.
English Abstract and Machine Translation for JP07-050157, published Feb. 21, 1995 and retrieved on Sep. 14, 2011.
English Abstract and Machine Translation for JP08-162171, published, Jun. 21, 1996 and retrieved on Sep. 14, 2011.
English Abstract and Machine Translation for JP2000-208118, published Jul. 28, 2000 and retrieved on Sep. 14, 2011.
English Abstract and Machine Translation for JP2003-045409, published, Feb. 14, 2003 and retrieved on Sep. 14, 2011.
English Abstract and Machine Translation for JP2005-235463, published Sep. 2, 2005 and retrieved on Sep. 14, 2011.
English Abstract and Machine Translation for JP2007-323952, published Dec. 13, 2007 and retrieved on Sep. 14, 2011.
English Abstract and Machine Translation for JP2008-251305, published Oct. 16, 2008 and retrieved on Sep. 14, 2011.
Written Opinion mailed Jun. 29, 2010. In corresponding application No. PCT/JP2010/002229.
International Preliminary Report on Patentability mailed Nov. 15, 2011. In corresponding application No. PCT/JP2010/002229.

* cited by examiner

F I G. 1 2
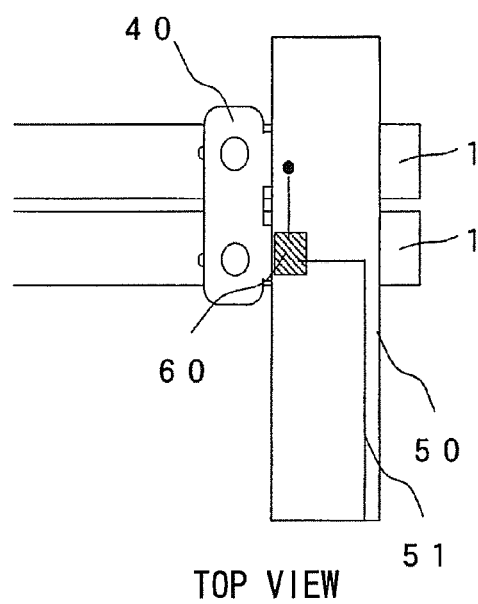
TOP VIEW
(a)
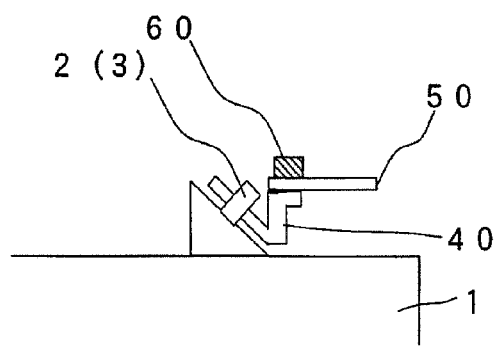
SIDE VIEW
(b)

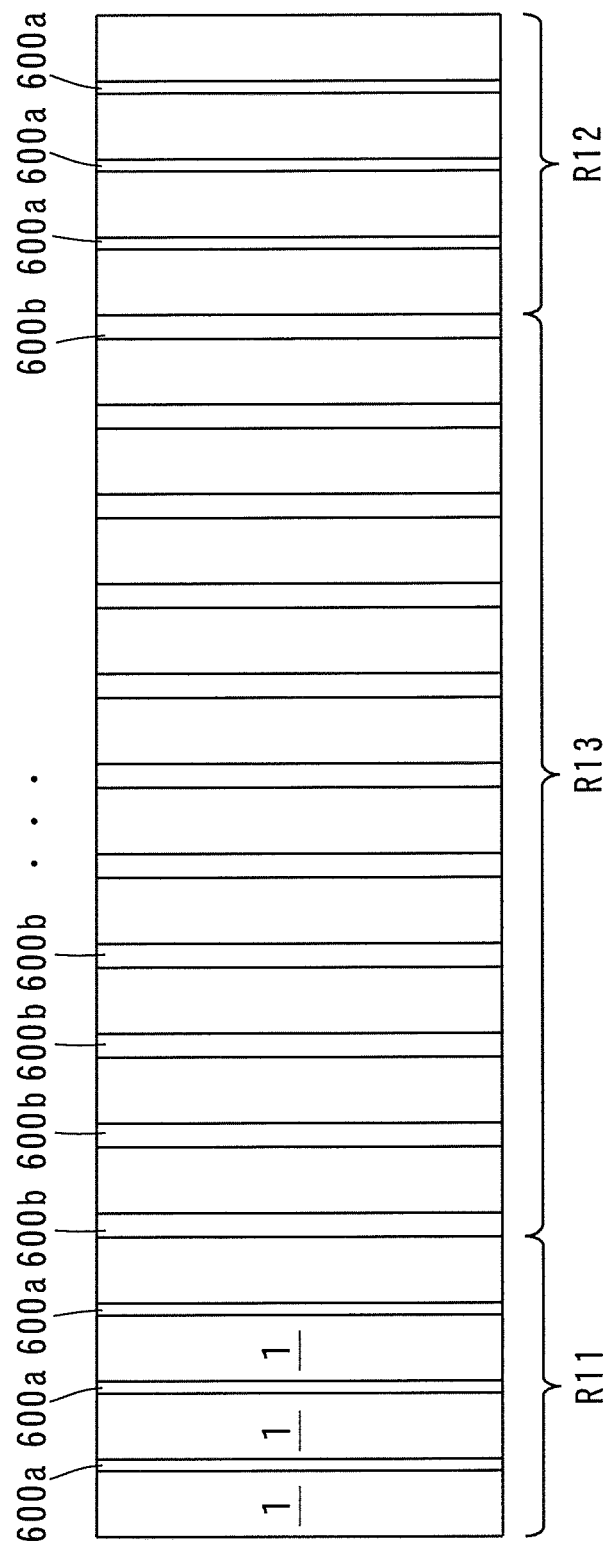

F I G. 2 6
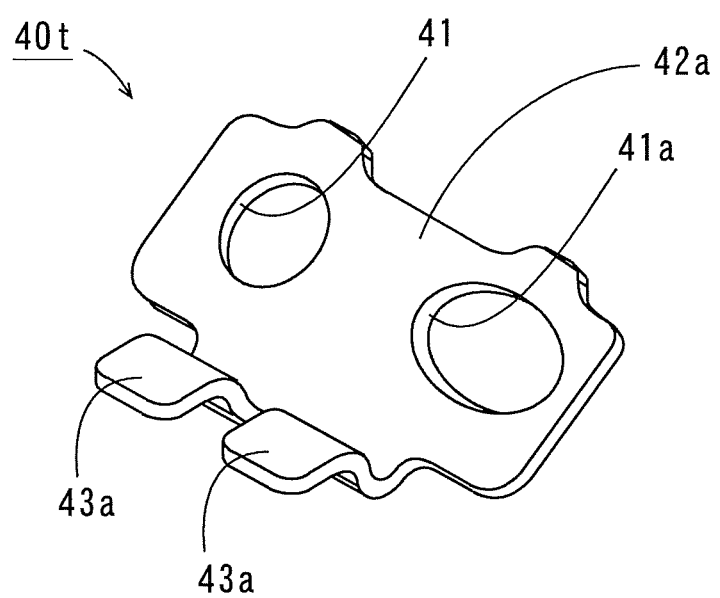

BATTERY MODULE, BATTERY SYSTEM AND ELECTRIC VEHICLE

TECHNICAL FIELD

The present invention relates to a battery module that includes a stack of a plurality of battery cells and to which a voltage detecting circuit is connected, a battery system and an electric vehicle.

BACKGROUND ART

In battery systems utilized for applications that require high power and high capacity batteries such as hybrid electric vehicles (HEV) and electric vehicles (EV), a plurality of battery cells are connected in series or in parallel for use. In such battery systems, voltages and currents of the battery cells are monitored in a battery ECU (Electronic Control Unit) in order to protect each battery cell by monitoring abnormalities of each battery cell such as excess current, overdischarge, overcharge, variation in an SOC (an index representing a charge state on percentage) of the battery cell. There has been proposed a battery system (Patent Document 1) as such a battery system. In the proposed battery system, a battery module is configured to include a voltage detecting circuit for detecting a voltage of a battery block having a plurality of battery cells connected in series, and the voltage detecting circuit provided for each battery module and the battery ECU provided for a plurality of battery modules are connected to each other by a communication line, so that the voltage of each battery block can be monitored.

[Patent Document 1] JP 8-162171 A

DISCLOSURE OF THE INVENTION

The voltage detecting circuit detects the voltage of the battery block for each battery module in the conventional battery module as described above. Therefore, a voltage detecting line for connecting the voltage detecting circuit and electrode terminals of the battery block is required. A lead formed of a metal wire or the like (hereinafter referred to as a wire lead) is used as such a voltage detecting line. As described above, in general, the wire lead has conventionally been used as the voltage detecting line connecting the voltage detecting circuit and the battery block for detecting the voltage of the battery block in the battery system utilized for the HEV or the EV.

Thus, when a voltage detecting line for connecting the voltage detecting circuit and the electrode terminals of the battery cell is required for controlling the voltages of the battery cells constituting the battery module to be equalized for example, a wire lead for detecting the voltage of each battery cell is used. In this case, individually detecting the voltage of each battery cell requires lead wires of twice as many as the number of the battery cells, thus leading to an extremely complicated wiring state. For example, twenty wire leads are required in a battery module including ten battery cells. Thus, such a complicated wiring state of the voltage detecting lines disadvantageously complicates wiring operations in assembly steps of the battery module. For example, connection of the twenty wire leads requires such complicated operations as forty times of electric connection operation such as screwing and soldering of both ends thereof.

The present invention has been developed for solving the foregoing disadvantages of the above-described conventional art, and an object thereof is to provide a battery module and a battery system capable of improving complicated wiring of the voltage detecting lines connecting the voltage detecting circuit and the electrode terminals of the battery cells.

According to an aspect of the present invention, a battery module is characterized by including a battery block composed of a plurality of battery cells and a voltage detecting circuit for detecting a voltage between terminals of each of the battery cells, wherein a flexible printed circuit board, in which a voltage detecting line for electrically connecting the terminal of each of said battery cells and said voltage detecting circuit is integrated with a substrate made of a flexible material, is attached to said battery block. Note that such a flexible printed circuit board will be referred to as an FPC, which is an abbreviated form of a flexible printed circuit.

The stack of the plurality of battery cells each having a substantially flat shape, such as the shape of a thin rectangular parallelepiped, can be used as the battery block used in the battery module of the present invention. Each of the battery cells is arranged such that when one of four exposed side surfaces in the stacked state of the battery cells is referred to as a cell main surface, a negative electrode terminal and a positive electrode terminal are provided in symmetric positions in a longitudinal direction of the cell main surface having a rectangular shape, and the cell main surface is positioned on a first surface that is a common surface of the battery block (hereinafter referred to as a block main surface). In addition, the battery cells are arranged such that the negative electrode terminals and the positive electrode terminals are alternately positioned in this arrangement. Accordingly, the battery module of the present invention employs the battery block formed such that a first terminal row in which the positive electrode terminals and the negative electrode terminals are alternately arranged and a second terminal row in which the negative electrode terminals and the positive electrode terminals are alternately arranged are parallel to each other in a direction in which the battery cells are stacked on the block main surface of the battery block.

Moreover, in the battery module of the present invention, the voltage detecting circuit arranged on a second surface, which is different from the block main surface of the battery block, can be used. For example, the voltage detecting circuit can be arranged on an end surface of the battery block (hereinafter referred to as a block end surface) corresponding to an end surface of the battery cell in the stacked direction, and the voltage detecting circuit can be connected to the terminals of each battery cell through voltage detecting lines of the foregoing FPC in the battery module. Such an FPC may be a first FPC including a plurality of voltage detecting lines connecting the terminals constituting the first terminal row to said voltage detecting circuit and a second FPC including a plurality of voltage detecting lines connecting the terminals constituting said second terminal row to said voltage detecting circuit. In this manner, the large number of voltage detecting lines can be divided between the two FPCs. In addition, the plurality of voltage detecting lines handled by each FPC are assembled for electric connection, thus leading to the less complicated wiring state of the voltage detecting lines.

The foregoing battery module is characterized in that said FPC is arranged to extend from said first surface to said second surface of the battery block.

In the foregoing battery module, the terminals of the plurality of battery cells may be arranged on the first and third surfaces that are different from each other of the battery block, the voltage detecting circuit may be arranged on the second surface that is different from the first and third surfaces of the battery block, the FPC may be arranged to extend from the first surface to the second surface of the battery block and to extend from the third surface to the second surface of the battery block.

The foregoing battery module is characterized by including a frame that fixes said plurality of battery cells, and a circuit accommodating housing that accommodates said voltage detecting circuit, wherein the circuit accommodating housing is attached to said frame. Here, the foregoing characteristics include not only separately attaching the circuit accommodating housing to said frame, but also integrally constructing the circuit accommodating housing and the frame. That is, the circuit accommodating housing can be used as part of the frame.

The foregoing battery module is characterized in that said battery block includes said plurality of battery cells that are stacked, a first terminal row in which one of the positive electrode terminal and the negative electrode terminal of each of the battery cells is arranged in a direction in which said battery cells are stacked is constituted, a second terminal row in which the other terminal of each of the battery cells is arranged in the direction in which said battery cells are stacked is constituted, said first FPC is arranged along said first terminal row, and said second FPC is arranged along said second terminal row.

In such a battery module, the first FPC may be provided on the opposite side to the second terminal row with respect to the first terminal row, and the second FPC may be provided on the opposite side to the first terminal row with respect to the second terminal row. The first FPC may be provided on the same side as the second terminal row with respect to the first terminal row, and the second FPC may be provided on the same side as the first terminal row with respect to the second terminal row. The first FPC may be provided to extend overlapping the first terminal row, and the second FPC may be provided to extend overlapping the second terminal row.

The foregoing battery module is characterized in that each of said first and second terminal rows includes the positive electrode terminal and the negative electrode terminal that are alternately arranged, first and second wiring members each formed by coupling a bus bar made of a metal part to each of said first and second FPCs in order to connect the positive electrode terminal or the negative electrode terminal of said battery cell and said voltage detecting circuit is provided, the positive electrode terminal and the negative electrode terminal that are adjacent to each other in said first and second terminal rows are connected to each other by said bus bar, and the voltage detecting lines of said first and second FPCs each connect said bus bar and said voltage detecting circuit.

The bus bar may include a coupling portion that couples the adjacent positive electrode terminal and negative electrode terminal in the first and second terminal rows to each other, and a linking portion provided to overlap the first or second FPC, and connected to the voltage detecting line of the first or second FPC, and one or a plurality of cutouts may be formed in the linking portion.

In this case, the linking portion of the bus bar is coupled to the first or second FPC. Since the one or plurality of cutouts are formed in the linking portion, a contact area between the linking portion and the first or second FPC is reduced. Thus, distortion is unlikely to occur between the linking portion and the first or second FPC. Even when distortion occurs, stress due to the distortion is easily relieved. This improves connectivity between the linking portion and the first or second FPC.

The bus bar may include a coupling portion that couples the adjacent positive electrode terminal and negative electrode terminal in the first and second terminal rows to each other, and a linking portion provided to overlap the first or second FPC, and connected to the voltage detecting line of the first or second FPC, and one or a plurality of openings may be formed in the linking portion.

In this case, the linking portion of the bus bar is coupled to the first or second FPC. Since the one or plurality of openings are formed in the linking portion, the contact area between the linking portion and the first or second FPC is reduced. Thus, distortion is unlikely to occur between the linking portion and the first or second FPC. Even when distortion occurs, stress due to the distortion is easily relieved. This improves connectivity between the linking portion and the first or second FPC.

According to another aspect of the present invention, a battery system includes a plurality of battery modules, wherein each of the plurality of battery modules includes a battery block composed of a plurality of battery cells, a voltage detecting circuit for detecting a voltage between terminals of each of the battery cells, and an FPC, and the FPC has a configuration in which a voltage detecting line for electrically connecting a positive electrode terminal or a negative electrode terminal of each of the battery cells and the voltage detecting circuit is integrated with a substrate made of a flexible material.

In the battery system, the FPC is provided in each battery module. The positive electrode terminal or the negative electrode terminal of each battery cell is electrically connected to the voltage detecting circuit through the voltage detecting line of the FPC.

In this case, the positive electrode terminal or the negative electrode terminal of each of the plurality of battery cells can be electrically connected to the voltage detecting circuit by the common FPC, thus eliminating the need to perform complicated connection operation. As a result, complicated wiring of the voltage detecting line is improved.

The battery block of each battery module may include the plurality of battery cells that are stacked, a first terminal row in which one of the positive electrode terminal and the negative electrode terminal of each of the battery cells is arranged in a direction in which said battery cells are stacked is constituted, and a second terminal row in which the other terminal of each of the plurality of battery cells is arranged in the direction in which the plurality of battery cells are stacked may be constituted, the plurality of battery modules may include a plurality of first battery modules that form a first module row along the direction in which the plurality of battery cells are stacked, and a plurality of second battery modules that form a second module row along the direction in which the plurality of battery cells are stacked, and the first and second module rows may be arranged in parallel with each other, a positive electrode terminal having a highest potential and a negative electrode terminal having a lowest potential in each first battery module may be positioned at one end and the other end, respectively, of a terminal row of the first and second terminal rows that is closer to the second module row, and a positive electrode terminal having a highest potential and a negative electrode terminal having a lowest potential in each second battery module may be positioned at one end and the other end, respectively, of a terminal row of the first and second terminal rows that is closer to the first module row.

In this case, the positive electrode terminal having the highest potential and the negative electrode terminal having the lowest potential of the first battery module in the first module row are in close proximity to a positive electrode terminal of a highest potential and a negative electrode terminal having a lowest potential of the second battery module in the second module row, respectively. This reduces the length of wiring connected to the plurality of battery modules and simplifies routing of the wiring. Accordingly, cost required for the wiring can be reduced, and assembly operation and maintenance operation are facilitated.

The battery system may further include a controller that manages states of said battery modules, and a communication line for performing communication between at least one battery module and the controller, wherein the communication line may be connected to the voltage detecting circuit of the at least one battery module.

In this case, the communication between the at least one battery module and the controller is performed through the communication line connected to the voltage detecting circuit of the at least one battery module.

The battery block of each battery module may include the plurality of battery cells that are stacked, a first terminal row in which one of the positive electrode terminal and the negative electrode terminal of each of the plurality of battery cells are arranged in a direction in which the plurality of battery cells are stacked may be constituted, and a second terminal row in which the other terminal of each of the plurality of battery cells are arranged in the direction in which the plurality of battery cells are stacked may be constituted, the plurality of battery modules may include a plurality of first battery modules that form a first module row along the direction in which the plurality of battery cells are stacked, and a plurality of second battery modules that form a second module row along the direction in which the plurality of battery cells are stacked, and the first and second module rows may be arranged in parallel with each other, the communication line may include a first communication line connected to the voltage detecting circuit of at least one first battery module, and a second communication line connected to the voltage detecting circuit of at least one second battery module, the first communication line may be arranged along a terminal row of the first and second terminal rows, which is closer to the second module row, of the at least one first battery module, and the second communication line may be arranged along a terminal row of the first and second terminal rows, which is closer to the first module row, of the at least one second battery module.

In this case, the first communication line of the first module row and the second communication line of the second module row are in close proximity to each other, and each of the first communication line and the second communication line is substantially linearly arranged. This reduces the length of each of the communication lines and simplifies routing of the wiring of the communication lines. Accordingly, cost required for the wiring of the communication lines can be reduced, and assembly operation and maintenance operation are facilitated.

According to still another aspect of the present invention, an electric vehicle includes a battery system including a plurality of battery modules, a motor driven by electric power supplied from the plurality of battery modules of the battery system, and drive wheels rotated by a torque of the motor, wherein each of the plurality of battery modules includes a battery block composed of a plurality of battery cells, a voltage detecting circuit for detecting a voltage between terminals of each of battery cells, and an FPC, and the FPC has a configuration in which a voltage detecting line for electrically connecting a positive electrode terminal or a negative electrode terminal of each of battery cells and the voltage detecting circuit is integrated with a substrate made of a flexible material.

In the electric vehicle, the motor is driven by the electric power supplied from the battery modules of the battery system. The drive wheels are rotated by the torque of the motor, thereby moving the electric vehicle.

In the battery system, the FPC is provided in each battery module. The positive electrode terminal or the negative electrode terminal of each battery cell is electrically connected to the voltage detecting circuit by the voltage detecting line of the FPC.

In this case, the positive electrode terminal or the negative electrode terminal of each of the plurality of battery cells can be electrically connected to the voltage detecting circuit by the common FPC, thus eliminating the need to perform complicated connection operation. As a result, complicated wiring of the voltage detecting line is improved. This facilitates maintenance of the electric vehicle.

According to the present invention, the battery module in which complicated wiring of the voltage detecting lines connecting the voltage detecting circuit for detecting the voltages of the plurality of battery cells to the electrode terminals of the battery cells can be improved, and the battery system can be provided.

BRIEF DESCRIPTION OF THE DRAWINGS

FIG. 12 is a diagram showing a modification of attachment of a PTC element.

FIG. 25 is a schematic plan view showing an example in which a plurality of separators having different irregularity widths are used in the battery module.

FIG. 26 is a diagram showing another example of the bus bar.

BEST MODE FOR CARRYING OUT THE INVENTION

[1] First Embodiment
(1) Battery System

Figure 1:
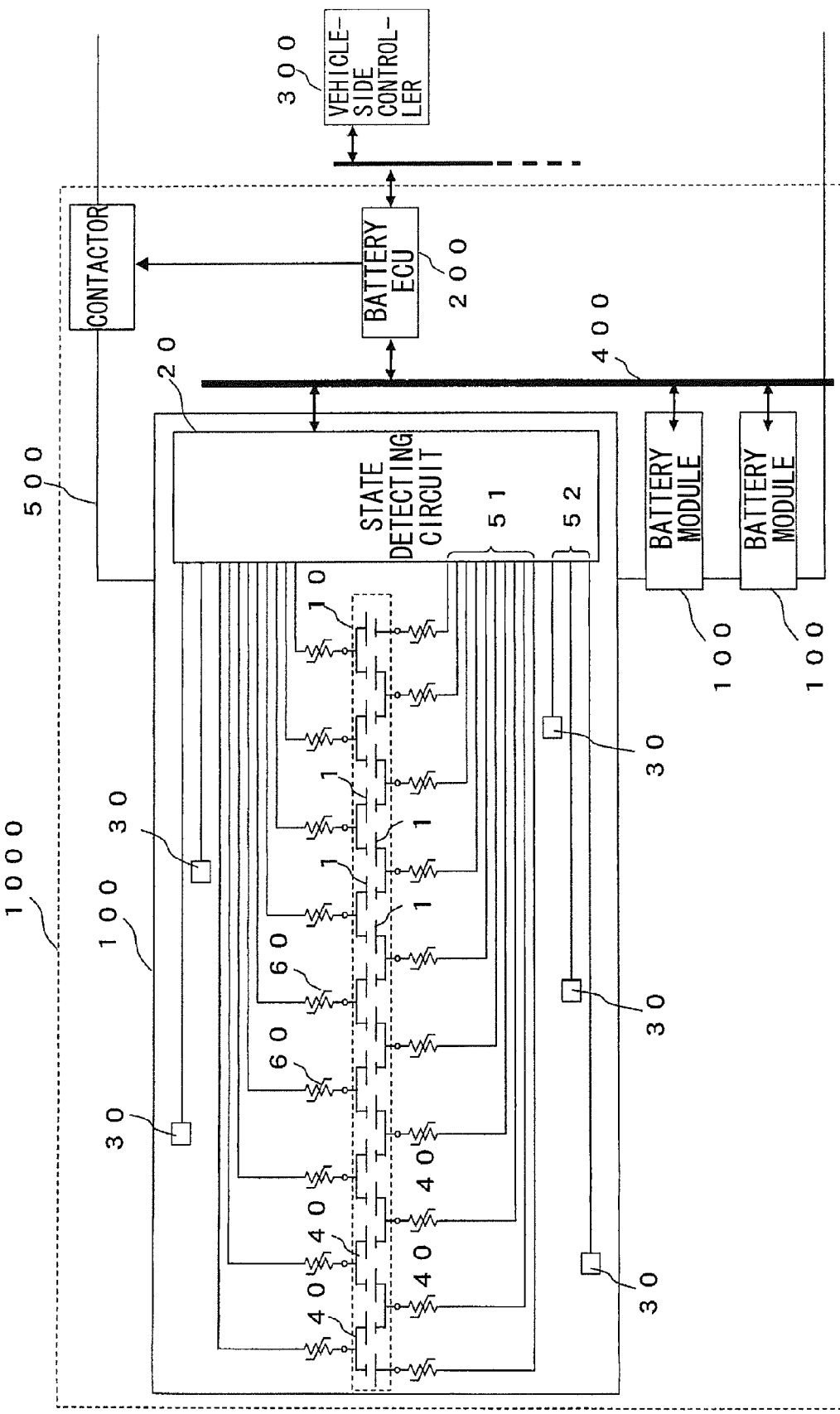
FIG. 1 is a circuit diagram of a battery system.

First, description will be made of circuits and functions in an inventive example of a battery system using a battery module of the present invention with reference to FIG. 1. FIG. 1 shows a circuit diagram of the battery system used in an HEV, an EV or the like. The battery system 1000 includes a plurality of battery modules 100, 100 . . . , a battery ECU 200, a communication line 400 and power lines 500. In the battery system 1000, the plurality of battery modules 100 are connected in series through the power lines 500, providing high voltage. Thus, the battery system 1000 supplies power for driving an automobile. When power of high capacity is required, the battery modules 100 are preferably connected in parallel. The plurality of battery modules 100, 100 . . . are connected to the battery ECU 200 through the communication line 400, and data communication is performed between the battery modules 100 and the battery ECU 200 for controlling power supplied from the plurality of battery modules 100, 100 . . . , and required for driving the automobile. The battery system 1000 is connected to a vehicle-side controller 300 via the battery ECU 200 through a communication line, and data communication for controlling power required for driving the automobile is performed between the battery ECU 200 and the vehicle-side controller 300.

In the present example, the battery module 100 includes a battery block 10 in which eighteen battery cells 1, 1 . . . are stacked. The battery cells 1 of the battery block 10 are stacked such that positive electrode terminals and negative electrode terminals are alternately arranged, and two terminals (terminals 2, 3 that are not shown and described below with reference to FIG. 2) having different polarities of adjacent battery cells 1 in a direction in which the battery cells 1 are stacked are connected to each other by a bus bar 40 formed of a metal part. As is clear from the connection state of the plurality of battery cells 1, 1 . . . shown in FIG. 1, series connection of the eighteen battery cells 1, 1 . . . is realized by connection using bus bars 40.

Furthermore, the battery module 100 includes the battery block 10 composed of the eighteen battery cells 1, 1 . . . connected in series as described above, a plurality of temperature detecting elements 30, 30 . . . for detecting the temperature of the battery cells 1, and a state detecting circuit 20 for detecting the states of the battery cells 1. Moreover, the battery module 100 includes voltage detecting lines 51 for connecting the bus bars 40 to the state detecting circuit 20 and detecting respective voltages of the battery cells 1, and PTC elements 60 interposed in the voltage detecting lines 51, respectively, for protecting the battery cells 1 from short circuits of the voltage detecting lines 51. Details of the PTC elements will be described below. The battery module 100 includes temperature detecting lines 52 connecting the temperature detecting elements 30 to the state detecting circuit 20. The battery block 10 is further connected in series to a battery block 10 of another battery module although not shown, thus constituting a high voltage battery.

The state detecting circuit 20 detects the voltage of each of the battery cells 1, 1 . . . , a current flowing through the battery block 10, the temperature of the battery cell 1, and a state of charge (SOC) indicating an amount of current (Ah) stored in each of the battery cells 1, 1 . . . on percentage as a state of the battery. That is, the state detecting circuit 20 has functions of a voltage detecting circuit, a current detecting circuit, a temperature detecting circuit and an SOC estimating circuit, and works as a circuit realizing each function as necessary, as described below. Thus, the state detecting circuit 20 operates as the voltage detecting circuit for detecting the voltage of each of the battery cells 1, 1 . . . , for example. The state detecting circuit 20 A/D converts the state of the battery detected by the state detecting circuit 20, and transmits the state to the battery ECU 200 through the communication line 400.

The other ends of the voltage detecting lines 51 are connected to the state detecting circuit 20 with the one ends thereof connected to the bus bars 40, respectively. The state detecting circuit 20 functions as the voltage detecting circuit by selecting two voltage detecting lines 51 extending from the bus bars 40 connected to the positive electrode terminal and the negative electrode terminal of an arbitrary battery cell 1 from the voltage detecting lines 51 connected to the state detecting circuit 20 and detecting the voltage between the selected voltage detecting lines 51, so that the voltage between the positive electrode terminal and the negative electrode terminal of the arbitrary battery cell 1 is detected. The state detecting circuit 20 transmits information of the voltage value detected by the state detecting circuit 20 to the battery ECU 200.

The state detecting circuit 20 can employ the configuration of detecting the current using a current detecting sensor, however, the state detecting circuit 20 detects a current flowing through the battery block 10 based on the voltage between two voltage detecting lines 51 connected to a bus bar 40c that also works as a shunt resistance as described below. The state detecting circuit 20 transmits information of the detected current value to the battery ECU 200.

The state detecting circuit 20 functions as the temperature detecting circuit that detects the temperature of the battery cell 1 based on the voltage value that changes according to change in resistance of the temperature detecting element 30. The state detecting circuit 20 transmits information of the temperature value detected by the state detecting circuit 20 to the battery ECU 200.

The state detecting circuit 20 functions as the SOC estimating circuit that estimates the SOC of the battery cell 1 based on the detected voltage of the battery cell 1, the detected current of the battery block 10 and the detected temperature of the battery cell 1. The state detecting circuit 20 transmits information of the SOC value estimated by the state detecting circuit 20 to the battery ECU 200.

In the following description, the state detecting circuit 20 operates as the voltage detecting circuit unless explanation is made separately.

The battery ECU 200 receives the information indicating the state of the battery detected by the state detecting circuit 20, and protects the battery module 100 and controls the SOCs of the battery cells 1 to be equalized. For example, the battery system 1000 includes a contactor that short-circuits and opens the power lines 500, and the battery ECU 200 protects the battery module by outputting a signal for closing the contactor to the contactor such that power is not supplied to a motor of an HEV, an EV or the like when an abnormality (overdischarge or overcharge) occurs in the state of the battery.

(2) The Configuration of the Battery Module

Figure 2:
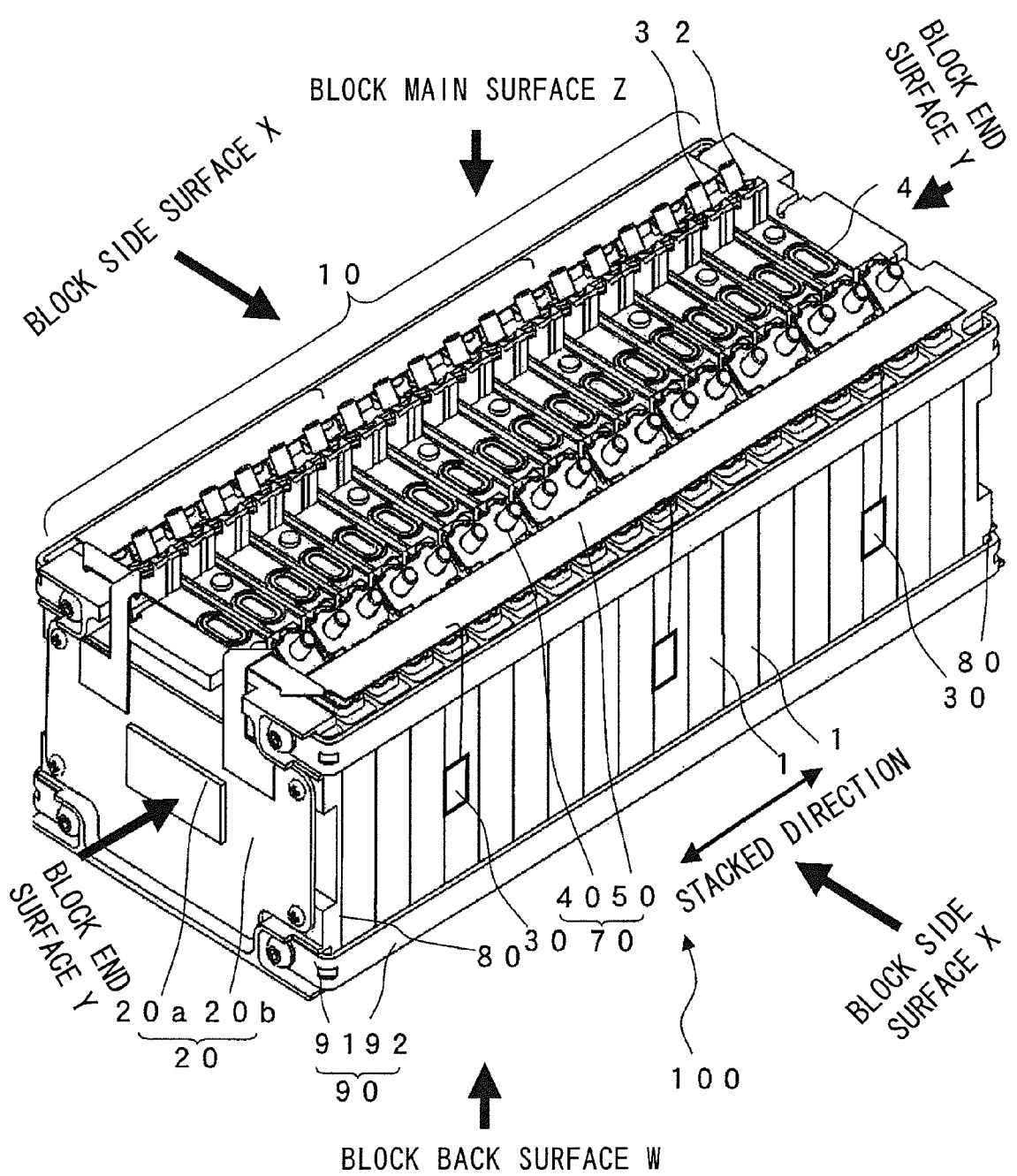
FIG. 2 is a perspective view of a battery module.
Figure 3:
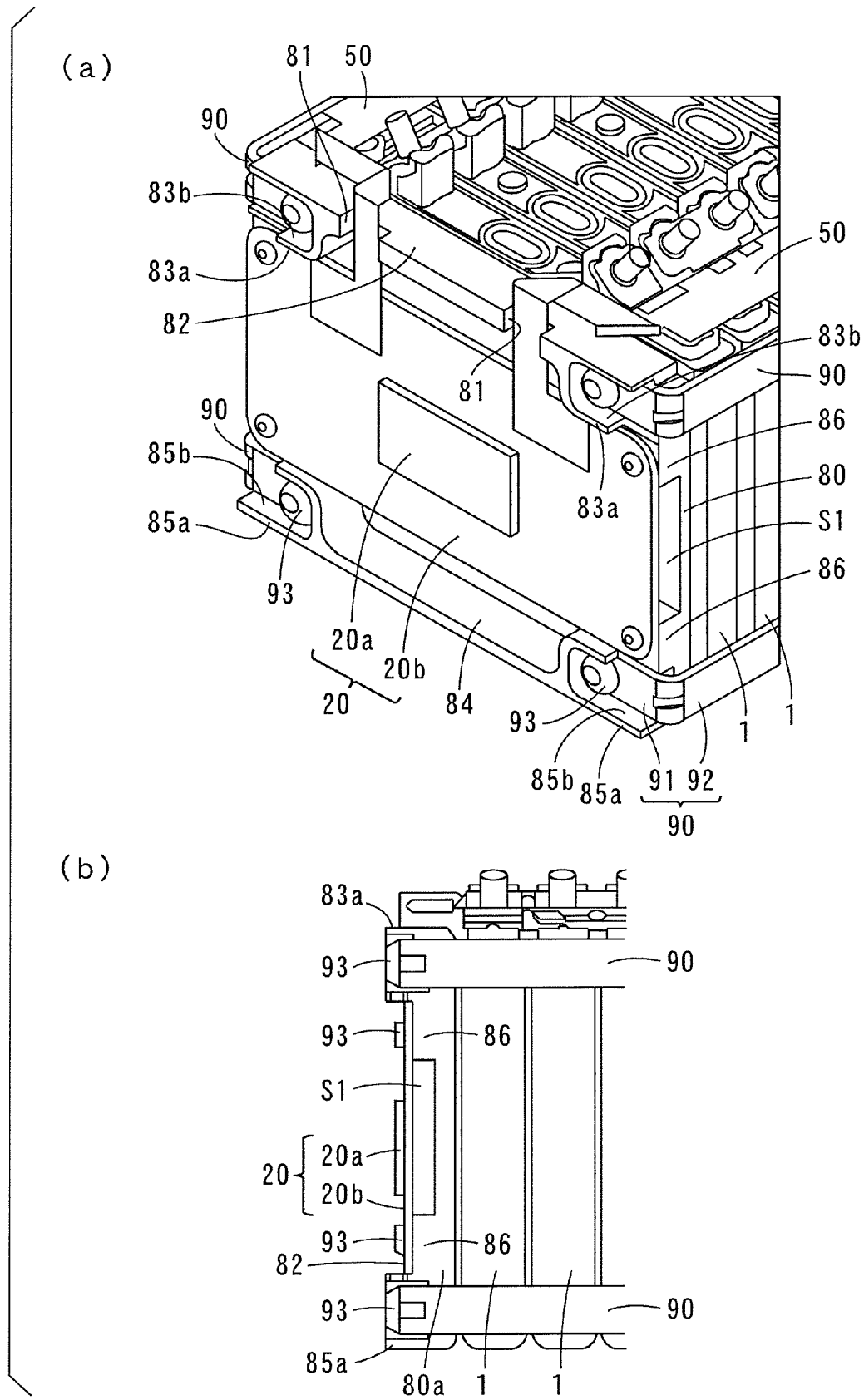
FIG. 3 shows a partially enlarged perspective view and a partially enlarged side view of a state detecting circuit of the battery module.
Figure 4:
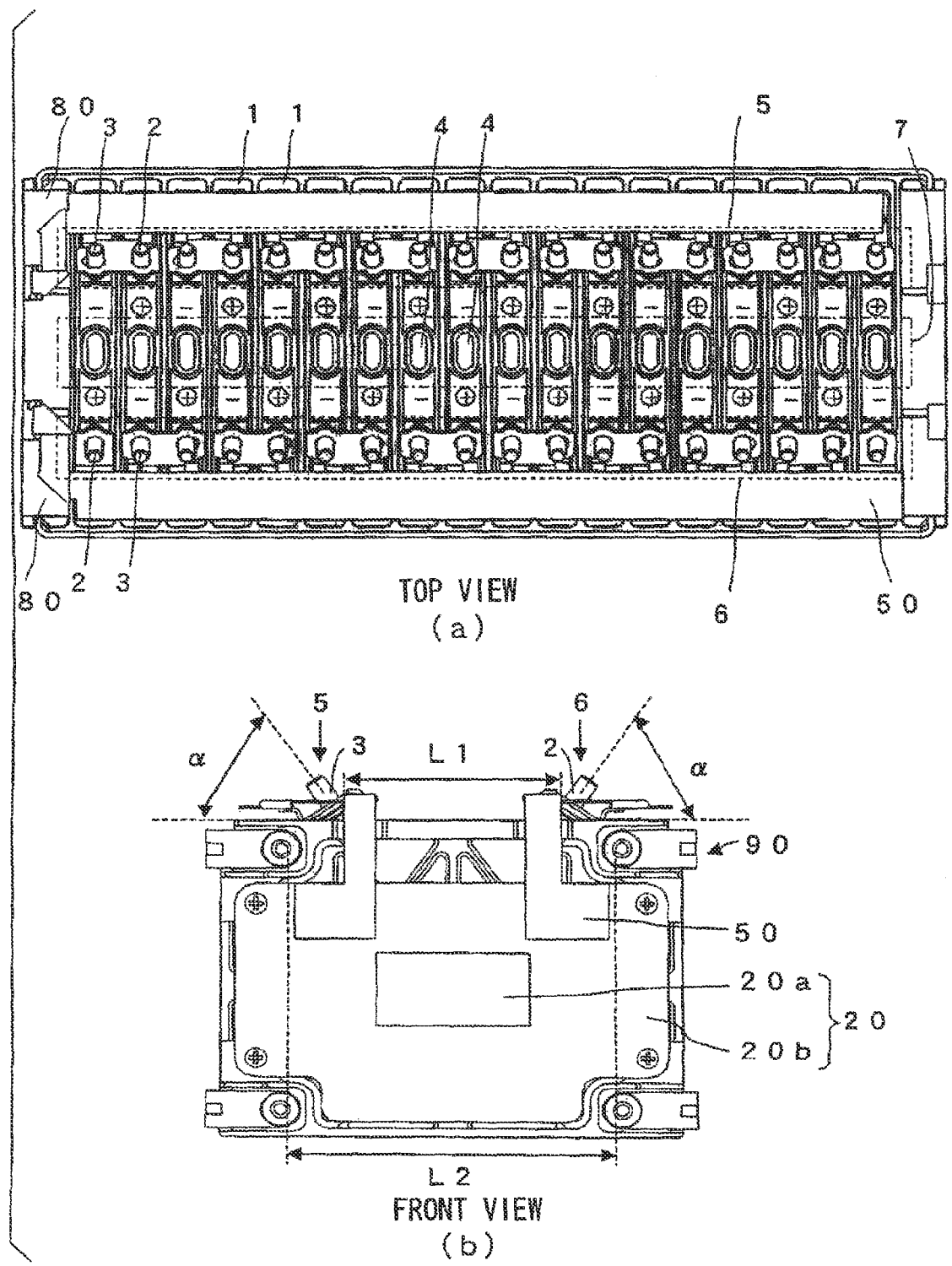
FIG. 4 shows a top view and a front view of the battery module.
Figure 10:
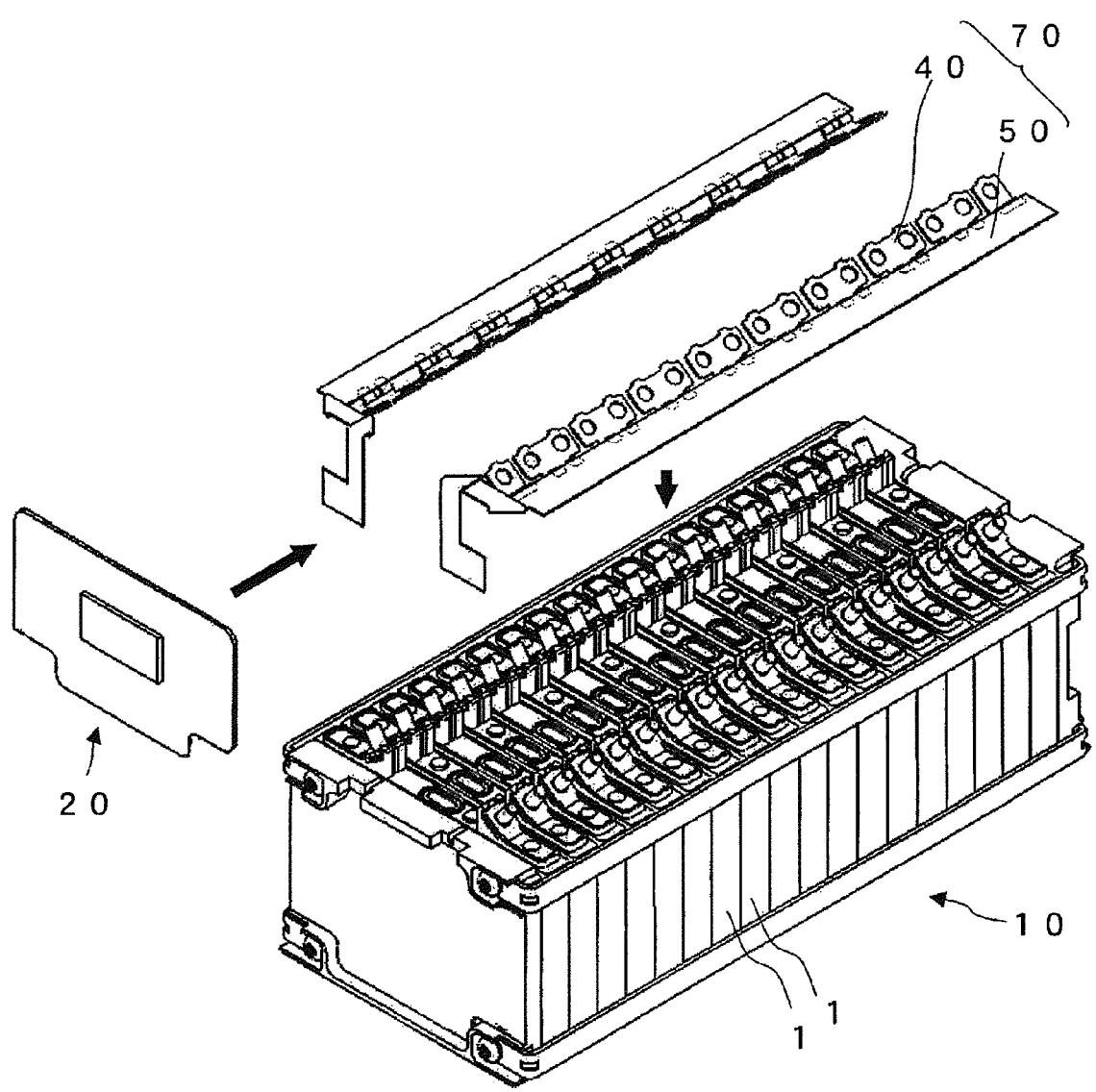
FIG. 10 is an exploded perspective view of the battery module.

Next, description will be made of details of the configuration of the battery module of the present invention used in the above-described battery system with reference to the drawings. FIG. 2 is a perspective view of the battery module 100. FIG. 3 shows a partially enlarged perspective view and a partially enlarged side view of the state detecting circuit 20 of the battery module 100. FIG. 4 shows a top view and a front view of the battery module 100. FIG. 10 is an exploded perspective view of the battery module 100.

As shown in FIGS. 2, 3, 4 and 10, main constituents of the battery module 100 are the battery block 10, the state detecting circuit 20, and a wiring member 70. The configuration of each constituent will be sequentially described below.

(2-1) The Battery Block

As shown in FIG. 2, the battery block 10 is composed of the plurality of (eighteen in this case) battery cells 1, 1 . . . and two end plates 80, 80 overlapping in one direction. Hereinafter, to "overlap" in one direction will be referred to as to "stack".

The battery block 10 is composed of the plurality of battery cells 1, 1 . . . that are stacked. In the present example, the battery block 10 is provided with a frame composed of the two end plates 80, 80 and four coupling fixtures 90, and the plurality of battery cells 1, 1 . . . are coupled and fixed to one another by the frame.

Next, additional description will be made of the battery cells 1, 1 . . . and arrangement thereof.

Basically, lithium ion batteries, for example, of the same potential, capacity and shape are employed as the plurality of battery cells 1, 1 . . . . Each of the battery cells 1, 1 . . . has the shape of a flat block. The battery block 10 is constituted by the battery cells 1, 1 . . . that are stacked such that flat surfaces thereof (that is, opposite surfaces each having a maximum area, and hereinafter referred to as stack surfaces) sequentially overlap.

A positive electrode terminal 2 and a negative electrode terminal 3 are provided on one surface (hereinafter referred to as a cell main surface) of four outer peripheral surfaces that are different from the stack surfaces of each of the battery cells 1, 1 . . . . These terminals 2, 3 are each arranged to be inclined toward a direction away from each other at a given angle α with respect to the cell main surface (see FIG. 4(b)).

A gas vent hole 4 is arranged between the positive electrode terminal 2 and the negative electrode terminal 3 on the cell main surface of each of the battery cells 1, 1 . . . . When the battery cell 1 is heated to generate a gas inside thereof, the internal pressure becomes excessive. In order to prevent such a phenomenon, the hole 4 has a function of a valve that opens when the pressure exceeds a given pressure.

In the battery block 10, the battery cells 1, 1 . . . are stacked such that the cell main surfaces are aligned with one another as shown in FIG. 2. Hereinafter, the surface of the battery block 10 composed of the cell main surfaces in alignment is referred to as a block main surface.

The battery cells 1, 1 . . . stacked in the battery block 10 are arranged such that the positions of the positive electrode terminal 2 and the negative electrode terminal 3 of the battery cell 1 are different from those of the battery cell 1 adjacent thereto. Therefore, these terminals 2, 3 are connected using the bus bars 40 described below, thereby realizing series connection of the battery cells in the battery block 10 (see FIG. 4(a)).

Each end plate 80 has the shape of a flat block having the same size as the battery cell 1, for example. Two end plates 80 in total are arranged at both ends in a direction in which the plurality of battery cells 1, 1 . . . are stacked (hereinafter referred to as the stacked direction), respectively.

As shown in FIG. 3(a), an upper wall portion 82 that projects to the side of one surface of the end plate 80 is provided at the upper end of the end plate 80. Substantially U-shaped peripheral wall portions 83a are provided at respective both ends of the upper wall portion 82. Concave screwing portions 83b are provided to be surrounded by the peripheral wall portions 83a, respectively. A screw hole (not shown) is formed in each screwing portion 83b.

A pair of FPC insertion cutouts 81 is formed in the upper wall portion 82. The FPC 50 is arranged to pass through the pair of FPC insertion cutouts 81 as described below.

A lower wall portion 84 that projects to the side of the one surface of the end plate 80 is provided at the lower end of the end plate 80. Substantially U-shaped peripheral wall portions 85*a* are provided at respective both ends of the lower wall portion 84. Concave screwing portions 85*b* are provided to be surrounded by the peripheral wall portion 85*a*, respectively. A screw hole (not shown) is formed in each screwing portion 85*b*.

The upper wall portion 82, the lower wall portion 84 and the peripheral wall portions 83*a*, 85*a* project at equal heights, each of which is a first projection height.

Four circuit holding portions 86 are provided to project to the side of the one surface of the end plate 80 in a portion below the pair of peripheral wall portions 83*a* and above the pair of peripheral wall portions 85*a*. FIG. 3(*b*) only shows the two circuit holding portions 86.

Each circuit holding portion 86 projects at a second projection height that is smaller than the first projection height. The state detecting circuit 20 is screwed to the circuit holding portions 86 between the upper wall portion 82 and the lower wall portion 84. A clearance S1 is formed between the state detecting circuit 20 and the bottom surface of the end plate 80.

The thickness of the state detecting circuit 20 is smaller than a difference between the first projection height and the second projection height. Therefore, the state detecting circuit 20 is accommodated in a space surrounded by the upper wall portion 82 and the lower wall portion 84.

The coupling fixtures 90 are screwed to the screwing portions 83*b*, 85*b* of the end plate 80. The coupling fixtures 90 are each made of a bar-shaped metal part, and both ends thereof are bent at a right angle. Here, the ends of the coupling fixtures 90 that are bent at a right angle are referred to as coupling portions 91, and a portion connecting both the coupling portions 91, 91 is referred to as an extending portion 92. The coupling portions 91 provided in both the ends are each provided with a hole (not shown) through which a screw 93 is to be inserted, and the coupling portions 91 at the one ends of the coupling fixtures 90 are screwed with the screw holes provided in the screwing portions 83*b*, 85*b* of the one end plate 80 and the holes through which the screws 93 coinciding with each other. In this case, the coupling portions 91 of the coupling fixtures 90 are accommodated in the peripheral wall portions 83*a*, 85*a* of the end plate 80. The coupling portions 91 at the other ends of the coupling fixtures 90 are screwed with the screw holes provided in the screwing portions 83*b*, 85*b* of the other end plate 80 corresponding to the screwing portions 83*b*, 85*b* of the one end plate 80 screwed with the coupling portions 91 at the one ends and the holes through which the screws 93 are to be inserted coinciding with each other.

The four coupling fixtures 90 are screwed to the screwing portions 83*b*, 85*b* of each end plate 80, and the two end plates 80, 80 are coupled to each other, so that the frame is formed of the end plates 80, 80 and the coupling fixtures 90. Then, the stacked battery cells 1 are accommodated within the frame, and the battery block 10 is fixed by the frame. While the frame is composed of the two end plates 80, 80 and the four bar-shaped coupling fixtures 90 extending between the two end plates 80, 80, flat plate-shaped coupling fixtures 90 extending between the two end plates 80, 80 may be used to form a box-shaped frame.

The battery block 10 is constituted by the plurality of battery cells 1, the end plates 80 and the coupling fixtures 90 as described above to be formed in a rectangular parallelepiped shape. Hereinafter, end surfaces of the battery block 10 in the stacked direction (the surfaces formed by the end plates 80 in the present example) are referred to as block end surfaces Y, and surfaces of the battery block 10 formed by stacking the plurality of battery cells 1, 1 . . . are referred to as stacked block surfaces. That is, two block end surfaces Y and four stacked block surfaces are formed.

The plurality of battery cells 1 are stacked with the cell main surfaces thereof face the same direction. Therefore, two terminal rows 5, 6 are formed on one of the stacked block surfaces of the battery block 10 (see FIG. 4(*a*)). One of the positive electrode terminal 2 and the negative electrode terminal 3 of each of the battery cells 1, 1 . . . is arranged in the stacked direction of the battery cells 1 in the first terminal row 5, and the other terminal 2, 3 of each of the battery cells 1, 1 . . . is arranged in the stacked direction of the battery cells 1 in the second terminal row 6. The plurality of battery cells 1, 1 . . . are stacked such that the positive electrode terminals 2 and the negative electrode terminals 3 are alternately arranged in adjacent battery cells 1. Therefore, when the alternate arrangement of the negative electrode terminals 3 and the positive electrode terminals 2 starts from one end of the one terminal row 5 (the above-described first terminal row), the positive electrode terminals 2 and the negative electrode terminals 3 are alternately arranged in the other terminal row 6 (the above-described second terminal row). That is, the positive electrode terminals 2 and the negative electrode terminals 3 are arranged in reverse orders in the terminal rows 5, 6 when seen from the same end. In addition, since the gas vent hole 4 is arranged between the positive electrode terminal 2 and the negative electrode terminal 3 in each of the plurality of battery cells 1, 1 . . . , a gas vent hole row 7 is constituted by the gas vent holes 4, 4 . . . (see FIG. 4(*a*)) between the two terminal rows 5, 6 (that is, at the center of the cell main surface) in the one of the stacked block surfaces of the battery block 10. Hereinafter, the stacked block surface on which the terminals 2, 3 of the battery cells 1 line up is referred to as the block main surface Z (which corresponds to the first surface of the foregoing battery block). Stacked block surfaces adjacent to the terminal surface are referred to as block side surfaces X, and a stacked block surface that is opposite to the terminal surface is referred to as a block back surface W.

The temperature detecting elements are indicated by the reference numeral 30 in FIG. 2. The elements 30 allow the state detecting circuit 20 to detect the temperature of the battery block 10, thus protecting the battery cells 1 by estimating the SOC and turning off the contactor when the temperature of the battery block 10 increases. The temperature detecting elements 30 are thermally coupled to the block side surfaces X of the battery block 10, and wires extending from the temperature detecting elements 30 are connected to the temperature detecting lines 52 printed on the FPCs 50 constituting the wiring member 70.

The state detecting circuit 20 accommodated in the end plate 80 is constituted by a semiconductor integrated circuit 20*a* formed on a circuit board 20*b*, and has various circuit functions other than the function as the voltage detecting function circuit of each of the battery cells 1, 1 . . . , as described above. For example, an ASIC (an abbreviated form of Application Specific Integrated Circuit) can be used as the state detecting circuit 20. The state detecting circuit 20 is screwed to the circuit holding portions 86 provided in the end plate 80 to be accommodated within the end plate 80 as shown in FIG. 3. That is, the end plate 80 is used as a circuit accommodating housing attached to the frame of the battery block 10. The state detecting circuit 20 is arranged on the block end surface Y that is different from the terminal stacked surface Z.

(2-2) The Wiring Member

The wiring member 70 is used for connecting the battery block 10 and the state detecting circuit 20, and constituted by coupling the bus bars 40 . . . , which are each made of the metal part, for connecting the plurality of battery cells 1, 1 . . . in series and the FPCs 50 having the plurality of voltage detecting lines 51, 51 as shown in FIG. 2.

Figure 5:
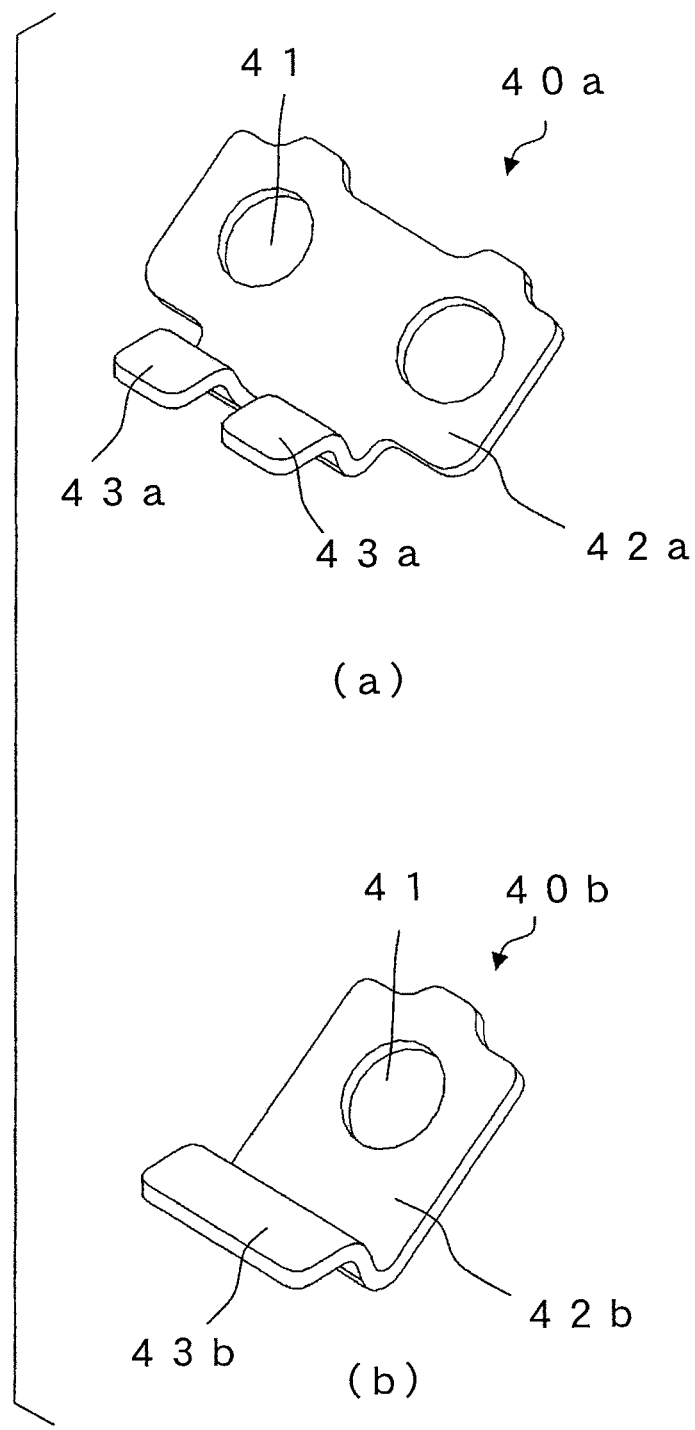
FIG. 5 shows perspective views of bus bars.

Here, description will be made of details of the bus bars. FIG. 5 shows perspective views of the bus bars 40. Seventeen coupling bus bars 40a that each couple the terminals 2, 3 having different polarities of adjacent battery cells 1 of the eighteen battery cells 1, 1 . . . , and two terminal bus bars 40b that are two end terminals of the battery cells at both ends of the series state are used as the bus bars 40.

As shown in FIG. 5(a), the coupling bus bar 40a is formed of the metal part made by punching holes in a metal plate, and includes a coupling member 42a having two through holes 41, 41 and two linking members 43a, 43a each having a tongue shape and provided side by side in the same direction from the coupling member 42a. The coupling member 42a and the linking members 43a of the coupling bus bar 40a are bent according to the angle formed by the terminals 2, 3 of the battery cells 1. That is, the coupling member 42a and the linking members 43a are integrally formed to have the same angle as the angle $\alpha$ between the terminals 2,3 of the battery cells 1 and the block main surface Z. The two through holes 41 are provided in the coupling member 42a. The terminals 2, 3 having male screws formed thereon of adjacent battery cells are fitted in the respective through holes 41, and screwed by mounting hardware having the shape of a nut (not shown). In this manner, the adjacent battery cells 1, 1 are electrically and mechanically coupled to one another in series.

Meanwhile, either or both of the two linking members 43a of the coupling bus bar 40a are connected to a contact pad 51a by reflow soldering, which is connected to an end of the voltage detecting line 51 formed in the FPC 50. The reflow soldering allows for electrical connection of the electrode terminals 2, 3 of the battery cells 1 connected to the coupling bus bar 40a to the state detecting circuit 20 and mechanical coupling between the coupling bus bar 40a and the FPC 50. When both the linking members 43a are coupled to the contact pads 51a, coupling strength between the bus bars 40 . . . and the FPCs 50, which are the wiring member 70, is increased. The reflow soldering is realized by previously supplying solder to a portion to which an electronic component is to be connected on the printed circuit board and heating the portion after arranging the electronic component thereon.

Similarly to the coupling bus bar 40a, the terminal bus bar 40b is formed of the metal part made by punching a hole in a metal plate, and includes a coupling member 42b having one through hole 41 and one linking member 43b having a tongue shape as shown in FIG. 5(b). The coupling member 42b and the linking member 43b of the terminal bus bar 40b are bent according to the angle $\alpha$ formed by the terminals 2, 3 of the battery cells 1. That is, the coupling member 42b and the linking member 43b are integrally formed to have the same angle as the angle between the terminals 2,3 of the battery cells 1 and the block main surface Z. The one through hole 41 is provided in the coupling member 42b. The terminal 2, 3 having a male screw formed thereon of each of the battery cells 1 at ends of the series state is fitted in the through hole 41, and screwed by mounting hardware having the shape of a nut (not shown).

Meanwhile, the linking member 43b is connected to the voltage detecting line 51 formed in the FPC 50 by reflow soldering. The soldering allows for electrical connection of the electrode terminal 2, 3 of the battery cell 1 connected to the terminal bus bar 40b to the state detecting circuit 20 and mechanical coupling between the terminal bus bar 40b and the FPC 50.

As described above, since the angle between the coupling member 42 and the linking member 43 is the same as the angle between the block main surface Z and the terminals 2, 3 of the battery cells 1, the FPC 50 coupled to the bus bars 40 is horizontally supported by the bus bars 40 with respect to the block main surface Z.

The coupling bus bar 40a couples the adjacent terminals 2, 3 in the terminal row 6 to each other as shown in FIG. 4(a). That is, the coupling bus bar 40a connects the adjacent positive electrode terminal 2 and negative electrode terminal 3. More specifically, starting from the negative electrode terminal 3 at one end of the terminal row 5, each two of the terminals 2, 3 in the one terminal row 5 (the upper terminal row 5 in FIG. 4(a)) are coupled by the coupling bus bar 40a. Hereinafter, the coupling bus bars 40a coupled to the one terminal row 5 are referred to as first bus bars. The terminal bus bar 40b is arranged at the at one end of the other terminal row 6 (the lower terminal row 6 of FIG. 4(a)), and each two of the terminals 2, 3 are coupled by the coupling bus bars 40a, starting from the negative electrode terminal 3 of the battery cell 1 adjacent to the positive electrode terminal 2 at the one end. Since the even number of battery cells 1 are provided in the present example, one negative electrode terminal 3 at the other end of the other terminal row 6 remains uncoupled. The terminal bus bar 40b is arranged at the remaining negative electrode terminal 3. Hereinafter, the coupling bus bars 40a, the terminal bus bars 40b coupled to the other terminal row 6 are referred to as second bus bars. The terminals 2, 3 are coupled by the bus bars 40 in the foregoing manner in the battery block in which the positive electrode terminals 2 and the negative electrode terminals 3 are alternately arranged in each of the terminal rows 5, 6 and the arrangement orders of the positive electrode terminals 2 and the negative electrode terminals 3 are opposite in the terminal rows 5, 6, so that the battery block 10 formed by connecting the plurality of battery cells 1 in series is configured. Accordingly, the voltage of the plurality of battery cells 1, 1 . . . connected in series are obtained between the one terminal bus bar 40b and the other terminal bus bar 40b. The terminal bus bar 40b is connected to a terminal bus bar 40b of another battery module 100 through the power line 500, so that the plurality of battery modules 100, 100 are connected in series.

Next, description will be made of the FPCs 50. Two FPCs 50 are arranged along and in parallel with the respective terminal rows 5, 6 (see FIG. 4(a)). The two FPCs 50 are arranged in parallel with the respective terminal rows 5, 6 on outer sides thereof on the block main surface Z. That is, the one FPC 50 (the first FPC) is arranged along the one terminal row 5 (the first terminal row) on the opposite side to the other terminal row 6, and the other FPC 50 (the second FPC) is arranged along the other terminal row 6 (the second terminal row) on the opposite side to the one terminal row 5, so that the FPCs 50 are arranged not to overlap the gas vent hole row 7 on the same plane. The two FPC 50 are each bent on the end plate 80 (at the end on the block main surface Z of the battery block 10 in the stacked direction), and formed such that a spacing L1 is smaller than a spacing L2 between the two coupling fixtures 90 screwed in the corners of the end plate 80 (see FIG. 4(b)). More specifically, the two FPCs 50 are bent twice. The FPCs 50 are bent once at a right angle such that the FPCs come in close proximity to each other at a boundary between the block main surface Z and the block end surface Y, and again bent at a right angle such that the two FPCs 50 extend parallel to each other. Then, the two FPCs 50 are bent at a right angle along the block end surface Y to pass through the respective FPC insertion cutouts 81 (see FIG. 3(a)) formed on the outer peripheral surface (surface forming the thickness of the end plate 80 on the side of the block main surface Z, and the one ends of the two FPCs 50 are coupled to the state detecting circuit 20 by pulse heat bonding. The pulse heat bonding is a bonding method realized by attaching a thermocouple or the like at the tip of a heater electrode made of a heat generating material and heating the heater electrode while managing heat at the tip of the heater to perform thermocompression bonding, thermal pressure welding or the like for soldering of the FPCs. While each FPC 50 and the state detecting circuit 20 are coupled to each other by the pulse heat bonding, each FPC 50 may be coupled to the state detecting circuit 20 by another method such as use of an electrically conductive adhesive. The FPCs 50 are bent in the foregoing manner, so that the two FPCs 50 are arranged to extend from the block main surface Z of the battery block to the block end surface Y on which the state detecting circuit 20 is arranged.

Figure 6:
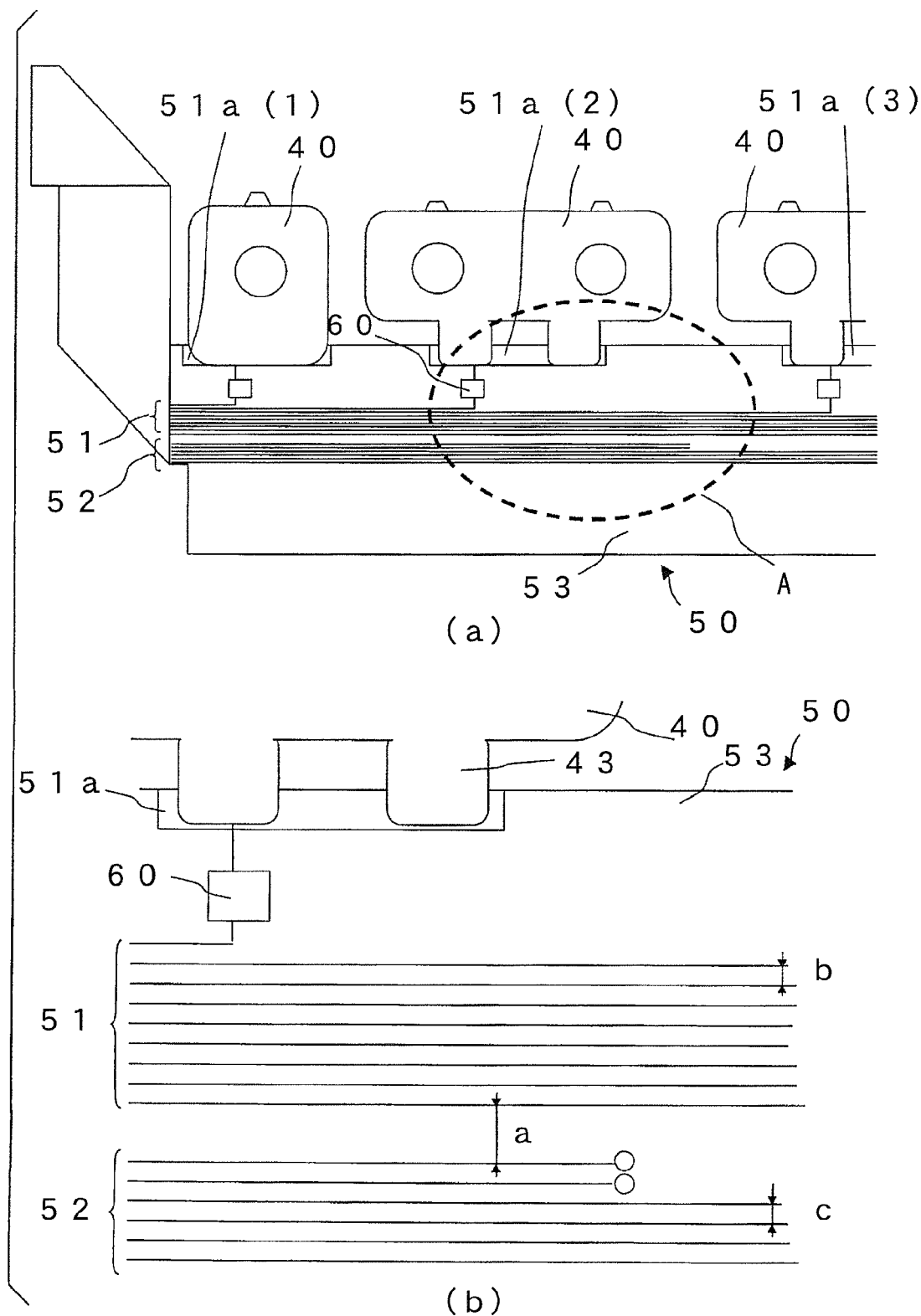
FIG. 6 is a wiring diagram of an FPC.

FIG. 6 is a wiring diagram of the FPC 50. As shown in FIG. 6(a), the FPC 50 is formed by integrally forming the plurality of voltage detecting lines 51 and the plurality of temperature detecting lines 52 on a substrate made of a strip-shaped flexible material 53. The bus bars 40 are arranged in different manners in the terminal rows 5, 6. Therefore, the plurality of voltage detecting lines for connecting the terminals 2, 3 constituting the one terminal row 5 (the first terminal row) to the state detecting circuit 20 are formed in a given wiring pattern in the one FPC 50 (the first FPC), and the plurality of voltage detecting lines for connecting the terminals 2, 3 constituting the other terminal row 6 (the second terminal row) to the state detecting circuit 20 are formed in a wiring pattern that is different from the wiring pattern of the one FPC 50 in the other FPC 50 (the second FPC). FIG. 6(b) is an enlarged view of a portion surrounded by the dotted line A of FIG. 6(a). As shown in this drawing, the voltage detecting lines 51 and the temperature detecting lines 52 are formed on the flexible material 53 such that a spacing b between the voltage detecting lines 51 is smaller than a spacing a between the voltage detecting line 51 and the temperature detecting line 52. The voltage detecting lines 51 and the temperature detecting lines 52 are formed on the flexible material 53 such that a spacing c between the temperature detecting lines 52 is smaller than the spacing a between the voltage detecting line 51 and the temperature detecting line 52. The voltage detecting lines 51 and the temperature detecting lines 52 are formed on the flexible material 53 in this manner, so that the distance between the two detecting lines having a large potential difference is increased. Thus, even though one detecting line is disconnected, a current is prevented from flowing to the other detecting line due to short circuit, thus protecting the state detecting circuit 20. Particularly, since disconnection tends to occur at the end of the FPC (the end connected to the state detecting circuit 20), the foregoing configuration is especially effective.

The plurality of contact pads 51a are provided on one longitudinal side of the flexible material 53 forming the FPC 50, and the bus bar 40 is coupled to each contact pad 51a by reflow soldering. At this time, the first bus bars are coupled to the first FPC and the second bus bars are coupled to the second FPC by soldering, constituting the first wiring member 70 and the second wiring member 70, respectively. The plurality of voltage detecting lines 51 are formed in parallel with one another in a longitudinal direction from the one end of the flexible material 53. The voltage detecting lines 51 are sequentially bent in the order of closer voltage detecting lines 51 to the one longitudinal side of the flexible material 53 at a right angle at respective positions corresponding to the contact pads 51a that are closer to the one end of the flexible material 53, and reach the contact pads 51a. This causes the one ends of the voltage detecting lines 51 to be connected to the corresponding contact pads 51a. That is, the voltage detecting lines 51 are bent in the order of closer voltage detecting lines 51 to the one longitudinal side of the flexible material 53 at a right angle at the positions corresponding to the contact pads 51a(1), 51a(2), 51a(3) . . . , and connected to the contact pads 51a, respectively.

Thus, the reflow soldering of the bus bars 40 to the contact pads 51a of the FPC 50 causes the voltage detecting lines 51 and the bus bars 40 to be electrically connected to one another. The other ends of the voltage detecting lines 51 are arranged on the one end side of the flexible material 53 forming the FPC 50. The state detecting circuit 20 is coupled to the one end of the flexible material 53 by the pulse heat bonding, thereby connecting the voltage detecting lines 51 to the state detecting circuit 20.

The bus bars 40 are connected to the voltage detecting lines 51, respectively, and the voltage detecting lines 51 are each connected to the state detecting circuit 20 in this manner, so that the terminals 2, 3 of the battery cells 1 are electrically connected to the state detecting circuit 20 through the FPCs 50, and the voltages of the battery cells 1 can be detected by the state detecting circuit 20.

The temperature detecting lines 52 are linearly formed on the flexible material 53 to extend from the one end of the FPC 50 to respective positions in which the temperature detecting elements 30 are connected in the stacked direction of the battery block (the longitudinal direction of the FPC 50). In the temperature element attachment positions, the temperature detecting lines 52 are connected to wires of the temperature detecting elements 30 by reflow soldering. The other ends of the temperature detecting lines 52 are arranged at the one end of the FPC 50, and the state detecting circuit 20 and the one end of the FPC 50 are coupled to each other by reflow soldering, so that the state detecting circuit 20 is connected to the temperature detecting lines 52. The temperature detecting elements 30 are connected to the temperature detecting lines 52, respectively, and the temperature detecting lines 52 are each connected to the state detecting circuit 20, so that the temperature elements 30 are connected to the state detecting circuit 20 (the temperature detecting circuit), and the temperature can be detected in the state detecting circuit 20.

In this manner, the first wiring member 70 formed by coupling the first bus bars 40 to the first FPC 50 and the second wiring member 70 formed by coupling the second bus bars 40 to the second FPC 50 are used in the present example. Therefore, the first bus bars 40 connect the adjacent positive electrode terminals 2 and negative electrode terminals 3 to one another in the terminal row 5 and the voltage detecting lines of said first FPC connect the first bus bars to the state detecting circuit 20, and the second bus bars 40 connect the adjacent positive electrode terminals 2 and negative electrode terminals 3 in the terminal row 6 and the voltage detecting lines of the second FPC connect the second bus bars to the state detecting circuit 20, so that the plurality of battery cells 1 are connected in series. The voltage detecting lines 51 of the first and second FPCs 50 connect the bus bars 40 to the state detecting circuit 20, thus connecting the terminal rows 5, 6 to the state detecting circuit 20.

(2-3) The PTC Elements

Figure 7:
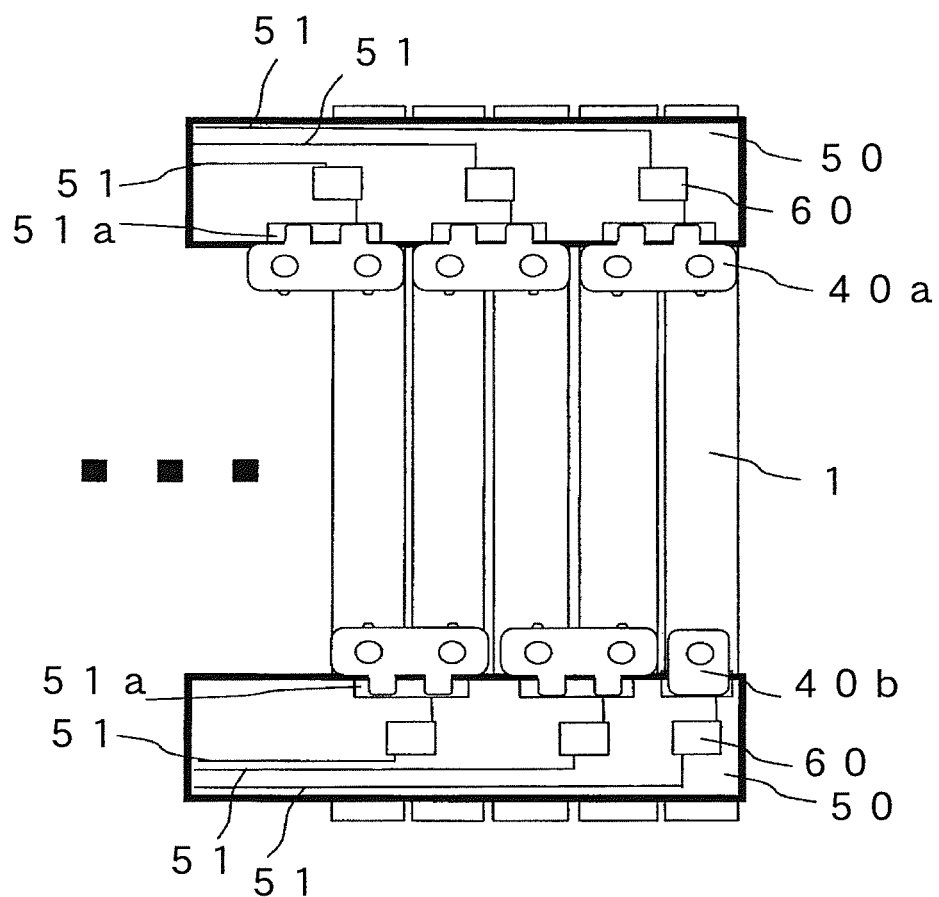
FIG. 7 is a top view of part of the battery module.

FIG. 7 is a top view of part of the battery module. Only three voltage detecting lines 51 of each FPC 50 connected to the bus bars 40 are shown, and the other voltage detecting lines 51 are not shown in FIG. 7 for simplification. In addition, the temperature detecting lines 52 are not shown in FIG. 7 for simplification. As shown in FIG. 7, the PTC element 60 is interposed in each of the voltage detecting lines 51 of the FPCs 50. The PTC element 60 increases its resistance according to temperature rise. The PTC element 60 increases its resistance by self-heating when a larger current than a given current flows therethrough. When the voltage detecting line 51 is disconnected in a portion closer to the state detecting circuit 20 than the PTC element 60 and the battery cell 1 is short circuited via the voltage detecting line 51, the current flowing through the voltage detecting line 51 can be suppressed to protect the battery cell 1 from a large current caused by the short circuit.

The PTC element is arranged on the battery cell 1, so that the PTC element 60 is arranged on the battery cell 1. Thus, the resistance of the PTC element 60 is increased to cause voltage drop in the voltage detected by the state detecting circuit 20 in the case of the temperature rise of the battery cell 1, so that an abnormality in the temperature of the battery cell 1 can be detected.

The PTC element 60 is arranged in the position where the bus bar 40 is connected in the longitudinal direction of the FPC 50, thereby causing deflection to unlikely to occur in the portion of the FPC 50 in which the PTC element 60 is arranged because of rigidity of the bus bar 40. Thus, the PTC element 60 can reduce effects (variation in resistance, separation of a solder portion or the like) due to the deflection of the FPC 50.

(2-4) The Bus Bars

A given bus bar 40 can be used as a shunt resistance for measuring the current flowing through the battery block 10, and the current flowing through the battery block 10 can be detected based on a voltage difference of the bus bar 40. This allows the current flowing through the battery block 10 to be detected without using a separate resistance element that is different from the bus bar 40.

Figure 8:
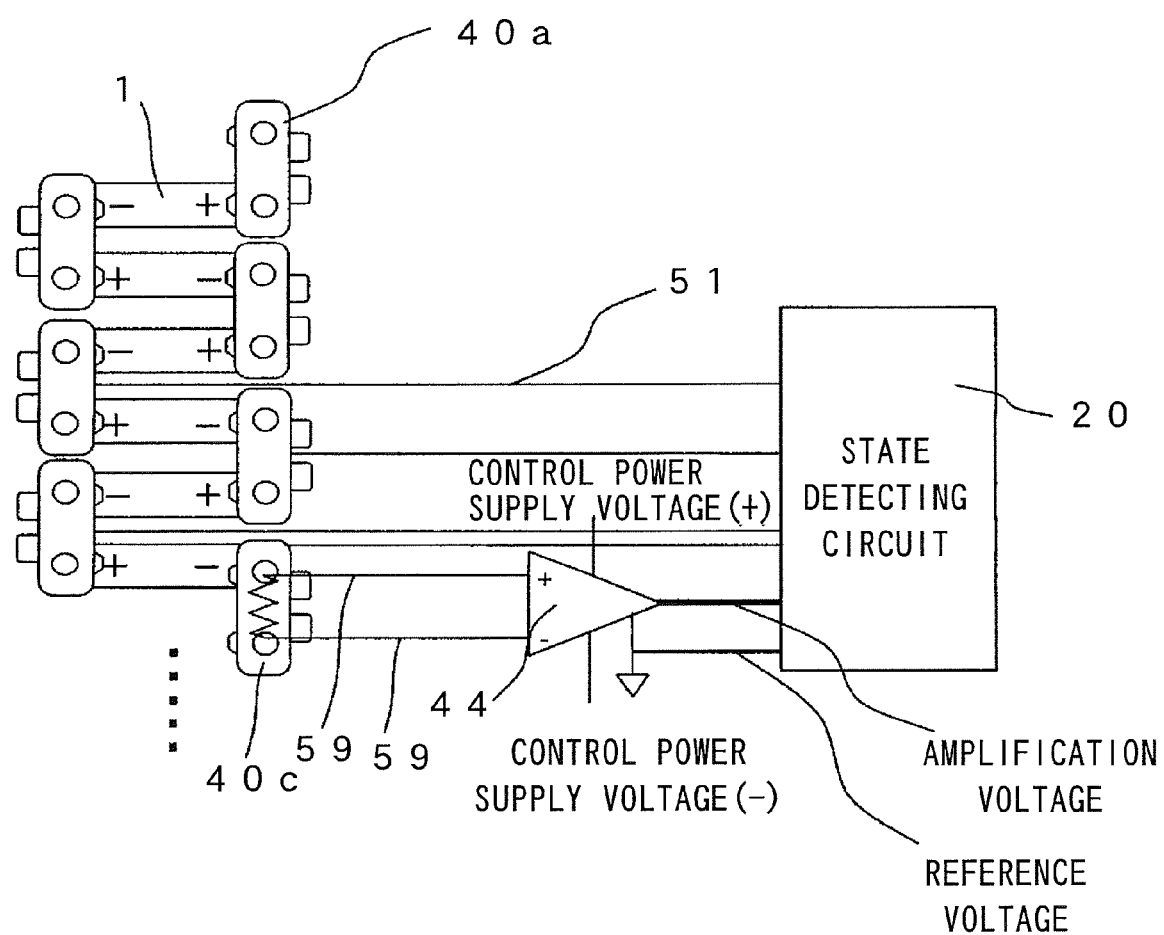
FIG. 8 is a circuit diagram employed when the bus bar is used as a shunt resistance.
Figure 9:
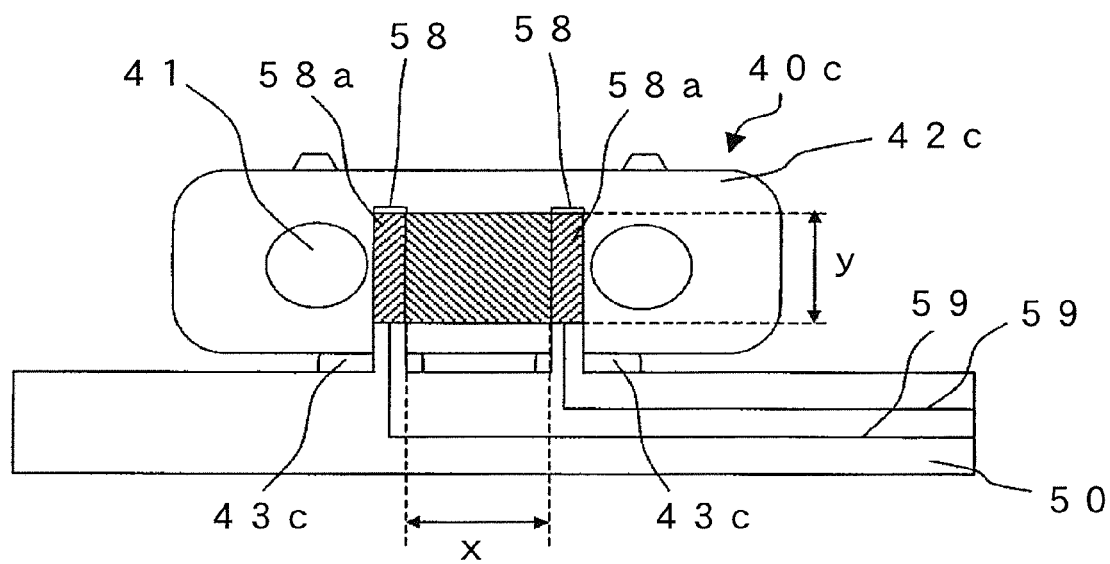
FIG. 9 is a diagram showing the bus bar used as the shunt resistance.

Description will be made of current detection using the given bus bar 40 with reference to the drawings. FIG. 8 is a circuit diagram employed when the bus bar is used as the shunt resistance. FIG. 9 is a diagram showing the bus bar used as the shunt resistance. Similarly to the coupling bus bar 40a, the bus bar for current detection 40c is composed of a coupling member 42c and linking members 43c, and two through holes 41 are provided in the coupling member 42c. The terminals 2, 3 of adjacent battery cells are inserted in the through holes 41, so that the bus bar for current detection 40c is coupled to the battery cell 1. The two linking members 43c, to which current detecting lines 59 are connected, respectively, are symmetrically arranged with respect to the center axis of the coupling member 42c. The current detecting lines 59 are connected to the state detecting circuit 20.

The state detecting circuit 20 detects voltage between the current detecting lines 59 connected to the linking members 43c, and detects the current flowing through the battery block 10 based on the detected voltage value. Since the voltage between the current detecting lines 59 is small, the state detecting circuit 20 amplifies the voltage value using an operational amplifier 44 interposed in the current detecting line 59 to detect the voltage.

The current value is calculated based on Ohm's law. That is, I=V/R, where I represents the current flowing through the battery block, V represents the voltage between the voltage detecting lines 51 connected to the linking members 43c, and R represents resistance between the current detecting lines 59 connected to the linking members 43c.

The resistance R can be obtained by calculation of R=v·r, where v represents the volume of a flow path of the current flowing between the current detecting lines 59, and r represents resistivity ($\Omega/m^3$) of the material of the bus bar for current detection 40c.

As shown in FIG. 9, when the bus bar for current detection 40c is coupled to bus bar coupling portions 58a of the FPC 50 by reflow soldering, the volume V can be easily calculated. More specifically, the bus bar for current detection 40c and the FPC 50 are coupled to each other in the following manner. Two projections 58 having the bus bar coupling portions 58a, respectively, project from the longitudinal side of the FPC 50 at a right angle to the longitudinal side, and the two projections 58 are provided in the FPC 50 with a spacing x therebetween that is smaller than a spacing between the two through holes 41. The bus bar coupling portions 58a are each provided to have a given length y in a direction in which the projections 58 project, and the entire bus bar coupling portions 58a are reflow soldered to the two projections 58 at the spacing x between the two through holes 41 of the bus bar for current detection 40. Accordingly, v=x·y·z, where z represents the thickness of the bus bar for current detection 40c.

Since the current detecting lines 59 are formed to extend from the bus bar coupling portion 58a to the one end of the FPC and the one end of the FPC 50 is reflow soldered to the state detecting circuit 20, the state detecting circuit 20 is connected to the bus bar for current detection 40c through the current detecting lines 59, thereby allowing the state detecting circuit 20 to calculate the current flowing through the battery block 10.

Also, the resistance R can be calculated using R=ρ·l/S, where ρ represents resistivity ($\Omega/m$) of the material of the bus bar for current detection 40c, S represents the cross sectional area ($m^2$) of the flow path of the current flowing between the current detecting lines 59 that can be obtained using S=y·z, and l represents the length (m) of the flow path of the current flowing between the current detecting lines 59 that can be obtained using l=x.

(3) Manufacturing Method

The configuration of the battery module 100 will be described in the foregoing paragraphs.

Hereinafter, description will be made of a method suitable for manufacturing the battery module 100 based on the exploded perspective view of FIG. 10 with reference to FIGS. 1 to 9.

The wiring member 70 formed by coupling the FPCs 50 and the bus bars 40 as shown in FIG. 10 can be used in the method of assembling the battery module of the embodiment of the present invention. As described above, the FPCs 50 and the bus bars 40 can be electrically and mechanically coupled to one another by reflow soldering the contact pads 51a of the FPCs 50 and the connecting members 43 of the bus bars 40. The steps are more specifically described below.

1. In the wiring member forming step for forming the wiring member 70 by coupling the FPCs 50 and the bus bars 40, 40, . . . to one another, the FPCs 50 and the bus bars 40, 40, . . . can be coupled to one another by reflow soldering as described above.

2. In the step of coupling the FPCs 50 of the wiring member 70 to the state detecting circuit 20, terminals of the state detecting circuit 20 can be coupled to the terminals of the FPCs 50 by the pulse heat bonding.

3. In the step of coupling the bus bars 40 of the wiring member 70 to the positive electrode terminals 2 and the negative electrode terminals 3 of the battery cells 1 of the battery block 10, the terminals 2, 3 having the male screws formed thereon, respectively, are inserted in the through holes 41 of the bus bars 40 and each screwed by the mounting hardware having the shape of a nut. In this case, the two kinds of bus bars 40, that is, the coupling bus bars 40a and the terminal bus bars 40b can be screwed.

4. In the step of attaching the state detecting circuit 20 to the battery block 10, the state detecting circuit 20 can be accommodated in the space surrounded by the upper wall portion 82 and the lower wall portion 84 of the end plate 80, and the vicinity of the four corners of the circuit board 20b constituting the state detecting circuit 20 can be screwed.

The battery module 100 is manufactured in the foregoing order, so that the step of the thermal processing such as reflow soldering for connecting the FPCs 50 and the bus bars 40 to one another can be performed while the battery block 10 is not present. This suppresses degradation in performance or damage to be caused by the thermal processing of the battery cells 1. The foregoing steps can be performed in a different order; the bus bars 40 can be connected to the FPCs 50 after the bus bars 40 are connected to the terminals 2, 3 of the battery cells 1 and the FPCs 50 are connected to the state detecting circuit 20. In this case, however, reflow soldering is not preferably employed since the battery block 10 is exposed to the thermal processing such as reflow soldering in the step of connecting the bus bars 40 to the FPCs 50. Therefore, a connecting method not involving thermal processing such as a connecting method using an electrically conductive adhesive can be employed.

When the bus bars 40 are connected to the FPCs 50 and then connected to the terminals 2, 3 of the battery cells 1, the PTC elements 60 and the temperature detecting elements 30 can also be connected to the FPC 50 by reflow soldering at the same time as connection of the bus bars 40. As shown in FIG. 6, when the components to be reflow soldered onto the FPC 50 such as the PTC elements 60 and the bus bars 40 are provided on the same plane, the components to be coupled to the FPC 50 can be coupled by performing reflow soldering once, thus reducing the number of manufacturing steps.

The FPCs 50 made of the flexible material having the plurality of voltage detecting lines formed thereon are used as the wiring for electrically connecting the terminals 2, 3 of said battery cells 1 to said state detecting circuit 20, thereby combining the voltage detecting lines for detecting the voltages of the plurality of battery cells in a simple configuration. In addition, using the flexible material provides a buffering effect, which absorbs dimension errors to be caused during manufacture when the FPCs 50 are attached.

The end plate 80, to which the state detecting circuit 20 is attached, and the plurality of battery cells 1 overlap in the one direction. Thus, the wiring members 70 extend in the stacked direction, so that the wiring members 70 extend over all the battery cells 1, and the two wiring members 70 measuring the battery cells 1 on the plus side and the minus side can detect the voltages of the battery cells 1, thereby reducing the number of the wiring members 70.

The cutouts are formed in the outer peripheral portion of the end plate 80 and the FPCs 50 are inserted in the respective cutouts, thus inhibiting the FPCs 50 from projecting in the stacked direction. This prevents the FPCs 50 from being hit and damaged. Also, the FPCs 50 are fitted in the respective cutouts even when another battery module is placed on the side of the end plate 80. This allows the another battery module to be placed in a closer position, realizing space saving.

The terminals 2, 3 of the plurality of battery cells 1, 1 . . . are arranged in the stacked direction, and the FPCs are arranged parallel to the stacked direction. Since the FPCs can be arranged along and in parallel with the terminal rows 5, 6 composed of the battery cells 1, each FPC can be formed in a strip shape. This improves the yields of manufacture of the FPCs 50.

Each FPC 50 is bent at the end of the battery block. Thus, when the FPC 50 is arranged to extend from one surface to another surface; for example, when the FPC 50 is bent to extend from the block main surface Z to the block end surface Y, the FPC 50 can be avoided from overlapping a component (an electrically conductive component such as the coupling fixtures 90) that should not overlap the FPC 50 at the time of wiring of the FPC 50 on the another surface without change in the shape design of the FPC 50.

The wiring member 70 is composed of the bus bars 40 and the FPCs 50, so that the plurality of battery cells 1 are connected in series and the terminals 2, 3 of the battery cells 1 can be electrically connected to the voltage detecting lines 51 by a simple operation of connecting the wiring member 70 between the terminals 2, 3 of the battery cells 1 and the state detecting circuit 20.

The gas vent holes 4 are arranged not to overlap the FPCs 50 in the same plane, so that a gas of high temperature ejected from the gas vent holes 4 does not come in direct contact with the FPCs 50. This suppresses degradation of the FPCs 50 to be caused by heat of the gas.

The temperature detecting lines 52 and the voltage detecting lines 51 can be combined by being formed on the flexible material 53 that forms the FPC 50, thereby preventing complicated wiring. Moreover, since both the temperature detecting lines 52 and the voltage detecting lines 51 are fixed to the flexible material 53, short circuit can be prevented even though either lines are disconnected in the middle.

(4) Modifications

While the details of the embodiment of the present invention are described in the foregoing paragraphs, the present invention is not limited to the above-described embodiment. Various modifications can be made within the technical scope described in scope of claim for patent. Description will be made of modifications with reference to the drawings.

Figure 11:
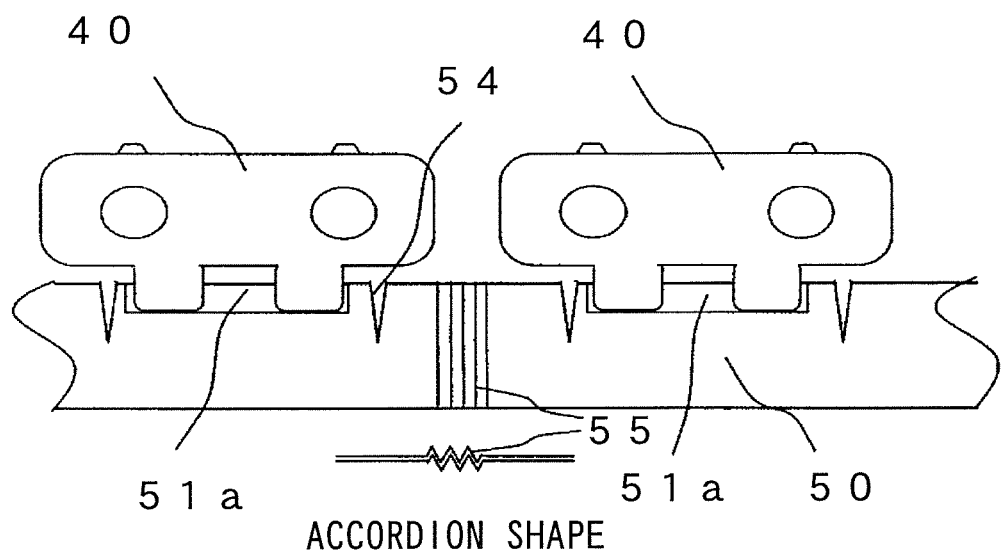
FIG. 11 is a diagram showing a modification of the FPC.

FIG. 11 is a diagram showing a modification of the FPC. As shown in FIG. 11, cutouts 54 may be provided in portions of the FPC 50 between the bus bars 40 connected to the FPC 50. An accordion shaped portion 55 made by forming a portion of the FPC 50 between the bus bars 40 connected to the FPC 50 in the shape of an accordion may be provided as shown in FIG. 11. This allows the bus bars 40 and the FPC 50 to be attached to the battery block 10 while absorbing an error even when the error occurs in attachment of the bus bars 40. In the manufacturing method described in the present example, even when the FPC 50 is deformed because of an external force during attachment of the wiring member 70, the accordion shaped portion 55 and the cutouts 54 provide a buffering effect, thereby allowing the wiring member 70 to be easily attached.

FIG. 12 is a diagram showing a modification of attachment of the PTC element. As shown in FIG. 12, the bus bar 40 and the PTC element 60 may be formed on the opposite surfaces of the FPC 50, respectively. This allows the PTC element 60 to be fixed above the bus bar 40 at the time of reflow soldering of the PTC element, the FPC and the bus bar. Since deflection is unlikely to occur in the PTC element 60 because of rigidity of the bus bar 40, the PTC element 60 can be less subjected to effects (variation in resistance, separation of a solder portion or the like) due to deflection of the FPC 50.

Figure 13:
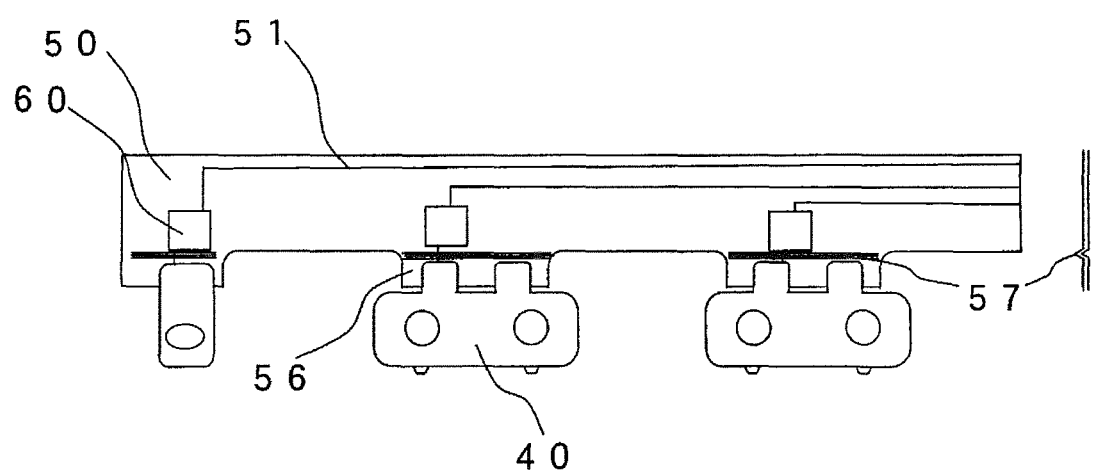
FIG. 13 is a diagram showing a modification regarding the bus bar.

FIG. 13 is a diagram showing a modification regarding the bus bar. While each of the through holes 41 formed in the bus bars 40 has the circular shape in the present example, each of the through holes 41 may be formed in an elliptical shape as shown in FIG. 13. The elliptical through hole 41 suppresses positional shift of the bus bar 40 attached to the FPC 50 in the direction of the major axis of the elliptical shape. Moreover, two elliptical through holes 41 whose major axes are perpendicular to each other formed in the bus bar 40 suppress positional shift of the bus bar 40 attached to the FPC 50 on a plane surface. Furthermore, a convex portion 56 is formed at a position to which each bus bar 40 is attached in the FPC 50, and the FPC 50 is accordion-folded at the convex portion, thereby suppressing positional shift of the FPC 50 in the width direction.

While the FPCs 50 are provided on the stacked block surface (block main surface Z) that is the same surface on which the gas vent row is formed in the present example, the FPCs 50 may be arranged on another stacked block surface. This also allows the FPCs 50 and the gas vent hole row 7 not to overlap in the same plane and suppresses degradation of the FPCs 50 to be caused by the gas of high temperature ejected from the gas vent holes 4.

While the battery module is configured such that the state detecting circuit 20 is accommodated in the end plate 80 in the present example, a circuit accommodating housing having a block shape that is the same shape as the battery cell 1 may be separately formed and placed between the battery cells 1.

While the eighteen battery cells 1 are provided in the present example, a different number of the battery cells 1 may be provided. The number of the battery cells 1 is suitably changed according to the magnitude of a load to which power is supplied by the battery block 10, for example.

While description is not particularly made of insulation between the plurality of battery cells 1, in the present example, insulation processing such as providing an insulating plate between the battery cells is required when the surface of each battery cell 1 is formed of metal. In this case, a spacer or the like instead of the insulating plate is preferably sandwiched between the battery cells 1. This forms clearances between the block side surfaces, allowing cool air passing from one block side surface to the other block side surface to flow between the battery cells 1. When the FPC 50 is arranged on the block main surface, there exists nothing that blocks cool air on the block side surface, thus allowing more cool air to flow.

When the end plate 80 is made of metal, an insulating member made of a resin material, for example, is preferably arranged between the end plate 80 and the battery cell 1.

While the FPCs 50 and the bus bars 40 are connected to one another by reflow soldering in the present example, the present invention is not limited to this. The FPCs 50 and the bus bars 40 may be connected to one another by another method. For example, the FPCs 50 and the bus bars 40 may be connected by being screwed to one another.

While the terminals 2, 3 of the battery cells 1 are screwed to the bus bars 40a, 40b by the mounting hardware each having the shape of a nut while being fitted in the bus bars 40a, 40b, thereby being fixed to the bus bars 40a, 40b in the present example, the present invention is not limited to this. The terminals 2, 3 may be fixed to the bus bars 40a, 40b by another method. For example, the terminals 2, 3 of the battery cells 1 may be welded to the bus bars 40a, 40b by lasering while being fitted in the bus bars 40a, 40b, thereby being fixed to the bus bars 40a, 40b.

While the PTC elements 60 are inserted in the voltage detecting lines 51, respectively, to immediately solve a state of occurrence of a large current to prevent the battery module 100 from being damaged in the present example, the width (diameter) of a portion of each voltage detecting line 51 may be set smaller than other portions instead of arranging the PTC elements 60. In the case, the voltage detecting lines 51 function as fuses, and the portions of the small width of the voltage detecting lines 51 melt in the case of occurrence of a large current. This causes the state of flow of the large current to be immediately solved, and prevents the battery module 100 from being damaged.

Figure 14:
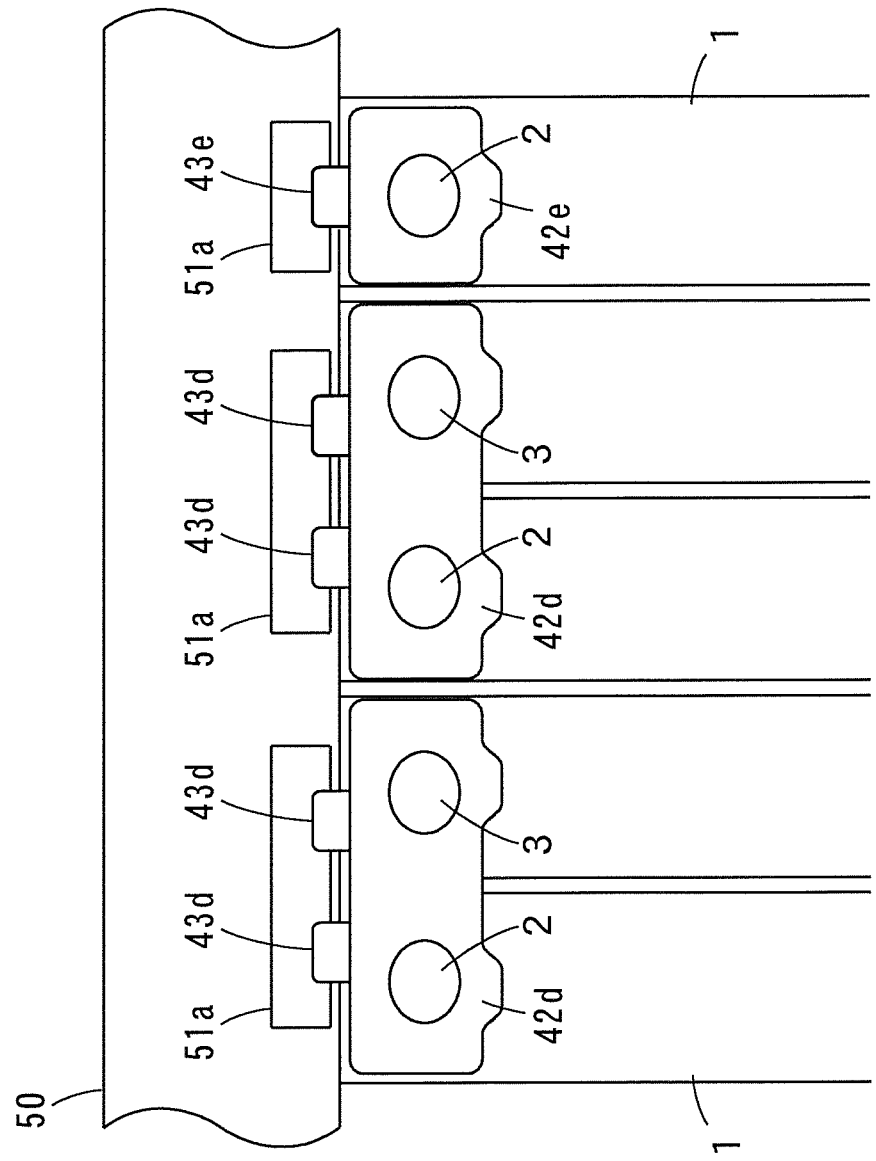
FIG. 14 is a schematic plan view showing an example in which coupling members and linking members are separately provided.

While the bus bars 40a, 40b made by integrally forming the coupling members 42a, 42b to which the terminals 2, 3 of the battery cells 1 are fitted and the linking members 43a, 43b connected to the FPC 50 are used in the present example, the coupling members and the linking members may be separately provided. FIG. 14 is a schematic plan view showing an example in which coupling members and linking members are separately provided. In the example of FIG. 14, the terminals 2, 3 of adjacent battery cells 1 are fitted in the coupling member 42d, and the terminal 2 (terminal 3) positioned at the end is fitted in the coupling member 42e. The coupling member 42d is connected to the contact pad 51a on the FPC 50 through the pair of linking members 43d, and the coupling member 42e is connected to the contact pad 51a on the FPC 50 through the linking member 43e. In this case, the coupling member 42d is bonded to the linking members 43d by soldering, welding or the like.

Figure 15:
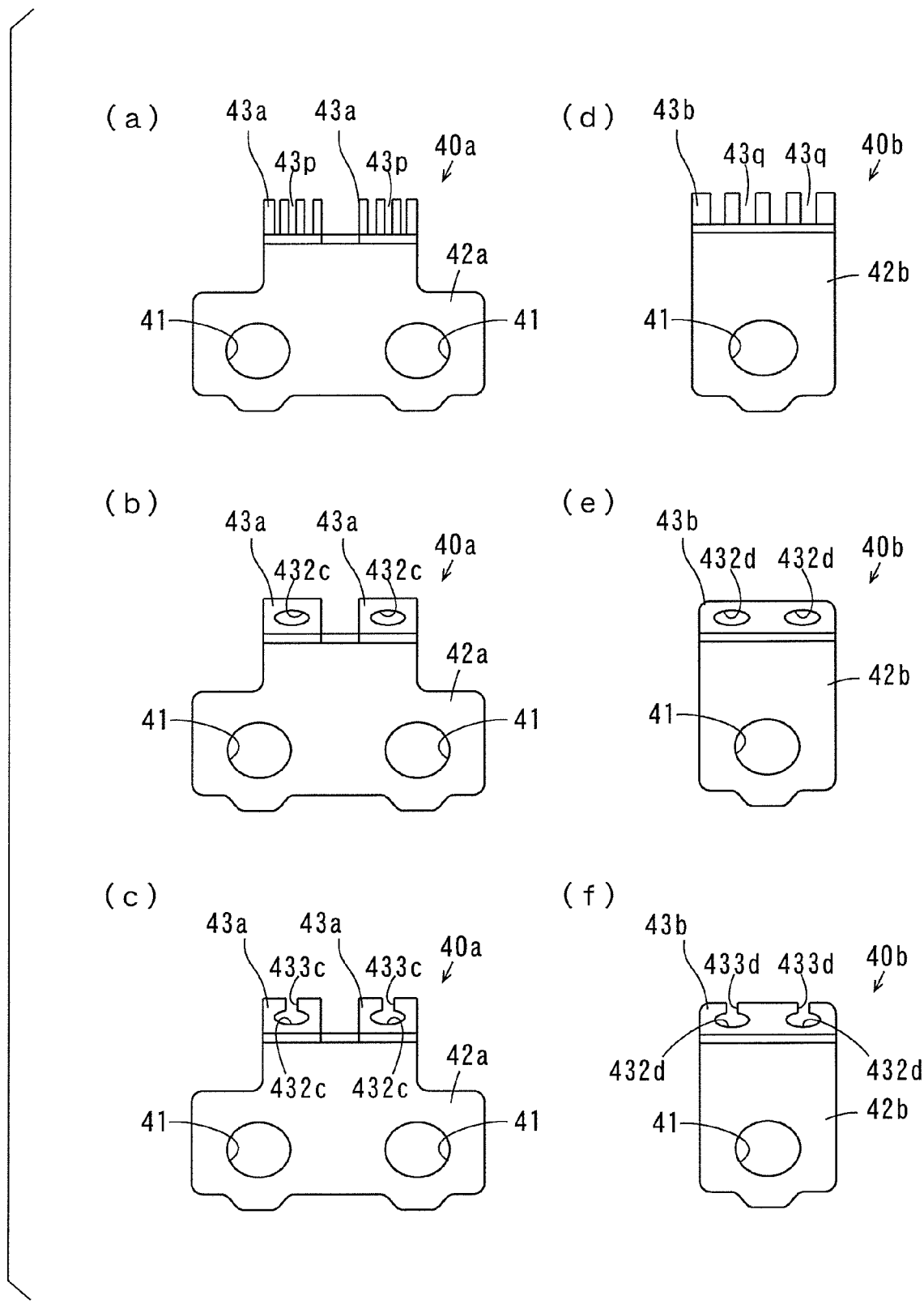
FIG. 15 shows plan views of other modifications of the bus bars.

FIG. 15 shows plan views of other modifications of the bus bars 40. In FIG. 15, (a) to (c) show other modifications of the coupling bus bar 40a, and (d) to (f) show other modifications of the terminal bus bar 40b. The coupling bus bars of (a) to (c) in FIG. 15 and the terminal bus bars of (d) to (f) in FIG. 15 are described by referring to differences from the coupling bus bar 40a and the terminal bus bar 40b shown in FIG. 5.

In the coupling bus bar 40a of FIG. 15(a), each linking member 43a is formed in the shape of a comb. More specifically, a plurality of linear cutouts 43p are formed to inwardly extend from the tip of the linking member 43a. Similarly, the linking member 43b is formed in the shape of a comb in the terminal bus bar 40b of FIG. 15(d). More specifically, a plurality of cutouts 43q are formed to inwardly extend from the tip of the linking member 43b.

In the coupling bus bar 40a of FIG. 15(b), a circular opening 432c is formed in each linking member 43a. In the terminal bus bar 40b of FIG. 15(e), a pair of circular openings 432d is formed in the linking member 43b.

In the coupling bus bar 40a of FIG. 15(c), a circular opening 432c and a cutout 433c linearly extending from the opening 432c to the tip of the linking member 43a are formed in each linking member 43a. In the terminal bus bar 40b of FIG. 15(f), a pair of circular openings 432d and a pair of linear cutouts 433d linearly extending from the pair of openings 432d, respectively, to the tip of the linking member 43b are formed in the linking member 43b.

When the bus bars 40a, 40b of (a) to (f) in FIG. 15 are connected to the FPC 50, a contact area between each of the linking members 43a, 43b and the FPC 50 is smaller than that when the bus bars 40a, 40b of FIG. 5 are connected to the FPC 50. In this case, connectivity between the bus bars and the FPC 50 is improved.

More specifically, when the bus bars 40a, 40b are connected to the FPC 50 by soldering, different coefficients of thermal expansion among the bus bars 40a, 40b, the FPC 50 and the solder cause distortion in the bus bars 40a, 40b, the FPC 50 and the solder because of temperature change. Particularly, the different coefficients of thermal expansion between the bus bars 40a, 40b and the FPC 50 cause significant distortion in the solder between the bus bars 40a, 40b and the FPC 50. Moreover, vibrations may twist the bus bars 40a, 40b and the FPC 50. Also in this case, significant distortion occurs in the solder, thereby forming a crack such as a break in the solder. This results in poor connection between the bus bars 40*a*, 40*b* and the FPC 50.

Larger contact areas between the bus bars 40*a*, 40*b* and the FPC 50 cause greater distortion to occur in the solder. Therefore, using the bus bars 40*a*, 40*b* of (*a*) to (*f*) in FIG. 15 reduces the contact areas between the bus bars 40*a*, 40*b* and the FPC 50. This causes distortion to be unlikely to occur between the bus bars 40*a*, 40*b* and the FPC 50. Even when distortion occurs, stress due to the distortion is easily relieved. This suppresses poor connection between the bus bars 40*a*, 40*b* and the FPC 50 and improves connectivity between the bus bars 40*a*, 40*b* and the FPC 50.

The length, width and direction of each of the cutouts 43*p*, 43*q* formed in the linking members 43*a*, 43*b* may be suitably changed in the coupling bus bar 40*a* of FIG. 15(*a*) and the terminal bus bar 40*b* of FIG. 15(*d*). In the coupling bus bar 40*a* of FIG. 15 (*b*) and the terminal bus bar 40*b* of FIG. 15(*e*), the shape of each of the openings 432*c*, 432*d* formed in the linking members 43*a*, 43*b* is not limited to the circular shape. The shape may be another shape such as a triangular shape or a quadrangular shape. Two or more openings 432*c* may be formed in the linking member 43*a*, and one or three or more openings 432*d* may be formed in the linking member 43*b*. In the coupling bus bar 40*a* of FIG. 15(*c*), two or more sets of openings 432*c* and cutouts 433*c* may be formed in the coupling member 43*a*. In the terminal bus bar 40*b* of FIG. 15(*f*), one set or three or more sets of openings 432*d* and cutouts 433*d* may be formed in the linking member 43*b*.

Similarly to the example shown in FIG. 14, the coupling members 42*a*, 42*b* and the linking members 43*a*, 43*b* may be separately provided in the bus bars 40*a*, 40*b* of (*a*) to (*f*) in FIG. 15.

While the positive electrode terminals 2 and the negative electrode terminals 3 of the plurality of battery cells 1 are connected to the conductor lines 51 provided in the FPC 50 through the bus bars 40, 40*a* in the present example, the present invention is not limited to this. The positive electrode terminals 2 and the negative electrode terminals 3 of the plurality of battery cells 1 may be directly connected to the conductor lines 51 provided in the FPC 50 not through the bus bars 40, 40*a*, or the positive electrode terminals 2 and the negative electrode terminals 3 of the plurality of battery cells 1 may be connected to the conductor lines 51 provided in the FPC 50 through other conductor lines or conductor materials.

While the temperature detecting elements 30 are attached to the block side surfaces X of the battery block 10 in the present example, the temperature detecting elements 30 may be attached onto the FPCs 50.

[2] Second Embodiment

Next, description will be made of a battery system according to a second embodiment of the present invention by referring to differences from the foregoing battery system 1000.

(1) Battery System

Figure 16:
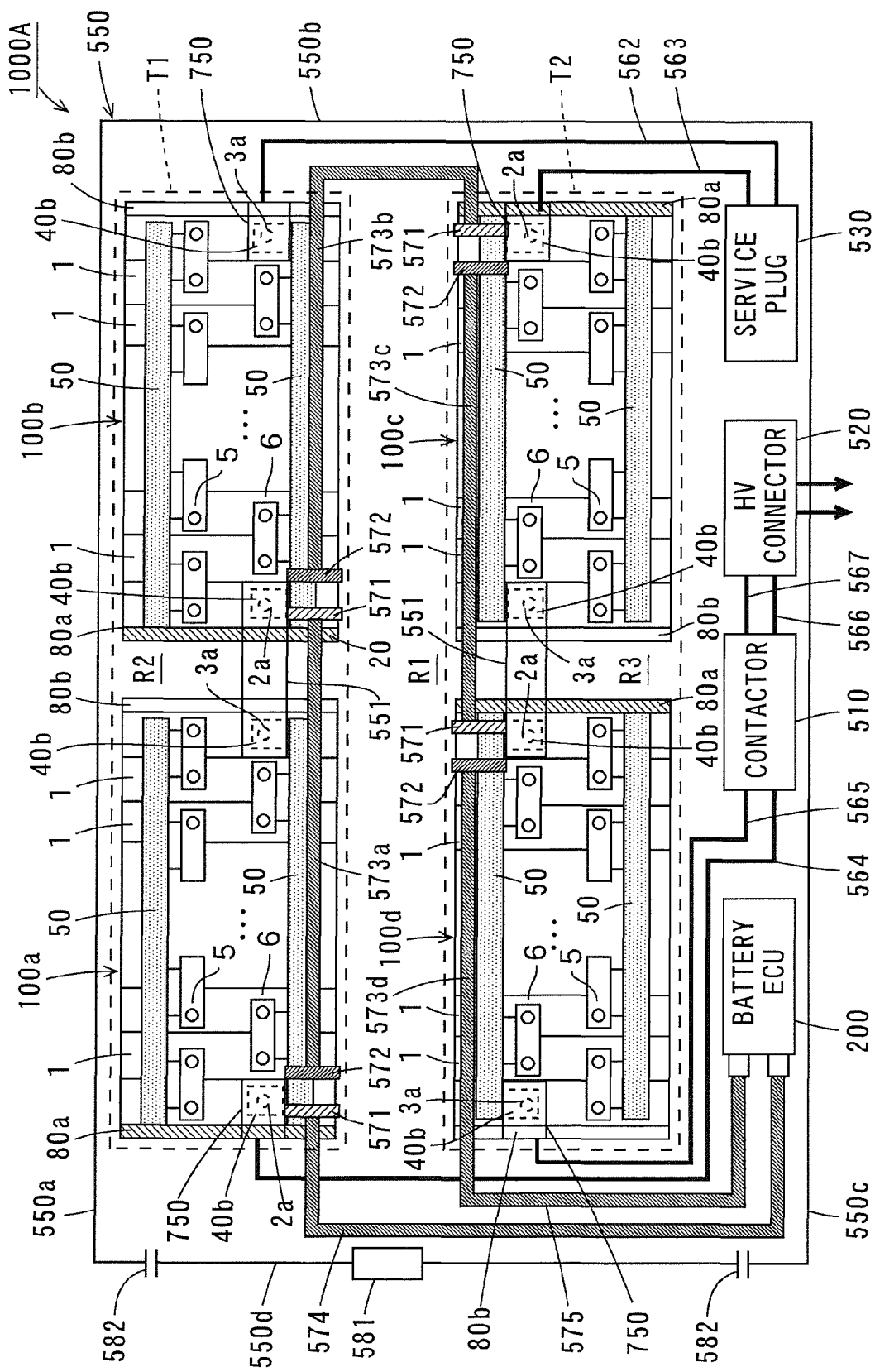
FIG. 16 is a schematic plan view of a battery system according to a second embodiment of the present invention.

FIG. 16 is a schematic plan view of the battery system according to the second embodiment of the present invention.

As shown in FIG. 16, the battery system 1000A according to the second embodiment includes battery modules 100*a*, 100*b*, 100*c*, 100*d*, the battery ECU 200, a contactor 510, an HV (High Voltage) connector 520 and a service plug 530. The battery modules 100*a*, 100*b*, 100*c*, 100*d* each have the same configuration as the foregoing battery module 100.

In the pair of end plates 80 provided in each of the battery modules 100*a*, 100*b*, 100*c*, 100*d*, the end plate 80 to which the state detecting circuit 20 (FIG. 2) is attached is referred to as the end plate 80*a*, and the end plate 80 to which the state detecting circuit 20 is not attached is referred to as the end plate 80*b* in the following description. In FIG. 16, the end plates 80*a* are indicated by hatching.

The battery modules 100*a*, 100*b*, 100*c*, 100*d*, the battery ECU 200, the contactor 510, the HV connector 520 and the service plug 530 are accommodated in a box-shaped housing 550.

The housing 550 has side surface portions 550*a*, 550*b*, 550*c*, 550*d*. The side surface portions 550*a*, 550*c* are parallel to each other, and the side surface portions 550*b*, 550*d* are parallel to each other and perpendicular to the side surfaces 550*a*, 550*c*.

The battery modules 100*a*, 100*b* are arranged side by side along the stacked direction of the battery cells 1 at a given spacing in the housing 550. The battery modules 100*c*, 100*d* are arranged side by side along the stacked direction of the battery cells 1 at a given spacing. Hereinafter, the battery modules 100*a*, 100*b* arranged side by side is referred to as a module row T1, and the battery modules 100*c*, 100*d* arranged side by side is referred to as a module row T2.

Here, the module row T1 is an example of a first module row, and the module row T2 is an example of a second module row. The battery modules 100*a*, 100*b* are examples of a first battery module, and the battery modules 100*c*, 100*d* are examples of a second battery module. The battery ECU 200 is an example of a controller.

The module rows T1, T2 are sequentially arranged at a given spacing from the side of the side surface portion 550*a* in the housing 550. In this case, the end plates 80*a* of the battery modules 100*a*, 100*b* of the module row T1 are directed to the side surface portion 550*d*. The end plates 80*a* of the battery modules 100*c*, 100*d* of the module row T2 are directed to the side surface portion 550*b*.

A ventilation path R1 is formed between the module row T1 and the module row T2. A ventilation path R2 is formed between the battery module 100*a* and the battery module 100*b* of the module row T1, and a ventilation path R3 is formed between the battery module 100*c* and the battery module 100*d* of the module row T2.

The battery ECU 200, the contactor 510, the HV connector 520 and the service plug 530 are arranged side by side in this order from the side of the side surface portion 550*d* to the side of the side surface portion 550*b* in a region between the module row T2 and the side surface portion 550*c*.

As described above, the battery modules 100*a*, 100*b*, 100*c*, 100*d* each include the first terminal row 5 and the second terminal row 6. The first terminal row 5 of the battery module 100*a* and the first terminal row 5 of the battery module 100*b* are arranged in the common straight line, and the second terminal row 6 of the battery module 100*a* and the second terminal row 6 of the battery module 100*b* are arranged in the common straight line. The first terminal row 5 of the battery module 100*c* and the first terminal row 5 of the battery module 100*d* are arranged in the common straight line, and the second terminal row 6 of the battery module 100*c* and the second terminal row 6 of the battery module 100*d* are arranged in the common straight line.

The second terminal rows 6 of the battery modules 100*a*, 100*b*, 100*c*, 100*d* are arranged on the inner side of the first terminal rows 5.

Here, the positive electrode terminal 2 (FIG. 4) at one end of the second terminal row 6 has the highest potential, and the negative electrode terminal 3 (FIG. 4) at the other end of the second terminal row 6 has the lowest potential in each of the battery modules 100*a*, 100*b*, 100*c*, 100*d*.

The positive electrode terminal 2 having the highest potential is referred to as the highest potential terminal 2*a*, and the negative electrode terminal 3 having the lowest potential is referred to as the low potential terminal 3a in each of the battery modules 100a, 100b, 100c, 100d. The bus bar 40b is attached to each of the high potential terminals 2a and low potential terminals 3a.

The bus bar 40b attached to the low potential terminal 3a of the battery module 100a and the bus bar 40b attached to the high potential terminal 2a of the battery module 100b are connected to each other through a strip-shaped bus bar 551.

The bus bar 40b attached to the low potential terminal 3a of the battery module 100c and the bus bar 40b attached to the high potential terminal 2a of the battery module 100d are connected to each other through a strip-shaped bus bar 551.

In this case, the low potential terminal 3a of the battery module 100a and the high potential terminal 2a of the battery module 100b are in close proximity to each other, and the low potential terminal 3a of the battery module 100c and the high potential terminal 2a of the battery module 100d are in close proximity to each other. Therefore, the low potential terminal 3a of the battery module 100a and the high potential terminal 2a of the battery module 100b can be connected to each other using the comparatively short bus bar 551. The low potential terminal 3a of the battery module 100c and the high potential terminal 2a of the battery module 100d can be connected to each other using the comparatively short bus bar 551.

One end of a power line 562 is connected to the bus bar 40b attached to the low potential terminal 3a of the battery module 100b through a connecting member 750, and one end of a power line 563 is connected to the bus bar 40b attached to the high potential terminal 2a of the battery module 100c through a connecting member 750. The other ends of the power lines 562, 563 are each connected to the service plug 530. Details of the connecting members 750 will be described below.

In this case, the low potential terminal 3a of the battery module 100b and the high potential terminal 2a of the battery module 100c are positioned in close proximity to the side surface portion 550b of the housing 550. The service plug 530 is positioned in close proximity to the side surface portion 550b in the region between the module row T2 and the side surface portion 550c.

Therefore, the power lines 562, 563 are arranged along the side surface portion 550b, so that the low potential terminal 3a of the battery module 100b and the high potential terminal 2a of the battery module 100c can be connected to the service plug 530 using the comparatively short power lines 562, 563, respectively.

The service plug 530 includes a switch for electrically connecting or blocking the battery modules 100b, 100c. The switch of the service plug 530 is turned on, thereby causing all the battery cells 1 of the battery modules 100a, 100b, 100c, 100d to be connected in series.

The switch of the service plug 530 is turned off during maintenance of the battery system 1000A, for example. In this case, a current does not flow through the battery modules 100a, 100b, 100c, 100d. This prevents users from receiving an electric shock even though the users touch the battery modules 100a, 100b, 100c, 100d.

One end of a power line 564 is connected to the bus bar 40b attached to the high potential terminal 3a of the battery module 100a through a connecting member 750, and one end of a power line 565 is connected to the bus bar 40b attached to the low potential terminal 3a of the battery module 100d through a connecting member 750. The other ends of the power lines 564, 565 are each connected to the contactor 510.

The contactor 510 is connected to the HV connector 520 through power lines 566, 567. The HV connector 520 is connected to a load such as the motor of the electric vehicle.

With the contactor 510 turned on, the battery module 100a is connected to the HV connector 520 through the power lines 564, 566, and the battery module 100d is connected to the HV connector 520 through the power lines 565, 567. That is, the battery modules 100a, 100b, 100c, 100d and the load connected to the HV connector 520 form a series circuit. This causes power to be supplied from the battery modules 100a, 100b, 100c, 100d to the load.

When the contactor 510 is turned off, connection between the battery module 100a and the HV connector 520 and connection between the battery module 100d and the HV connector 520 are blocked.

A pair of input connector 571 and output connector 572 is arranged in a position in close proximity to the end plate 80a on the one FPC 50 (the FPC 50 arranged along the second terminal row 6) of each of the battery modules 100a, 100b, 100c, 100d.

The input connector 571 and the output connector 572 are each connected to the state detecting circuit 20 (FIG. 2) mounted on each end plate 80a. Details of the input connector 571 and the output connector 572 will be described below.

The output connector 572 on the battery module 100a and the input connector 571 on the battery module 100b are connected to each other through a communication harness 573a. This causes the state detecting circuit 20 of the battery module 100a and the state detecting circuit 20 of the battery module 100b to be connected to each other.

The output connector 572 on the battery module 100b and the input connector 571 on the battery module 100c are connected to each other through a communication harness 573b. This causes the state detecting circuit 20 of the battery module 100b and the state detecting circuit 20 of the battery module 100c to be connected to each other.

The output connector 572 on the battery module 100c and the input connector 571 on the battery module 100d are connected to each other through a communication harness 573c. This causes the state detecting circuit 20 of the battery module 100c and the state detecting circuit 20 of the battery module 100d to be connected to each other.

The input connector 571 on the battery module 100a and the output connector 572 on the battery module 100d are connected to the battery ECU 200 through communication harnesses 574, 575, respectively.

Here, the communication harnesses 573a, 573b are examples of a first communication line, and the communication harnesses 573c, 575 are examples of a second communication line.

As described above, information (the voltage, current, temperature and SOC) regarding the plurality of battery cells 1 is detected by the state detecting circuit 20 in each of the battery modules 100a, 100b, 100c, 100d. Hereinafter, the information regarding the plurality of battery cells 1 detected by each state detecting circuit 20 is referred to as cell information.

The cell information detected by the state detecting circuit 20 of the battery module 100a is applied to the battery ECU 200 through the state detecting circuits 20 of the battery modules 100b, 100c, 100d. The cell information detected by the state detecting circuit 20 of the battery module 100b is applied to the battery ECU 200 through the state detecting circuits 20 of the battery modules 100c, 100d.

The cell information detected by the state detecting circuit 20 of the battery module 100c is applied to the battery ECU 200 through the state detecting circuit 20 of the battery module 100d. The cell information detected by the state detecting circuit 20 of the battery module 100d is directly applied to the battery ECU 200.

The battery ECU 200 is a controller that manages the state of each battery module based on the cell information applied from each state detecting circuit 20. More specifically, the battery ECU 200 controls charge/discharge of the battery modules 100a, 100b, 100c, 100d. The battery ECU 200 detects abnormalities (overdischarge or overcharge, for example) of the battery modules 100a, 100b, 100c, 100d based on the cell information applied from each state detecting circuit 20. The battery ECU 200 turns off the contactor 510 when the abnormality is detected.

Such management performed by the battery ECU 200 as the controller is not limited to the foregoing charge/discharge control and detection of abnormalities. For example, the management includes a function of suitably communicating information indicating the state of the battery module (the foregoing cell information, for example) with another controller (the vehicle-side controller 300 of FIG. 1, for example).

The side surface portion 550d of the housing 550 is provided with a cooling fan 581 and two exhaust ports 582. The cooling fan 581 is arranged on an extension of the ventilation path R1, and the exhaust ports 582 are arranged in respective positions in close proximity to the side surface portions 550a, 550c.

Gas for dissipating heat from the battery modules 100a, 100b, 100c, 100d is introduced into the housing 550 by the cooling fan 581. The gas introduced into the housing 550 is exhausted through the exhaust port 582. The heat dissipation of the battery modules 100a, 100b, 100c, 100d will be described below.

(2) The Input Connector and the Output Connector

Figure 17:
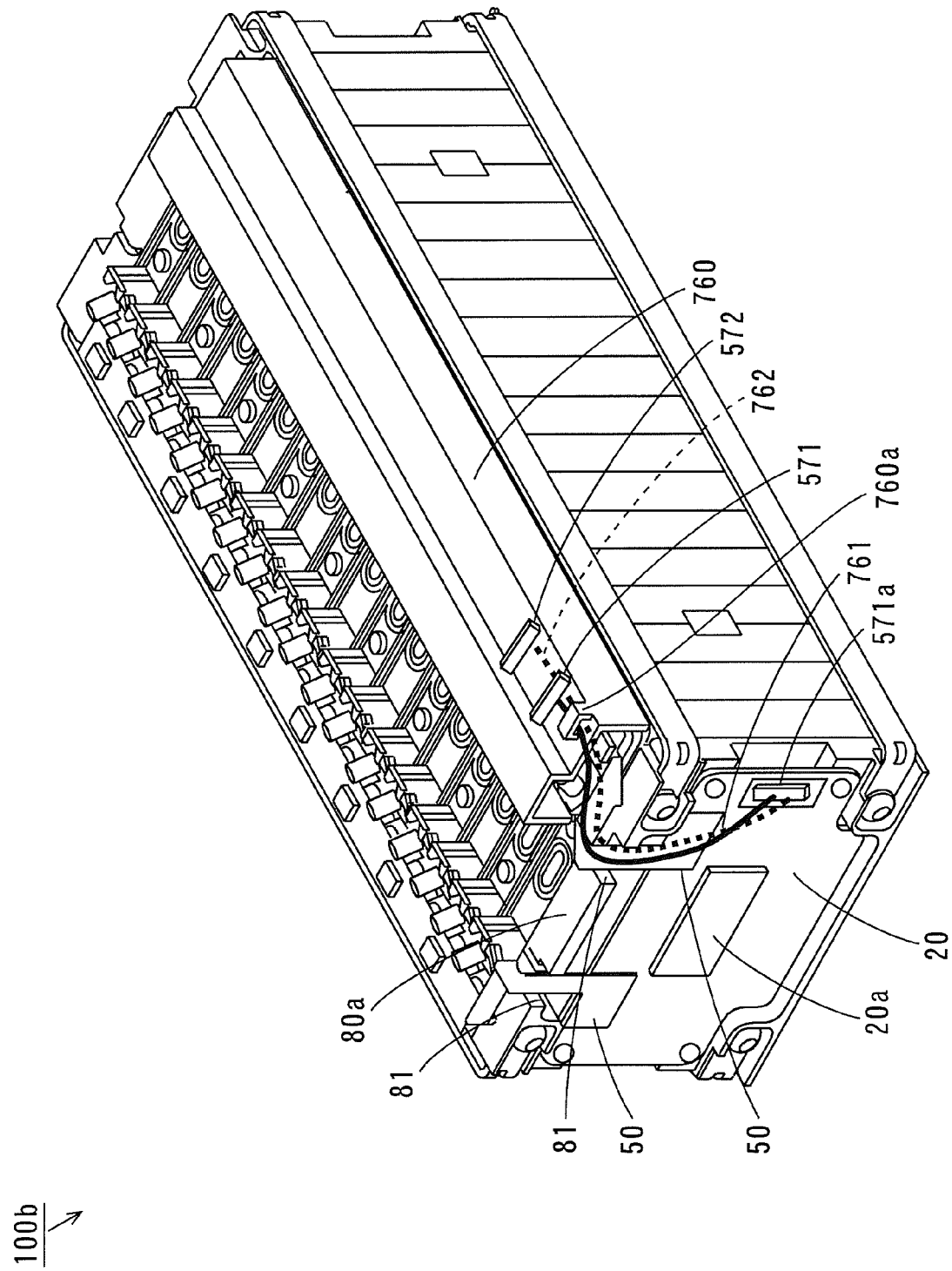
FIG. 17 is an external perspective view of an input connector and an output connector provided on the battery module.
Figure 18:
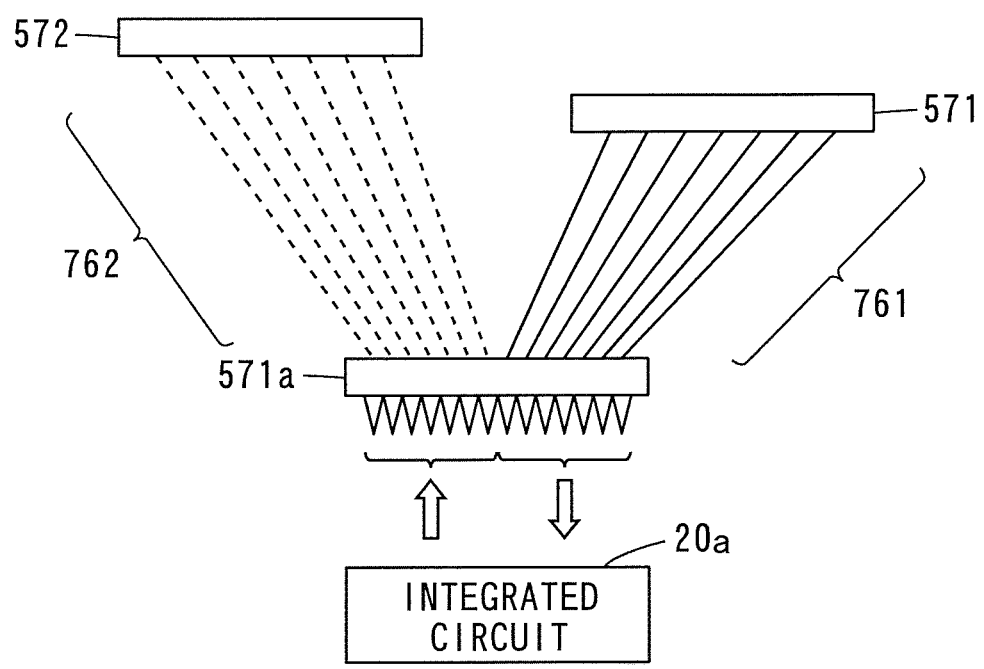
FIG. 18 is a schematic plan view showing a connection state of the input connector and the output connector to the state detecting circuit.

Next, description will be made of details of the input connector 571 and the output connector 572. FIG. 17 is an external perspective view of the input connector 571 and the output connector 572 provided on the battery module 100b. FIG. 18 is a schematic plan view showing the connection state of the input connector 571 and the output connector 572 to the semiconductor integrated circuit 20a on the state detecting circuit 20.

As shown in FIG. 17, a terminal cover 760 is provided on the upper surface of the battery module 100b to cover the second terminal row 6 and the FPC 50 arranged along the second terminal row 6 for arranging the input connector 571 and the output connector 572 thereon. The input connector 571 and the output connector 572 are arranged in positions on an upper surface of the terminal cover 760 in close proximity to the state detecting circuit 20. The input connector 571 includes a plurality of input terminals for receiving signals, and the output connector 572 includes a plurality of output terminals for transmitting signals.

The input connector 571 and the output connector 572 are connected to a relay connector 571a through harnesses 761, 762, respectively. In this case, the harnesses 761, 762 are arranged to pass through the FPC insertion cutout 81 of the end plate 80a, and the relay connector 571a is connected onto the state detecting circuit 20. The relay connector 571a includes a plurality of input terminals for receiving signals and a plurality of output terminals for transmitting signals.

A latch portion 760a having the shape of a hook is provided in the vicinity of one end of the terminal cover 760. A portion of the harness 761 in close proximity to the input connector 571 and a portion of the harness 762 in close proximity to the output connector 572 are latched by the latch portion 760a. This causes the input connector 571 and the output connector 572 to be fixed on the terminal cover 760.

As shown in FIG. 18, the plurality of input terminals of the input connector 571 and the plurality of input terminals of the relay connector 571a are connected to each other through the harness 761. The plurality of output terminals of the relay connector 571a and the plurality of output terminals of the output connector 572 are connected to each other through the harness 762. The harnesses 761, 762 are indicated by the solid line and the dotted line, respectively, in FIG. 17, and a plurality of conductor lines constituting the harnesses 761, 762 are indicated by a plurality of solid lines and a plurality of dotted lines, respectively, in FIG. 18.

As shown in FIG. 16, the input connector 571 on the battery module 100b is connected to the output connector 572 on the battery module 100a through the communication harness 573a, and the output connector 572 on the battery module 100b is connected to the input connector 571 on the battery module 100c through the communication harness 573b.

This causes the cell information received from the battery module 100a to be input to the semiconductor integrated circuit 20a on the state detecting circuit 20 of the battery module 100b through the input connector 571 and the relay connector 571a. The cell information output from the semiconductor integrated circuit 20a of the battery module 100b is transmitted to the battery module 100c through the relay connector 571a and the output connector 572.

In this example, the communication harnesses 761, 762 and the FPC 50 are drawn out in a common direction (upward) from the state detecting circuit 20. The harnesses 761, 762 and the FPC 50 are arranged to be concentrated in the one direction from the state detecting circuit 20, thus facilitating handling of the state detecting circuit 20 and assembly of the battery modules 100a, 100b, 100c, 100d. In addition, the harnesses 761, 762 and the FPC 50 do not exist in the periphery of the state detecting circuit 20 excluding positions in the one direction, thus improving heat dissipation characteristics of the state detecting circuit 20.

The terminal cover 760 is provided to cover the second terminal row 6 and the FPC 50 arranged along the second terminal row 6, and the input connector 571 and the output connector 572 are provided on the terminal cover 760. Thus, even when any of the communication harnesses and the harnesses 761, 762 is disconnected, the disconnected portion is prevented from coming in contact with the second terminal row 6.

Figure 19:
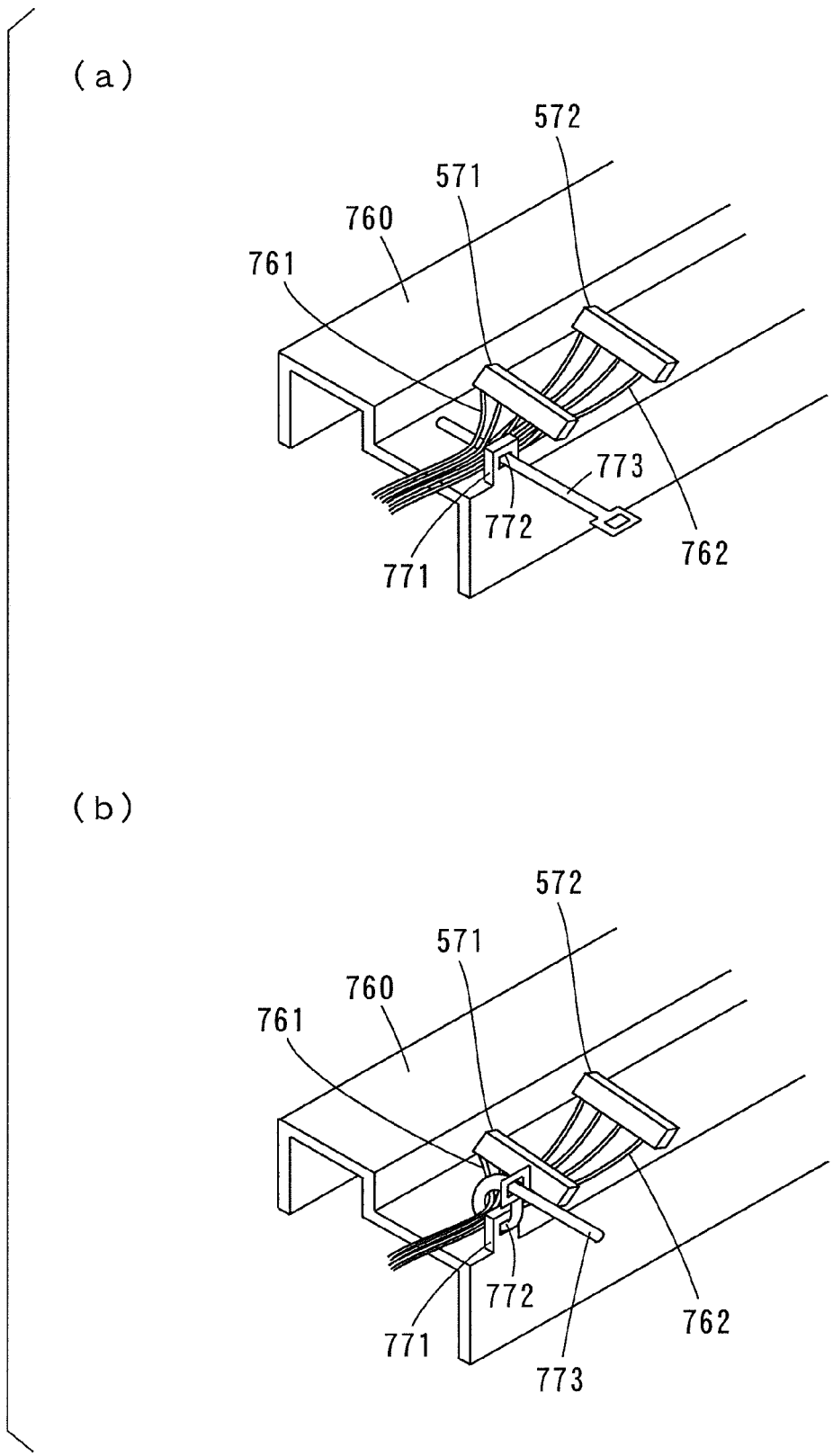
FIG. 19 shows external perspective view illustrating another method of fixing the input connector and the output connector.

FIG. 19 shows perspective views illustrating another method of fixing the input connector 571 and the output connector 572. In the example of FIG. 19, a projection 771 that projects upward is provided in the vicinity of the one end of the terminal cover 760. A through hole 772 is formed in the projection 771.

A binding band 773 is inserted in the through hole 772 of the projection 771 as shown in FIG. 19(a), and the harnesses 761, 762 are tied by the binding band 773 as shown in FIG. 19(b). This causes the input connector 571 and the output connector 572 to be fixed on the terminal cover 760.

While the input connector 571 and the output connector 572 provided on the battery module 100b are shown in FIGS. 17 to 19, the input connector 571 and the output connector 572 are similarly provided on each of the battery modules 100a, 100c, 100d.

(3) Details of the Connecting Member

Figure 20:
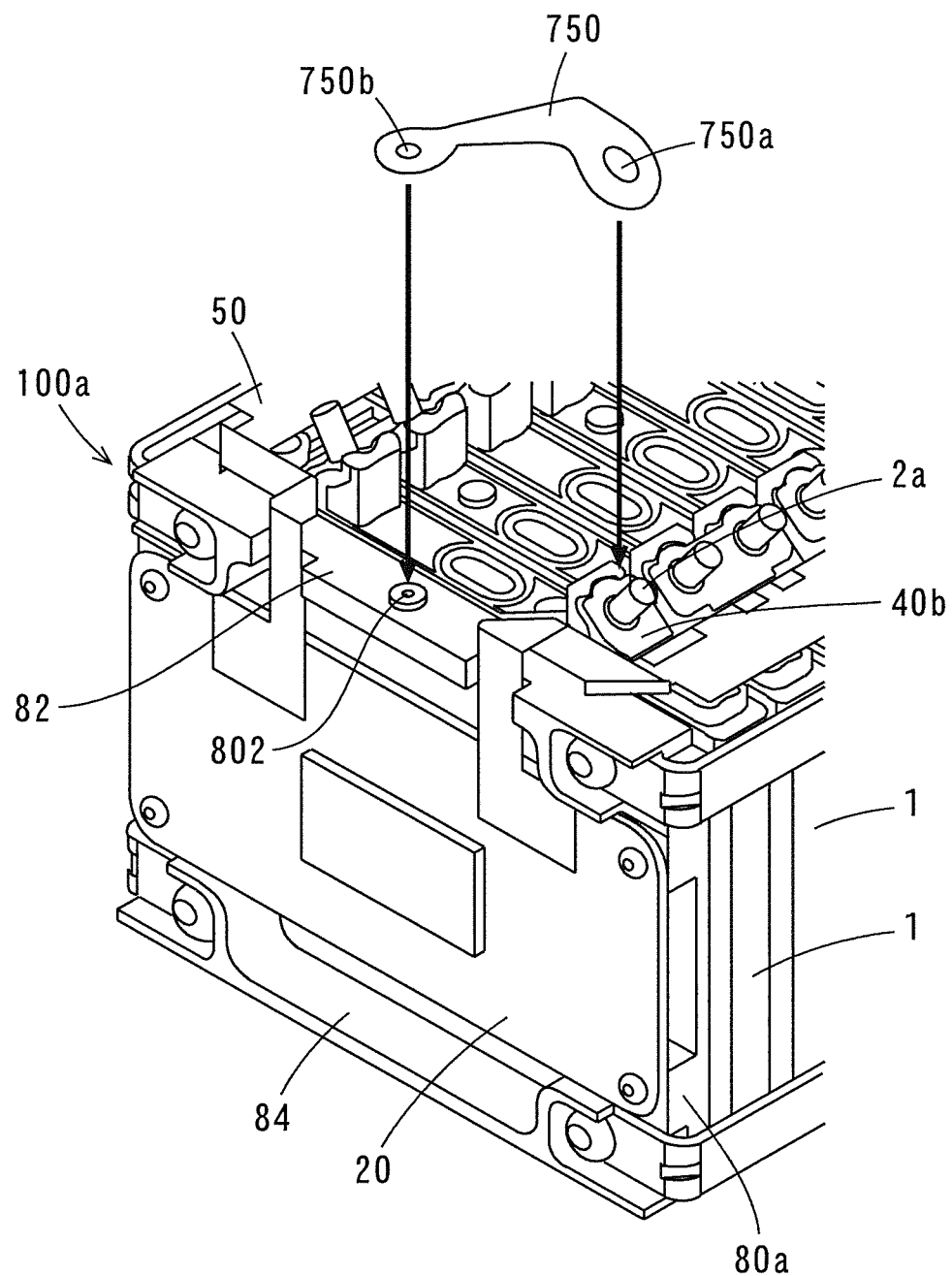
FIG. 20 is an external perspective view showing details of a connecting member.
Figure 21:
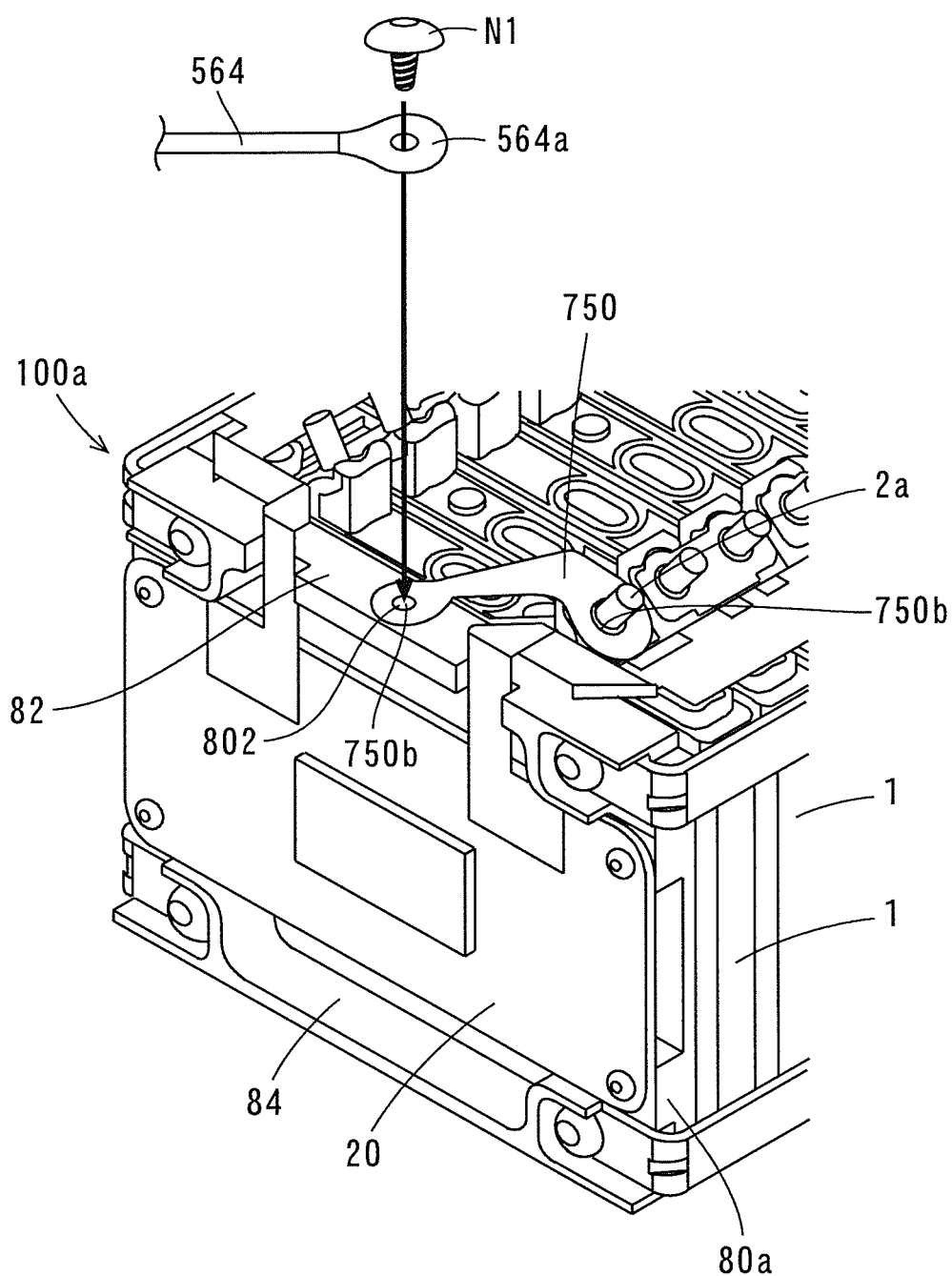
FIG. 21 is an external perspective view showing details of the connecting member.

FIGS. 20 and 21 are external perspective views showing details of the connecting member 750. FIGS. 20 and 21 show the connecting member 750 for connecting the bus bar 40b attached to the high potential terminal 2a of the battery module 100a to the power line 564. The other connecting members 750 each have the same configuration as the connecting member 750 of FIGS. 20 and 21.

As shown in FIG. 20, the connecting member 750 has a substantially L-shape. Connecting holes 750a, 750b are formed at one end portion and the other end portion of the connecting member 750. The high potential terminal 2a is fitted in the connection hole 750a of the connecting member 750. This causes the one end portion of the connecting member 750 to overlap the bus bar 40b.

A screw hole 802 is formed on the upper surface of the upper wall portion 82 of the end plate 80a. The other end portion of the connecting member 750 is arranged on the upper wall portion 82 of the end plate 80 such that the connection hole 750b of the connecting member 750 overlap the screw hole 802.

As shown in FIG. 21, an annular fixing portion 564a is provided at the one end of the power line 564. A screw N1 is screwed in the screw hole 802 of the end plate 80a through the fixing portion 564a of the power line 564 and the connecting hole 750b of the connecting member 750. This causes the other end portion of the connecting member 750 and the power line 564 to be fixed on the upper wall portion 82 of the end plate 80a. In this manner, the bus bar 40b and the power line 564 are connected to each other through the connecting member 750.

(4) Heat Dissipation of the Battery Module (4-1) Flow of the Gas

As described above, the gas for dissipating heat from the battery modules 100a, 100b, 100c, 100d is introduced into the housing 550 by the cooling fan 581 provided in the side surface portion 550d of the housing 550 shown in FIG. 16.

Figure 22:
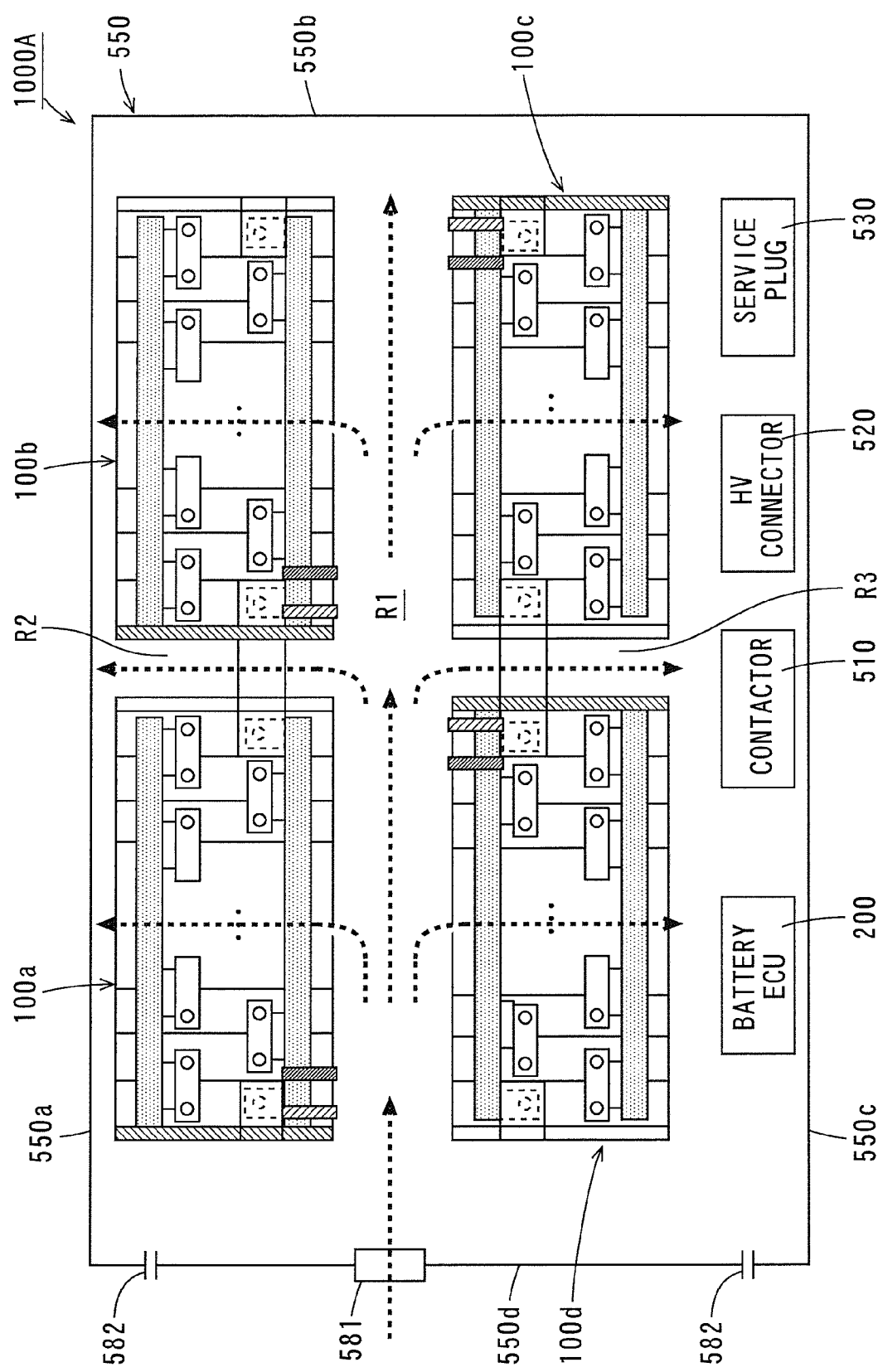
FIG. 22 is a schematic plan view for explaining flow of a gas introduced into a housing.

FIG. 22 is a schematic plan view for explaining flow of the gas introduced into the housing 550. The communication harnesses and the power lines are not shown in FIG. 22.

As shown in FIG. 22, the gas introduced into the housing 550 by the cooling fan 581 flows toward the side surface portion 550b through the ventilation path R1. The gas flows from the ventilation path R1 toward the side surface portions 550a, 550c through the ventilation paths R2, R3, respectively. Moreover, the gas flows from the ventilation path R1 to the side surface portions 550a, 550c through the clearances provided in the battery modules 100a, 100b, 100c, 100d. In this manner, the gas flows within the entire housing 550. The clearances provided in the battery modules 100a, 100b, 100c, 100d will be described below.

The gas within the housing 550 flows along the side surface portions 550a, 550b, 550c, 550d to be introduced into the exhaust ports 582 and exhausted from the exhaust ports 582 to the outside.

(4-2) Heat Dissipation of the State Detecting Circuit

As described with reference to FIG. 3, the clearance S1 is formed between the state detecting circuit 20 and the bottom portion of the end plate 80a. The gas flows through the clearance S1, thereby effectively dissipating heat of the state detecting circuit 20.

As described above, the height of projection of the upper wall portion 82, the lower wall portion 84 and the peripheral wall portions 83a, 85a (the first projection height) is larger than the height of projection of the circuit holding portions 86 (the second projection height), and the thickness of the state detecting circuit 20 attached to the circuit holding portions 86 is smaller than the difference between the first projection height and the second projection height.

Therefore, even when the upper wall portion 82, the lower wall portion 84 and the peripheral wall portions 83a, 85a of the end plate 80 come in contact with another battery module or the side wall portion of the housing 550, for example, the clearance is ensured between the state detecting circuit 20 and other parts. The gas flows through the clearance, thereby effectively dissipating heat of the state detecting circuit 20.

Such a clearance is ensured, thereby ensuring insulation characteristics of the state detecting circuit 20 even though the end plate 80 comes in contact with another battery module or the side wall portion of the housing 550. This improves flexibility in arrangement of the battery modules 100a, 100b, 100c, 100d.

(4-3) Heat Dissipation of the Battery Cells

A separator described below may be arranged between adjacent battery cells for effectively dissipating heat of each battery cell 1.

Figure 23:
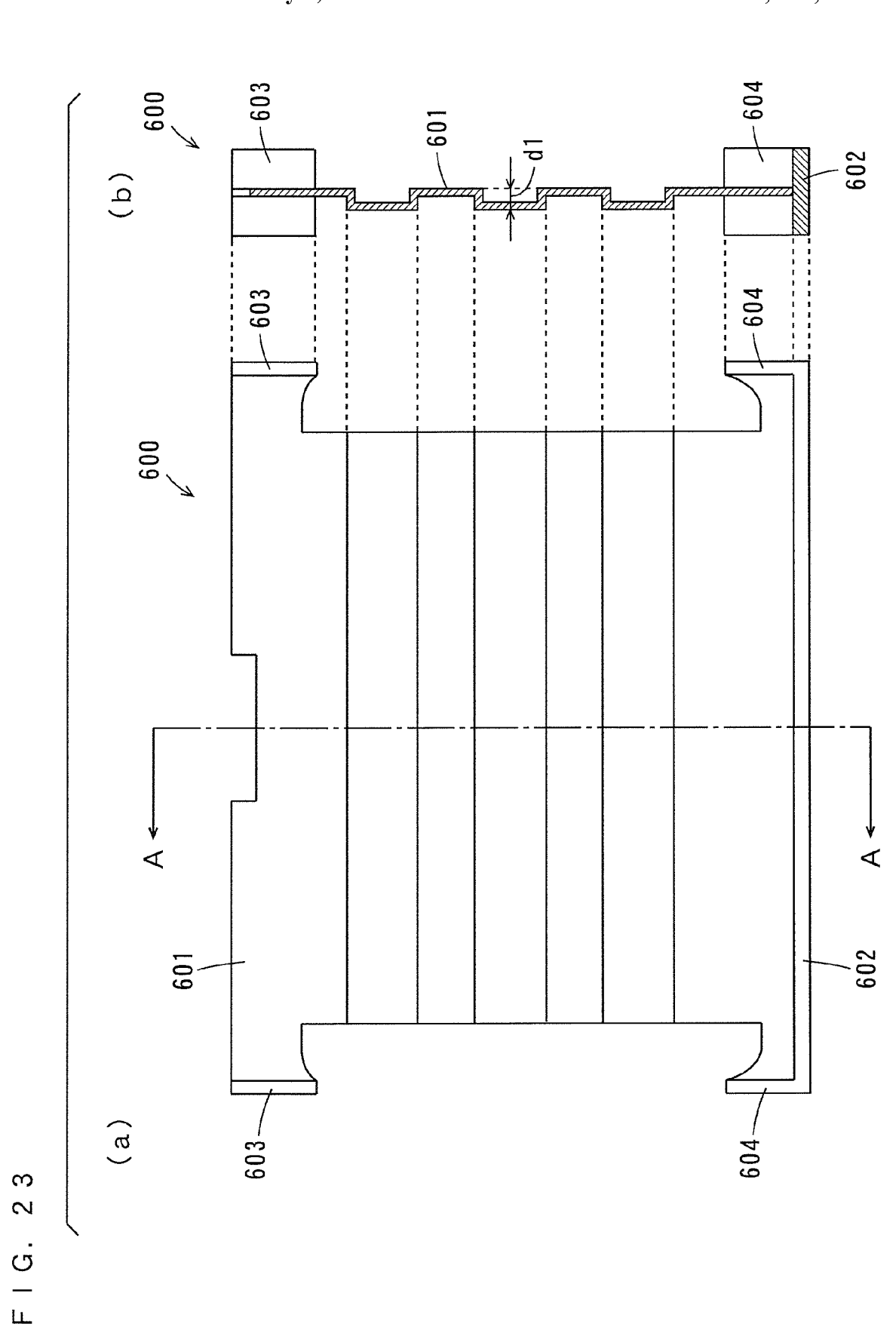
FIG. 23 shows a schematic side view and a schematic sectional view of a separator.
Figure 24:
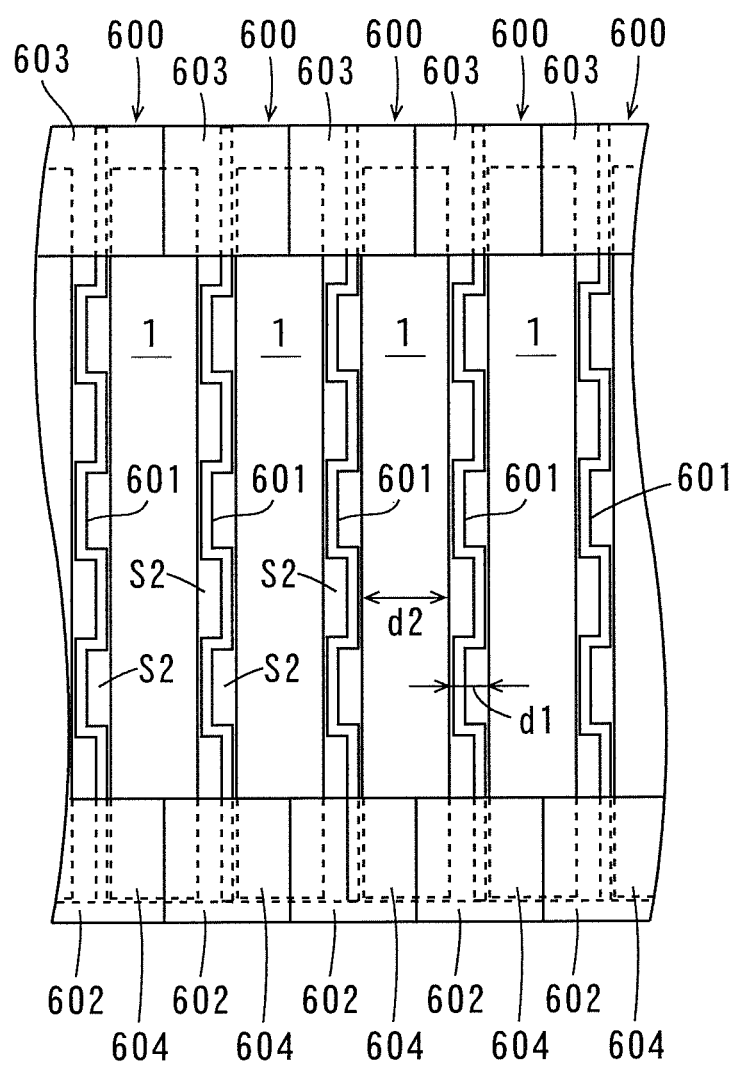
FIG. 24 is a schematic side view showing a state in which a plurality of separators are arranged between the plurality of battery cells.

FIG. 23 shows a schematic side view and a schematic sectional view of the separator. FIG. 23 (b) shows the cross section taken along the line A-A of FIG. 23(a). FIG. 24 is a schematic side view showing a state in which a plurality of separators are arranged between the plurality of battery cells 1.

As shown in FIG. 23, the separator 600 includes a substantially rectangular plate-shaped portion 601. The plate-shaped portion 601 has a cross section in a top-to-bottom direction that is bent to have irregularities. Hereinafter, the thickness of the plate-shaped portion 601 (the depth of the irregularities) is referred to as an irregularity width d1.

A long-sized bottom surface portion 602 is provided to horizontally project from the lower end of the plate-shaped portion 601 toward the sides of one surface and the other surface of the plate-shaped portion 601. A pair of upper side surface portions 603 and a pair of lower side surface portions 604 are provided to project from both side portions of the plate-shaped portion 601 toward the sides of the one surface and the other surface of the plate-shaped portion 601. The upper side surface portions 603 are provided in the vicinity of the upper end of the plate-shaped portion 601. The lower side surface portions 604 are provided in the vicinity of the lower end of the plate-shaped portion 601, and coupled to both ends of the bottom surface portion 602.

As shown in FIG. 24, the plurality of separators 600 are arranged to line up in parallel with one another. In this case, the bottom surface portion 602, the upper side surface portion 603 and the lower side surface portion 604 of the separator 600 abut against those of the adjacent separator 600, respectively. In the state, the battery cell 1 is accommodated between the plate shaped portions 601 of the adjacent separators 600.

In this case, the one surface and the other surface of each battery cell 1 abut against the plate shaped portions 601 of the adjacent separators 600, respectively. This causes the distance between the adjacent battery cells 1 to be maintained to be equal to the irregularity width d1 of the plate-shaped portion 601.

Clearances S2 that correspond to the irregularities of the plate-shaped portion 601 are formed between the adjacent battery cells 1. The gas introduced into the housing 550 by the cooling fan 581 (FIG. 16) passes through the clearances S2 between the adjacent battery cells 1, thereby allowing for effective heat dissipation of the battery cells 1.

The irregularity width d1 of the separator 600 may be changed according to positions of the separators 600 between the plurality of battery cells 1.

FIG. 25 is a schematic plan view showing an example in which the plurality of separators 600 having different irregularity widths d1 are used in the battery module 100a.

As shown in FIG. 25, the eighteen battery cells 1 are stacked in the battery module 100a. Seventeen separators 600 are arranged between the eighteen battery cells 1.

In the example of FIG. 25, three separators 600 each having a first irregularity width (hereinafter referred to as separators 600a) are arranged in each of a region R11 on one end side and a region R12 on the other end side of the battery module 100a. Meanwhile, eleven separators 600 each having a second irregularity width (hereinafter referred to as separators 600b) are arranged in a region R13 between the region R11 and the region R12. In this case, the second irregularity width is set larger than the first irregularity width.

Here, heat is likely to stay in the region R13 in the intermediate position of the battery module 100a as compared with the regions R11, R12 at the both ends. Therefore, the temperature of the battery cells 1 arranged in the region R13 of the battery module 100a is likely to be higher than the temperature of the battery cells 1 arranged in the regions R11, R12 during charge/discharge.

In this example, the irregularity width d1 of each of the separators 600b arranged in the region R13 is set larger than the irregularity width d1 of each of the separators 600a arranged in the regions R11, R12. In this case, the spacing between the battery cells 1 arranged in the region R13 is larger than the spacing between the battery cells 1 arranged in the regions R11, R12. This causes heat to be more effectively dissipated from the battery cells 1 arranged in the region R13. As a result, the temperature can be substantially uniformly maintained in the battery cells 1 arranged in the regions R11, R12 and the battery cells 1 arranged in the region R13.

The irregularity width d1 of each of the separators 600a arranged in the regions R11, R12 is 2.0 mm, and the irregularity width d1 of each of the separators 600b arranged in the region R13 is 2.5 mm, for example.

(5) Effects of the Second Embodiment

The second terminal row 6 of the battery modules 100a, 100b in the module row T1 and the second terminal row 6 of the battery modules 100c, 100d in the module row T2 are arranged on the inner side to be in close proximity to each other in the second embodiment. The high potential terminal 2a is positioned at the one end of the second terminal row 6, and the low potential terminal 3a is positioned at the other end of the second terminal row 6 in each of the battery modules 100a, 100b, 100c, 100d.

This reduces the distance between the low potential terminal 3a of the battery module 100a and the high potential terminal 2a of the battery module 100b, the distance between the low potential terminal 3a of the battery module 100b and the high potential terminal 2a of the battery module 100c, the distance between the low potential terminal 3a of the battery module 100c and the high potential terminal 2a of the battery module 100d, and the distance between the low potential terminal 3a of the battery module 100d and the high potential terminal 2a of the battery module 100a.

Accordingly, the length of each of the bus bars 551 for connecting the high potential terminals 2a and the low potential terminals 3a and the length of each of the power lines 562, 563, 564, 565 can be reduced. This results in reduction in cost of the apparatus and in the weight of the battery system 1000A.

The bus bars 551 and the power lines 562, 563, 564, 565 are prevented from interfering with other components, wiring or the like, thus facilitating assembly and maintenance operations.

The one pair of input connector 571 and output connector 572 is arranged in the position on the FPC 50 arranged along the second terminal row 6 of each of the battery modules 100a, 100b, 100c, 100d in the second embodiment.

In this case, the length of each of the communication harnesses 573a to 573d, 574, 575 for connecting the input connectors 571 and the output connectors 572 can be reduced. This results in reduction in cost of the apparatus and in the weight of the battery system 1000A.

The communication harnesses 573a to 573d, 574, 575 are prevented from interfering with other components, wiring or the like, thus facilitating assembly and maintenance operations.

The bus bars 551 and the communication harnesses 573a to 573d are arranged in upper portions of the battery modules 100a, 100b, 100c, 100d, respectively. Thus, the flow of the gas introduced into the housing 550 by the cooling fan 581 is not inhibited by the bus bars 551 and the communication harnesses 573a to 573d. This allows heat to be efficiently dissipated from the battery modules 100a, 100b, 100c, 100d.

The communication harnesses 573a to 573d are arranged in the upper portions of the battery modules 100a, 100b, 100c, 100d, respectively, thereby preventing an increase in the space of the battery system 1000A occupied by the communication harnesses 573a to 573d and facilitating handling of the communication harnesses 573a to 573d.

(6) Another Example of the Bus Bar

A bus bar described below may be used instead of the bus bar 40a of FIG. 5. FIG. 26 is a diagram showing another example of the bus bar 40a. The bus bar 40t shown in FIG. 26 will be described by referring to differences from the bus bar 40a of FIG. 5.

As shown in FIG. 26, an oval through hole 41a is formed in the bus bar 40t instead of one of the pair of through holes 41.

When the plurality of separators 600 having the different irregularity widths d1 are used as shown in the example of FIG. 25, the distances between the adjacent battery cells 1 are different in the regions R11, R12, R13. That is, the distances between the adjacent positive electrode terminals 2 and negative electrode terminals 3 are different in the regions R11, R12, R13. In addition, the distance between the adjacent positive electrode terminal 2 and negative electrode terminal 3 may vary because of manufacturing errors, assembly errors or the like.

The bus bar 40a of FIG. 5 can be attached to the adjacent positive electrode terminal 2 and negative electrode terminal 3 only when the distance between the adjacent positive electrode terminal 2 and negative electrode terminal 3 is equal to the distance between the pair of through holes 41. Therefore, when the distance between the adjacent positive electrode terminal 2 and negative electrode terminal 3 varies, a plurality of types of bus bars 40a having different distances between the through holes 41 need to be prepared.

Meanwhile, when the bus bar 40t of FIG. 26 is used, flexibility in the position of the positive electrode terminal 2 or the negative electrode terminal 3 within the through hole 41a is ensured by the length of the through hole 41a. This allows the adjacent positive electrode terminals 2 and negative electrode terminals 3 to be connected to each other using the common bus bars 40a even when the distances between the adjacent positive electrode terminals 2 and negative electrode terminals 3 vary.

An oval through hole 41a may be provided in the bus bar 40b of FIG. 5 instead of the through hole 41. A pair of through holes 41a may be provided in the bus bar 40a instead of the pair of through holes 41.

(7) Another Example of the FPC

While the bus bars 40a, 40b are connected to the state detecting circuit 20 using the FPC 50 in the above-described embodiments, a rigid circuit board and an FPC (flexible printed circuit board) may be used in combination instead of the FPC 50.

Figure 27:
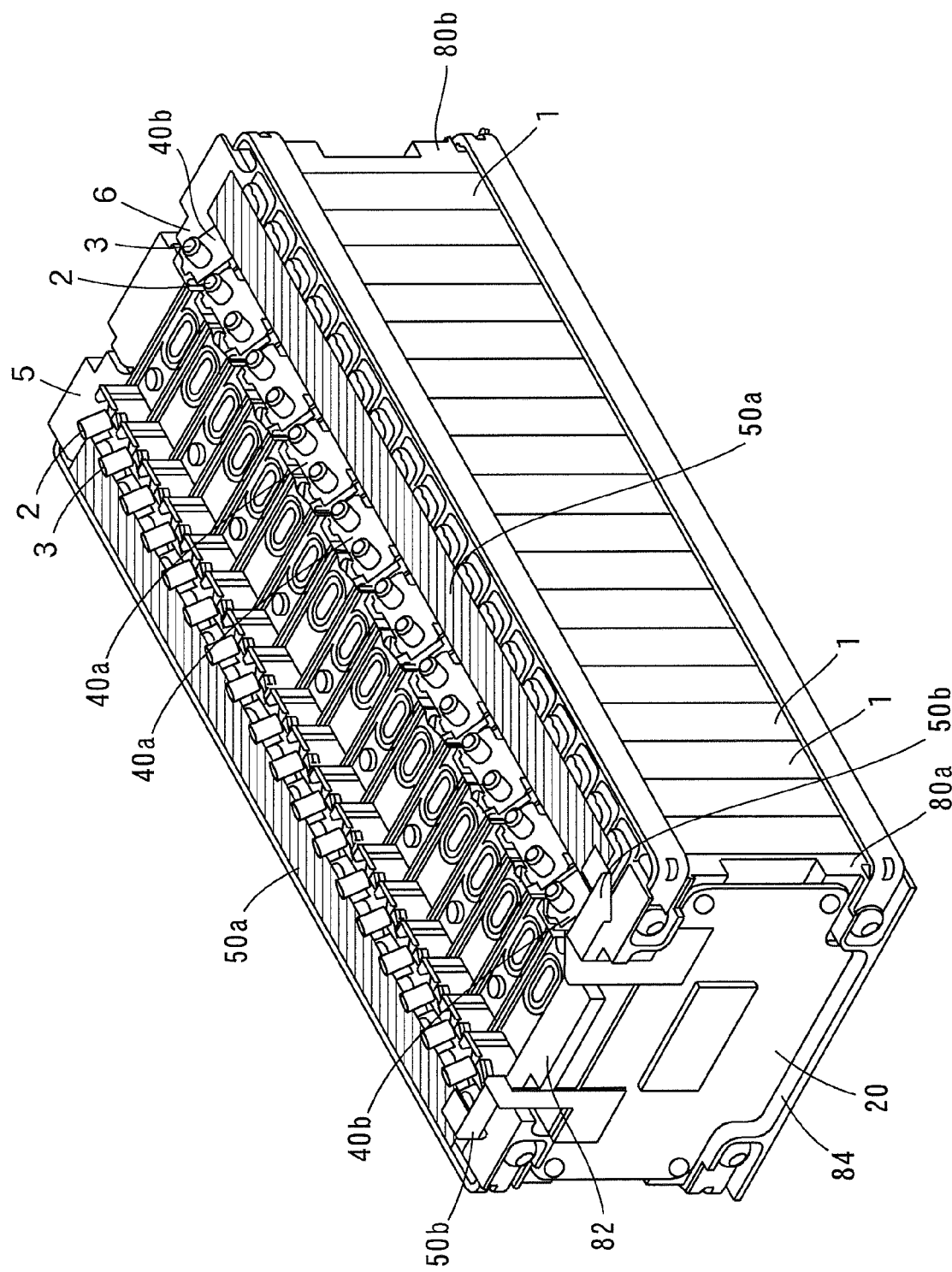
FIG. 27 is an external perspective view showing an example in which a rigid circuit board and an FPC are used in combination instead of the FPC.

FIG. 27 is an external perspective view showing an example in which the rigid circuit board and the FPC are used in combination instead of the FPC 50.

Two rigid circuit boards 50a are arranged along the terminal rows 5, 6, respectively, in the example of FIG. 27. The plurality of bus bars 40a, 40b are attached to these rigid circuit boards 50a. FPCs 50b are bonded to one ends of the rigid circuit boards 50a, respectively. Each FPC 50b is bent inward at a right angle and further bent downward at the upper end portion of the end plate 80a to be connected to the state detecting circuit 20.

Similarly to the foregoing FPC 50, the plurality of voltage detecting lines 51 and the plurality of temperature detecting lines 52 are formed in each pair of rigid circuit board 50a and FPC 50b (see FIG. 6). Thus, each of the bus bars 40a, 40b is connected to the state detecting circuit 20, and each of the temperature detecting elements 30 is connected to the state detecting circuit 20.

In assembly, first, the plurality of bus bars 40a, 40b are bonded to the rigid circuit boards 50a by reflow soldering. Next, the FPCs 50b are bonded to the rigid circuit boards 50a, respectively, by pulse heat bonding. The FPCs 50b are then each bonded to the state detecting circuit 20 by pulse heat bonding.

The plurality of bus bars 40a, 40b attached to the rigid circuit boards 50a are subsequently attached to the positive electrode terminals 2 and the negative electrode terminals 3 of the plurality of battery cells 1. Then, the state detecting circuit 20 bonded to the rigid circuit boards 50a through the FPCs 50b is fixed to the one end plate 80.

The plurality of PTC elements 60 corresponding to the plurality of voltage detecting lines 51, respectively, may be provided on the rigid circuit boards 50a.

[3] Third Embodiment

Next, description will be made of a battery system according to a third embodiment of the present invention by referring to differences from the battery system 1000A according to the foregoing second embodiment.

Figure 28:
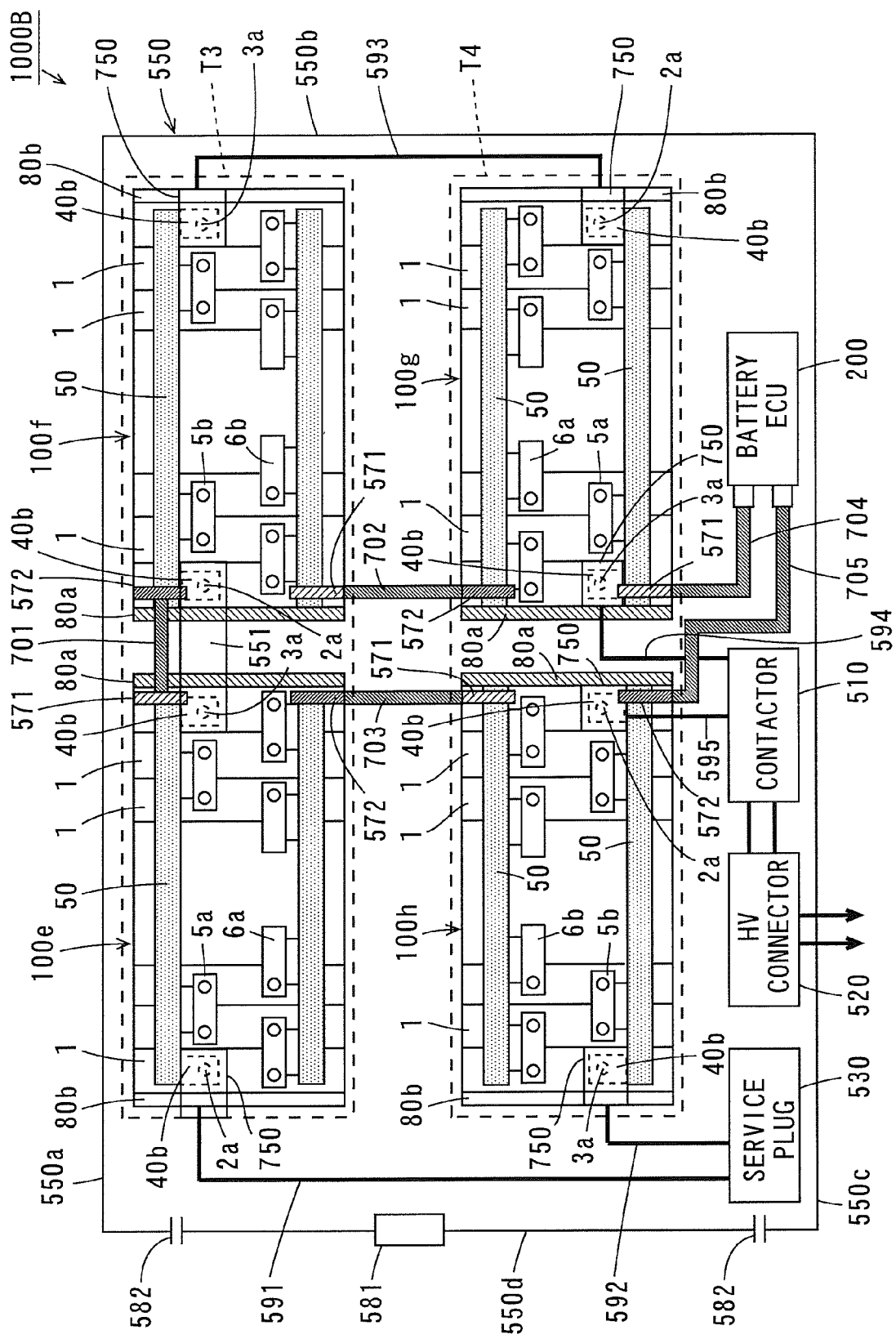
FIG. 28 is a schematic plan view of a battery system according to a third embodiment of the present invention.

FIG. 28 is a schematic plan view of a battery system according to the third embodiment of the present invention.

As shown in FIG. 28, the battery system 1000B according to the third embodiment includes battery modules 100e, 100f, 100g, 100h instead of the battery modules 100a, 100b, 100c, 100d. The battery modules 100e, 100g have the same configurations, and the battery modules 100f, 100h have the same configurations.

Here, description will be made of the configuration of each of the battery modules 100e, 100f, 100g, 100h by referring to differences from the configuration of the foregoing battery module 100 (the battery module 100a, 100b, 100c, 100d).

Figure 29:
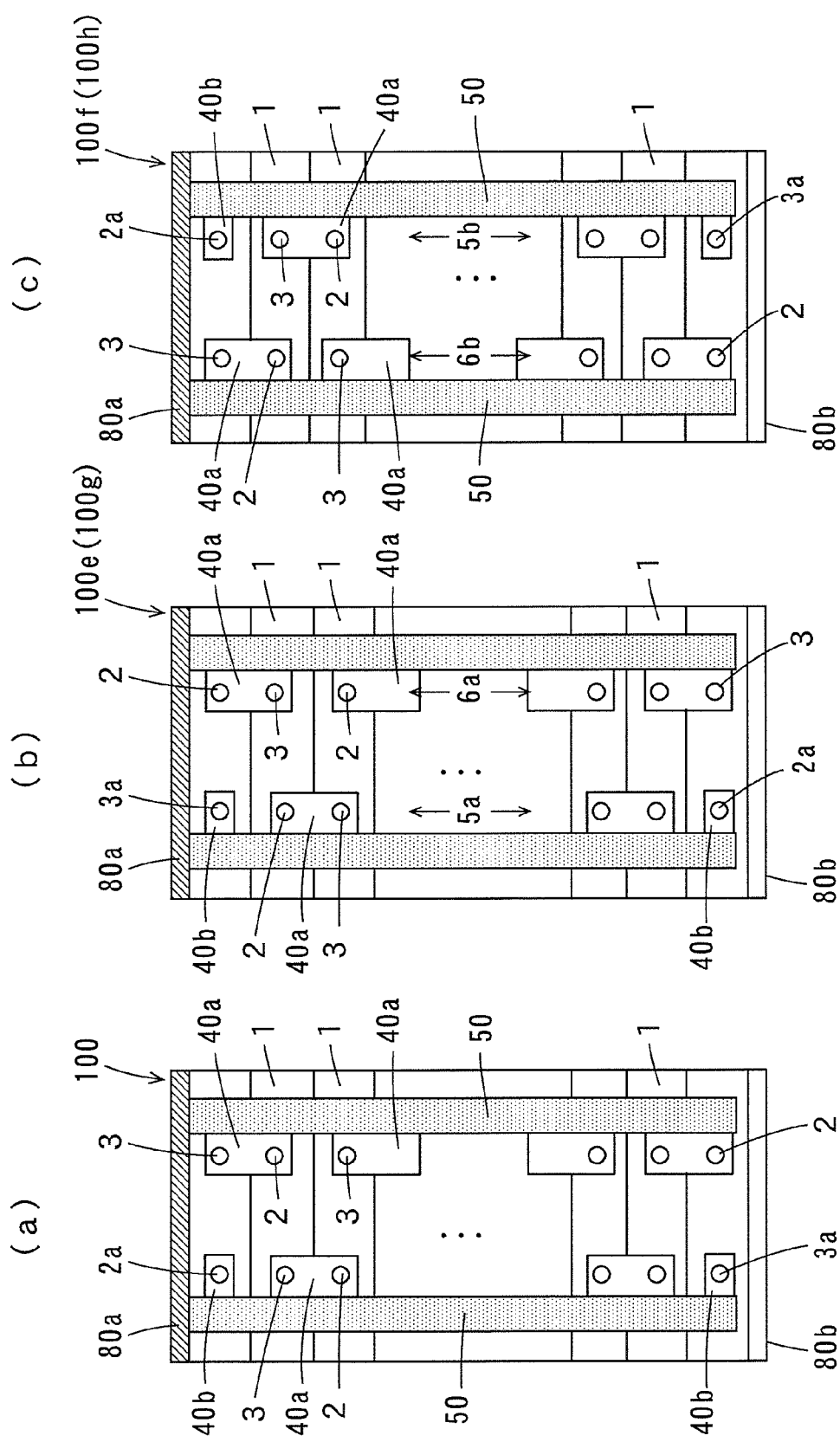
FIG. 29 is a schematic plan view of the battery modules.

FIG. 29 is a schematic plan view of the battery modules 100, 100e, 100f.

First, description will be made of differences between the battery module 100 and the battery module 100e. The battery module 100g has the same configuration as that of the battery module 100e of FIG. 29(b).

Each battery cell 1 of the battery module 100e shown in FIG. 29(b) is arranged such that the positions of the positive electrode terminal 2 and the negative electrode terminal 3 are opposite to the positions of the positive electrode terminal 2 and the negative electrode terminal 3 of each battery cell 1 of the battery module 100 shown in FIG. 29(a).

In the battery module 100e of FIG. 29(b), the plurality of bus bars 40a, 40b are attached such that the negative electrode terminal 3 of the battery cell 1 that is closest to the end plate 80a is the low potential terminal 3a, and the positive electrode terminal 2 of the battery cell 1 that is closest to the end plate 80b is the high potential terminal 2a.

In two terminal rows arranged in the stacked direction of the battery cells 1, the terminal row including the high potential terminal 2a and the low potential terminal 3a is referred to as a third terminal row 5a, and the other terminal row is referred to as a fourth terminal row 6a in each of the battery modules 100e, 100g.

Next, description will be made of differences between the battery module 100e and the battery module 100f. The battery module 100h has the same configuration as that of the battery module 100f of FIG. 29(c).

In the battery module 100f of FIG. 29(c), the plurality of bus bars 40a, 40b are attached such that the positive electrode terminal 2 of the battery cell 1 that is closest to the end plate 80a is the high potential terminal 2a, and the negative electrode terminal 3 of the battery cell 1 that is closest to the end plate 80b is the low potential terminal 3a.

In two terminal rows arranged in the stacked direction of the battery cells 1, the terminal row including the high potential terminal 2a and the low potential terminal 3a is referred to as a fifth terminal row 5b, and the other terminal row is referred to as a sixth terminal row 6b in each of the battery modules 100f, 100h.

As shown in FIG. 28, the battery modules 100e, 100f are arranged side by side along the stacked direction of the battery cells 1 at a given spacing in the housing 550. The battery modules 100g, 100h are arranged side by side along the stacked direction of the battery cells 1 at a given spacing. Hereinafter, the battery modules 100e, 100f arranged side by side is referred to as a module row T3, and the battery modules 100g, 100h arranged side by side is referred to as a module row T4.

In the housing 550, the module rows T3, T4 are sequentially arranged at a given spacing from the side of the side surface portion 550a. In this case, the battery modules 100e, 100f are arranged such that the end plate 80a of the battery module 100e and the end plate 80a of the battery module 100f are opposite to each other. The battery modules 100g, 100h are arranged such that the end plate 80a of the battery module 100g and the end plate 80a of the battery module 100h are opposite to each other.

The third terminal row 5a of the battery module 100e and the fifth terminal row 5b of the battery module 100f are arranged in a common straight line, and the fourth terminal row 6a of the battery module 100e and the sixth terminal row 6b of the battery module 100f are arranged in a common straight line. The third terminal row 5a of the battery module 100g and the fifth terminal row 5b of the battery module 100h are arranged in a common straight line, and the fourth terminal row 6a of the battery module 100g and the sixth terminal row 6b of the battery module 100h are arranged in a common straight line.

The service plug 530, the HV connector 520, the contactor 510 and the battery ECU 200 are arranged to line up in this order from the side of the side surface portion 550d to the side of the side surface portion 550b in a region between the module row T4 and the side surface portion 550c.

The bus bar 40b attached to the low potential terminal 3a of the battery module 100e and the bus bar 40b attached to the high potential terminal 2a of the battery module 100f are connected to each other through a strip-shaped bus bar 551.

In this case, the low potential terminal 3a of the battery module 100e and the high potential terminal 2a of the battery module 100f are in close proximity to each other. Therefore, the low potential terminal 3a of the battery module 100e and the high potential terminal 2a of the battery module 100f can be connected to each other using the comparatively short bus bar 551.

One end of a power line 591 is connected to the bus bar 40b attached to the high potential terminal 2a of the battery module 100e through the connecting member 750, and one end of a power line 592 is connected to the bus bar 40b attached to the low potential terminal 3a of the battery module 100h through the connecting member 750. The other ends of the power lines 591, 592 are each connected to the service plug 530.

In this case, the high potential terminal 2a of the battery module 100e and the low potential terminal 3a of the battery module 100h are positioned in close proximity to the side surface portion 550d of the housing 550. The service plug 530 is positioned in close proximity to the side surface portion 550d in a region between the module row T4 and the side surface portion 550c.

Therefore, the power lines 591, 592 are arranged along the side surface portion 550d, so that the high potential terminal 2a of the battery module 100e and the low potential terminal 3a of the battery module 100h can be connected to the service plug 530 using the comparatively short power lines 591, 592, respectively.

One end of a power line 593 is connected to the bus bar 40b attached to the low potential terminal 3a of the battery module 100f through the connecting member 750, and the other end of the power line 593 is connected to the bus bar 40b attached to the high potential terminal 2a of the battery module 100g through the connecting member 750.

In this case, the low potential terminal 3a of the battery module 100f and the high potential terminal 2a of the battery module 100g are positioned in close proximity to the side surface portion 550b of the housing 550. Therefore, the power line 593 is arranged along the side surface portion 550b, so that the low potential terminal 3a of the battery module 100f and the high potential terminal 2a of the battery module 100g can be connected to each other using the comparatively short power line 593.

One end of a power line 594 is connected to the bus bar 40b attached to the low potential terminal 3a of the battery module 100g through the connecting member 750, and one end of a power line 595 is connected to the bus bar 40b attached to the high potential terminal 2a of the battery module 100h through the connecting member 750. The other ends of the power lines 594, 595 are each connected to the contactor 510.

In this case, the low potential terminal 3a of the battery module 100g, the high potential terminal 2a of the battery module 100h and the contactor 510 are positioned in close proximity to one another. Thus, the low potential terminal 3a of the battery module 100g and the high potential terminal 2a of the battery module 100h can be connected to the contactor 510 using the comparatively short power lines 594, 595, respectively.

In each of the battery module 100e, 100g, the output connector 571 is arranged in a position in close proximity to the end plate 80a on the one FPC 50 (the FPC 50 arranged along the third terminal row 5a), and the input connector 572 is arranged in a position in close proximity to the end plate 80a on the other FPC 50 (FPC 50 arranged along the fourth terminal row 6a).

In each of the battery module 100f, 100h, the output connector 572 is arranged in a position in close proximity to the end plate 80a on the one FPC 50 (the FPC 50 arranged along the fifth terminal row 5b), and the input connector 571 is arranged in a position in close proximity to the end plate 80a on the other FPC 50 (the FPC 50 arranged along the sixth terminal row 6b).

In this case, the pair of terminal covers 760 (FIG. 17) is provided to cover the terminal rows and the FPCs 50, respectively, and the input connector 571 and the output connector 572 are arranged on the pair of terminal covers 760, respectively. The input connector 571 and the output connector 572 are each connected to the state detecting circuit 20 attached to the end plate 80a through the harnesses 761, 762 (FIG. 18) and the relay connector 571a (FIG. 18).

The input connector 571 on the battery module 100e and the output connector 572 on the battery module 100f are connected to each other through a communication harness 701. This causes the state detecting circuit 20 of the battery module 100e and the state detecting circuit 20 of the battery module 100f to be connected to each other.

In this case, the input connector 571 on the battery module 100e and the output connector 572 on the battery module 100f are positioned in close proximity to each other. Thus, the input connector 571 on the battery module 100e and the output connector 572 on the battery module 100f can be connected to each other using the comparatively short communication harness 701.

The input connector 571 on the battery module 100f and the output connector 572 on the battery module 100g are connected to each other through a communication harness 702. This causes the state detecting circuit 20 of the battery module 100f and the state detecting circuit 20 of the battery module 100g to be connected to each other.

In this case, the input connector 571 on the battery module 100f and the output connector 572 on the battery module 100g are positioned in close proximity to each other. Thus, the input connector 571 on the battery module 100f and the output connector 572 on the battery module 100g can be connected to each other using the comparatively short communication harness 702.

The input connector 571 on the battery module 100h and the output connector 572 on the battery module 100e are connected to each other through a communication harness 703. This causes the state detecting circuit 20 of the battery module 100h and the state detecting circuit 20 of the battery module 100e to be connected to each other.

In this case, the input connector 571 on the battery module 100h and the output connector 572 on the battery module 100e are positioned in close proximity to each other. Thus, the input connector 571 on the battery module 100h and the output connector 572 on the battery module 100e can be connected to each other using the comparatively short communication harness 703.

The input connector 571 on the battery module 100g and the output connector 572 on the battery module 100h are connected to the battery ECU 200 through communication harnesses 704, 705, respectively.

In this case, the cell information detected by the state detecting circuit 20 of the battery module 100g is applied to the battery ECU 200 through the state detecting circuits 20 of the battery modules 100f, 100e, 100h. The cell information detected by the state detecting circuit 20 of the battery module 100f is applied to the battery ECU 200 through the state detecting circuits 20 of the battery modules 100e, 100h.

The cell information detected by the state detecting circuit 20 of the battery module 100e is applied to the battery ECU 200 through the state detecting circuit 20 of the battery module 100h. The cell information detected by the state detecting circuit 20 of the battery module 100h is directly applied to the battery ECU 200.

In the third embodiment, the high potential terminals 2*a* and the low potential terminals 3*a* of the battery modules 100*e*, 100*f*, 100*g*, 100*h* can be connected to one another using the comparatively short bus bar 551 and the comparatively short power lines 591 to 595. This allows for reduction in cost of the apparatus and in the weight of the battery system 1000B.

The bus bar 551 and the power lines 591 to 595 are prevented from interfering with other components, wiring or the like, thus facilitating assembly and maintenance operations.

In the third embodiment, the state detecting circuits 20 of the battery modules 100*e*, 100*f*, 100*g*, 100*h* can be connected to the battery ECU 200 using the comparatively short communication harnesses 701 to 705, respectively. This allows for reduction in cost of the apparatus and in the weight of the battery system 1000S.

The communication harnesses 701 to 705 are prevented from interfering with other components, wiring or the like, thus facilitating assembly and maintenance operations.

[4] Fourth Embodiment

Next, description will be made of a battery system according to a fourth embodiment of the present invention by referring to differences from the battery system according to the second embodiment.

Figure 30:
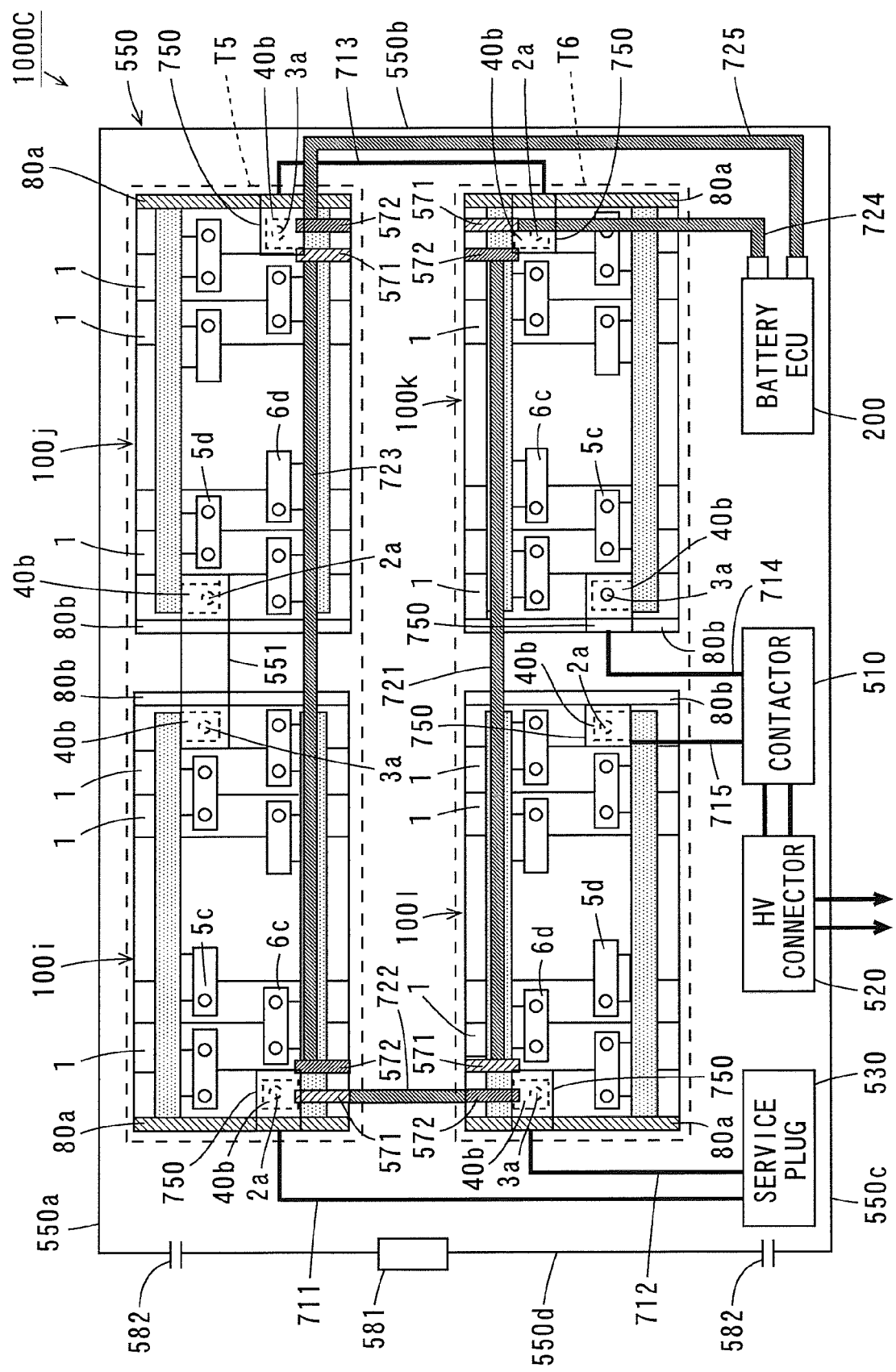
FIG. 30 is a schematic plan view of a battery system according to a fourth embodiment of the present invention.

FIG. 30 is a schematic plan view of the battery system according to the fourth embodiment of the present invention.

As shown in FIG. 30, the battery system 1000C according to the fourth embodiment includes battery modules 100*i*, 100*j*, 100*k*, 100*l* instead of the battery modules 100*a*, 100*b*, 100*c*, 100*d*. The battery modules 100*i*, 100*k* have the same configurations, and the battery modules 100*j*, 100*l* have the same configurations.

Here, description will be made of the configuration of each of the battery modules 100*i*, 100*j*, 100*k*, 100*l* by referring to differences from the configuration of the foregoing battery module 100 (the battery module 100*a*, 100*b*, 100*c*, 100*d*).

Figure 31:
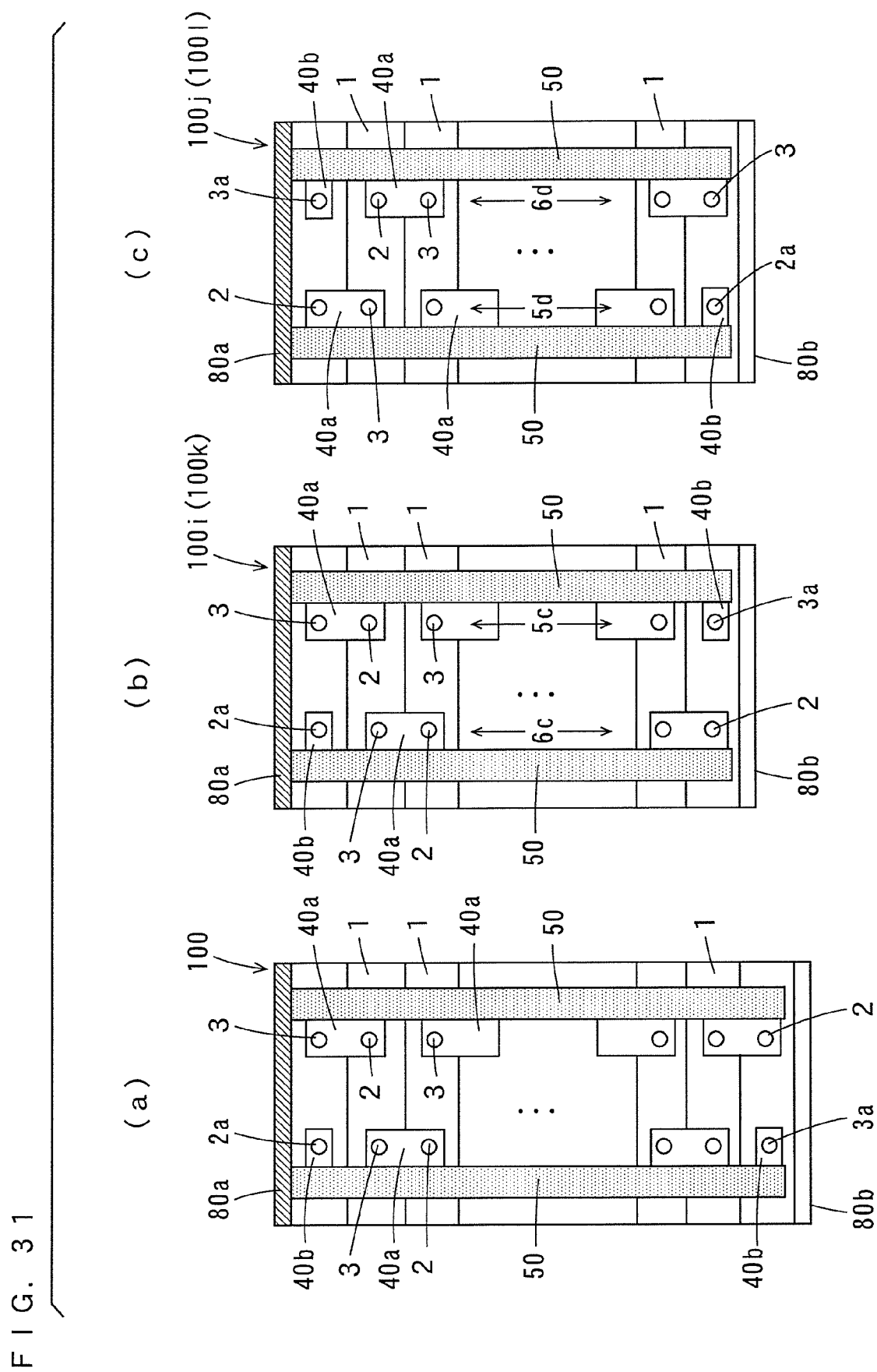
FIG. 31 shows schematic plan views of the battery modules.

FIG. 31 shows schematic plan views of the battery modules 100, 100*i*, 100*j*.

First, description will be made of differences between the battery module 100 and the battery module 100*i*. The battery module 100*k* has the same configuration as that of the battery module 100*i* of FIG. 31(*b*).

In the battery module 100*i* shown in FIG. 31(*b*), the low potential terminal 3*a* and the high potential terminal 2*a* are included in different terminal rows. The high potential terminal 2*a* and the low potential terminal 3*a* are included in the same terminal row when an even number of battery cells 1 are provided, and the high potential terminal 2*a* and the low potential terminal 3*a* are included in the different terminal rows when an odd number of the battery cells 1 are provided.

The number of the battery cells 1 in the battery module 100*i* shown in FIG. 31(*b*) is seventeen, which is less by one than the number of the battery cells 1 of the battery module 100 shown in FIG. 31(*a*).

Hereinafter, in two terminal rows that line up in the stacked direction of the battery cells 1, the terminal row including the low potential terminal 3*a* is referred to as a seventh terminal row 5*c*, and the terminal row including the high potential terminal 2*a* is referred to as an eighth terminal row 6*c* in each of the battery modules 100*i*, 100*k*.

Next, description will be made of differences between the battery module 100*i* and the battery module 100*j*. The battery module 100*l* has the same configuration as that of the battery module 100*j* of FIG. 31(*c*).

In the battery module 100*j* shown in FIG. 31(*c*), the plurality of bus bars 40*a*, 40*b* are attached such that the negative electrode terminal 3 of the battery cell 1 that is closest to the end plate 80*a* is the low potential terminal 3*a*, and the positive electrode terminal 2 of the battery cell 1 that is closest to the end plate 80*b* is the high potential terminal 2*a*.

Hereinafter, in two terminal rows that line up in the stacked direction of the battery cells 1, the terminal row including the high potential terminal 2*a* is referred to as a ninth terminal row 5*d*, and the terminal row including the low potential terminal 3*a* is referred to as a tenth terminal row 6*d* in each of the battery modules 100*j*, 100*l*.

As shown in FIG. 30, the battery modules 100*i*, 100*j* are arranged side by side along the stacked direction of the battery cells 1 at a given spacing in the housing 550. The battery modules 100*k*, 100*l* are arranged side by side along the stacked direction of the battery cells 1 at a given spacing. Hereinafter, the battery modules 100*i*, 100*j* arranged side by side is referred to as a module row T5, and the battery modules 100*k*, 100*l* arranged side by side is referred to as a module row T6.

In the housing 550, the module rows T5, T6 are sequentially arranged at a given spacing from the side of the side surface portion 550*a*. In this case, the battery modules 100*i*, 100*j* are arranged such that the end plate 80*a* of the battery module 100*i* is opposite to the side surface portion 550*d* and the end plate 80*a* of the battery module 100*j* is opposite to the side surface portion 550*b*. The battery modules 100*k*, 100*l* are arranged such that the end plate 80*a* of the battery module 100*k* is opposite to the side surface portion 550*b* and the end plate 80*a* of the battery module 100*l* is opposite to the side surface portion 550*d*.

The service plug 530, the HV connector 520, the contactor 510 and the battery ECU 200 are arranged to line up in this order from the side of the side surface portion 550*d* to the side of the side surface portion 550*b* in a region between the battery modules 100*k*, 100*l* and the side surface portion 550*c*.

The bus bar 40*b* attached to the low potential terminal 3*a* of the battery module 100*i* and the bus bar 40*b* attached to the high potential terminal 2*a* of the battery module 100*j* are connected to each other through the strip-shaped bus bar 551.

In this case, the low potential terminal 3*a* of the battery module 100*i* and the high potential terminal 2*a* of the battery module 100*j* are in close proximity to each other. Therefore, the low potential terminal 3*a* of the battery module 100*i* and the high potential terminal 2*a* of the battery module 100*j* can be connected to each other using the comparatively short bus bar 551.

One end of a power line 711 is connected to the bus bar 40*b* attached to the high potential terminal 2*a* of the battery module 100*i* through the connecting member 750, and one end of a power line 712 is connected to the bus bar 40*b* attached to the low potential terminal 3*a* of the battery module 100*l* through the connecting member 750. The other ends of the power lines 711, 712 are each connected to the service plug 530.

In this case, the high potential terminal 2*a* of the battery module 100*i* and the low potential terminal 3*a* of the battery module 100*l* are positioned in close proximity to the side surface portion 550*d* of the housing 550. The service plug 530 is positioned in close proximity to the side surface portion 550*d* in a region between the module row T6 and the side surface portion 550*c*.

Therefore, the power lines 711, 712 are arranged along the side surface portion 550*d*, so that the high potential terminal 2*a* of the battery module 100*i* and the low potential terminal 3*a* of the battery module 100*l* can be connected to the service plug 530 using the comparatively short power lines 711, 712, respectively. This prevents the power lines 711, 712 from coming in contact with other wiring or the like.

One end of a power line 713 is connected to the bus bar 40b attached to the low potential terminal 3a of the battery module 100j through the connecting member 750, and the other end of the power line 713 is connected to the bus bar 40b attached to the high potential terminal 2a of the battery module 100k through the connecting member 750.

In this case, the low potential terminal 3a of the battery module 100j and the high potential terminal 2a of the battery module 100k are positioned in close proximity to the side surface portion 550b of the housing 550. Therefore, the power line 713 is arranged along the side surface portion 550b, so that the low potential terminal 3a of the battery module 100j and the high potential terminal 2a of the battery module 100k can be connected to each other using the comparatively short power line 713.

One end of a power line 714 is connected to the bus bar 40b attached to the low potential terminal 3a of the battery module 100k through the connecting member 750, and one end of a power line 715 is connected to the bus bar 40b attached to the high potential terminal 2a of the battery module 100l through the connecting member 750. The other ends of the power lines 714, 715 are each connected to the contactor 510.

In this case, the low potential terminal 3a of the battery module 100k, the high potential terminal 2a of the battery module 100l and the contactor 510 are positioned in close proximity to one another. Thus, the low potential terminal 3a of the battery module 100k and the high potential terminal 2a of the battery module 100l can be connected to the contactor 510 using the comparatively short power lines 714, 715, respectively.

In each of the battery modules 100i, 100k, the pair of input connector 571 and output connector 572 is arranged in positions in close proximity to the end plate 80a on the one FPC 50 (the FPC 50 arranged along the eighth terminal row 6c).

In each of the battery module 100j, 100l, the pair of input connector 571 and output connector 572 is arranged in positions in close proximity to the end plate 80a on the one FPC 50 (the FPC 50 arranged along the tenth terminal row 6d).

In this case, in each of the battery modules 100i, 100k, the terminal cover 760 (FIG. 17) is provided to cover the eighth terminal row 6c and the FPC 50 arranged along the eighth terminal row 6c, and the input connector 571 and the output connector 572 are arranged on the terminal cover 760. In each of the battery modules 100j, 100l, the terminal cover 760 (FIG. 17) is provided to cover the tenth terminal row 6d and the FPC 50 arranged along the tenth terminal row 6d, and the input connector 571 and the output connector 572 are arranged on the terminal cover 760.

The input connector 571 and the output connector 572 are each connected to the state detecting circuit 20 (FIG. 2) attached to the end plate 80a through the harnesses 761, 762 (FIG. 18) and the relay connector 571a (FIG. 18).

The output connector 572 on the battery module 100k and the input connector 571 on the battery module 100l are connected to each other through a communication harness 721. This causes the state detecting circuit 20 of the battery module 100k and the state detecting circuit 20 of the battery module 100l to be connected to each other. The communication harness 721 is an example of a first communication line.

The output connector 572 on the battery module 100l and the input connector 571 on the battery module 100i are connected to each other through a communication harness 722. This causes the state detecting circuit 20 of the battery module 100l and the state detecting circuit 20 of the battery module 100i to be connected to each other.

The output connector 572 on the battery module 100i and the input connector 571 on the battery module 100j are connected to each other through a communication harness 723. This causes the state detecting circuit 20 of the battery module 100i and the state detecting circuit 20 of the battery module 100j to be connected to each other. The communication harness 723 is an example of a second communication line.

The input connector 571 on the battery module 100k and the output connector 572 on the battery module 100j are connected to the battery ECU 200 through communication harnesses 724, 725, respectively.

In this case, the input connector 571 on the battery module 100k and the output connector 572 on the battery module 100j are positioned in close proximity to the side surface portion 550b of the housing 550. The battery ECU 200 is positioned in close proximity to the side surface portion 550b in a region between the battery modules 100k, 100l and the side surface portion 550c.

Therefore, the communication harnesses 724, 725 are arranged along the side surface portion 550b, so that the input connector 571 on the battery module 100k and the output connector 572 on the battery module 100j can be connected to the battery ECU 200 using the comparatively short communication harnesses 724, 725, respectively.

The cell information detected by the state detecting circuit 20 of the battery module 100k is applied to the battery ECU 200 through the state detecting circuits 20 of the battery modules 100l, 100i, 100j. The cell information detected by the state detecting circuit 20 of the battery module 100l is applied to the battery ECU 200 through the state detecting circuits 20 of the battery modules 100i, 100j.

The cell information detected by the state detecting circuit 20 of the battery module 100i is applied to the battery ECU 200 through the state detecting circuit 20 of the battery module 100j. The cell information detected by the state detecting circuit 20 of the battery module 100j is directly applied to the battery ECU 200.

In the fourth embodiment, the battery modules 100i, 100j, 100k, 100l are arranged such that the state detecting circuits 20 thereof are opposite to the side surface portions 550b, 550d of the housing 550, respectively. In this case, heat is unlikely to stay in the periphery of each state detecting circuit 20. Therefore, heat is more effectively dissipated from each state detecting circuit 20.

In the fourth embodiment, the high potential terminals 2a and the low potential terminals 3a of the battery modules 100i, 100j, 100k, 100l can be connected to one another using the comparatively short bus bar 551 and the comparatively short power lines 711 to 715. This allows for reduction in cost of the apparatus and in the weight of the battery system 1000C.

The bus bar 551 and the power lines 711 to 715 are prevented from interfering with other components, wiring or the like, thus facilitating assembly and maintenance operations.

In the fourth embodiment, the state detecting circuits 20 of the battery modules 100i, 100j, 100k, 100l can be connected to the battery ECU 200 using the comparatively short communication harnesses 721 to 725, respectively. This allows for reduction in cost of the apparatus and in the weight of the battery system 1000C.

The communication harnesses 721 to 725 are prevented from interfering with other components, wiring or the like, thus facilitating assembly and maintenance operations.

The communication harnesses 721 to 723 are arranged in upper portions of the battery modules 100i, 100j, 100k, 100l, respectively, thereby preventing an increase in the space of the battery system 1000C occupied by the communication harnesses 721 to 723 and facilitating handling of the communication harnesses 721 to 723.

While the state detecting circuits 20 of the plurality of battery modules and the battery ECU 200 are connected in series and the state detecting circuit 20 of each battery module transmits the detected cell information to the state detecting circuit 20 of the adjacent battery module or the battery ECU 200 and receives the cell information from the state detecting circuit 20 of the adjacent battery module or the battery ECU 200 in the foregoing second to fourth embodiments, the present invention is not limited to this.

For example, the state detecting circuit 20 of each battery module may be connected to the battery ECU 200 through a bus. In this case, the state detecting circuit 20 of each battery module transmits the detected cell information to the battery ECU 200 through the bus. Therefore, the state detecting circuit 20 may not have a communication function for receiving the cell information.

The state detecting circuit 20 of each battery module may be individually connected in parallel to the battery ECU 200 through a communication harness. In this case, the state detecting circuit 20 of each battery module transmits the detected cell information to the battery ECU 200 through the communication harness. Therefore, the state detecting circuit 20 may not have a communication function for receiving the cell information.

[5] Fifth Embodiment

Next, description will be made of a battery module and a battery system including the same according to a fifth embodiment of the present invention.

(1) Configuration of the Battery System

Figure 32:
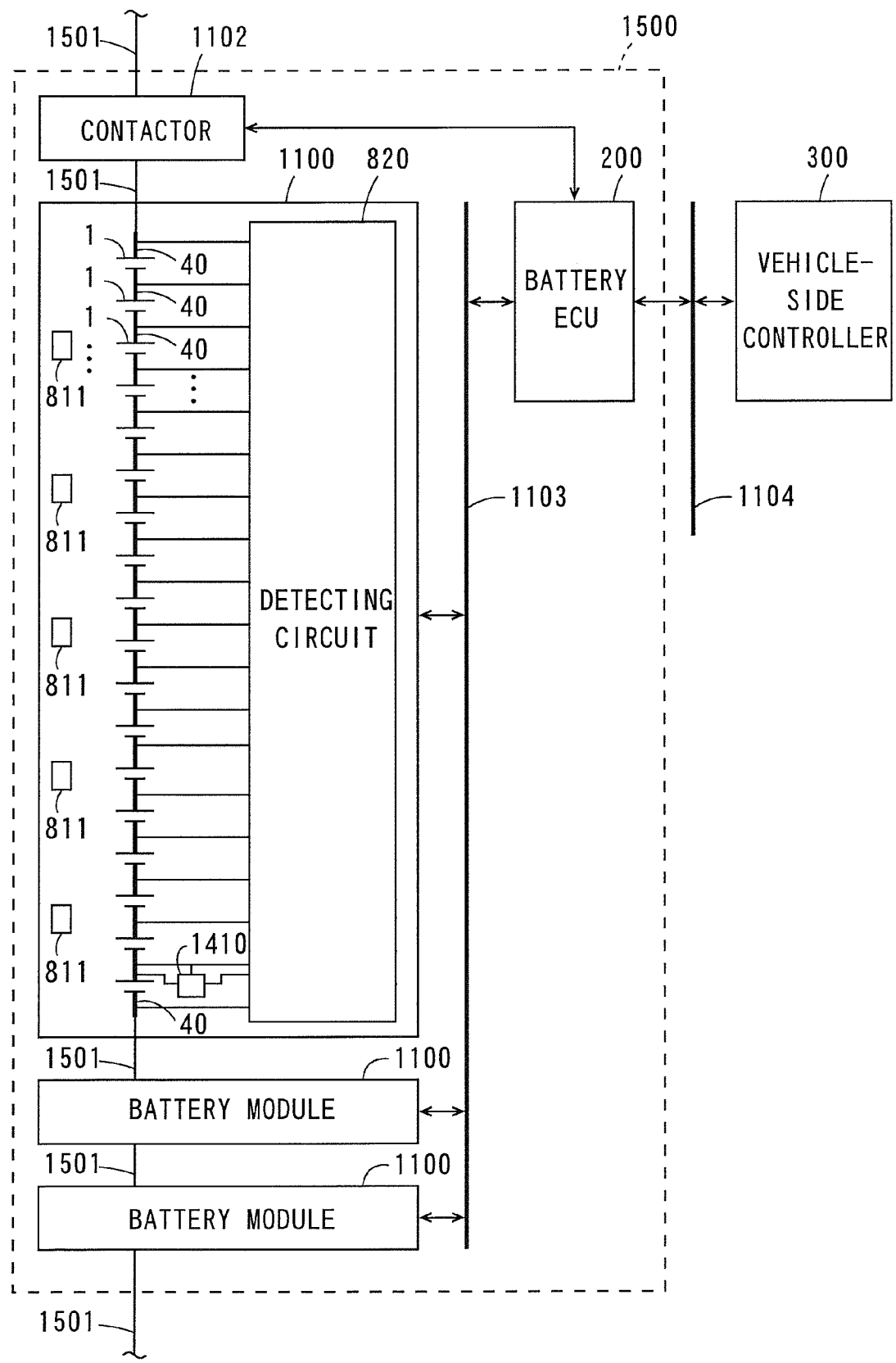
FIG. 32 is a block diagram showing the configuration of a battery system according to a fifth embodiment.

FIG. 32 is a block diagram showing the configuration of the battery system according to the fifth embodiment. As shown in FIG. 32, the battery system 1500 includes a plurality of battery modules 1100, the battery ECU (Electronic Control Unit) 200 and a contactor 1102, and is connected to the vehicle-side controller 300 through a bus 1104.

The plurality of battery modules 1100 of the battery system 1500 are connected to one another through power supply lines 1501. Each battery module 1100 includes a plurality of (eighteen in this example) battery cells 1, a plurality of (five in this example) temperature detecting elements 811 and a detecting circuit 820. The detecting circuit 820 corresponds to the semiconductor integrated circuit 20a in the foregoing first to fourth embodiments.

In each battery module 1100, the plurality of battery cells 1 are integrally arranged to be adjacent to one another, and connected in series through the plurality of bus bars 40. Each battery cell 1 is a secondary battery such as a lithium ion battery or a nickel metal hydride battery.

The battery cells 1 arranged at both ends of each of the battery modules 100 are connected to the power supply lines 1501 through the bus bars 40, respectively. In this manner, all the battery cells 1 of the plurality of battery modules 1100 are connected in series in the battery system 1500. The power supply lines 1501 pulled out from the battery system 1500 are connected to the load such as the motor of the electric vehicle.

The detecting circuit 820 is connected to each bus bar 40 through a conductor line 851 (see FIG. 42, described below). The detecting circuit 820 is electrically connected to each temperature detecting element 811. The detecting circuit 820 is an example of a voltage detecting circuit. The detecting circuit 820 detects a voltage between terminals (battery voltage) and temperature of each battery cell 1.

The detecting circuit 820 of each battery module 1100 is connected to the battery ECU 200 through the bus 1103. Thus, the voltage and temperature detected by the detecting circuit 820 are applied to the battery ECU 200.

Furthermore, an amplifying circuit 1410 for amplifying an amount of voltage drop caused by a current flowing through each of the bus bars 40 is provided between the bus bar 40 of the battery cell 1 at one end and the detecting circuit 820 in the present embodiment. The detecting circuit 820 applies a voltage value based on an output voltage from the amplifying circuit 1410 to the battery ECU 200. In this manner, the battery ECU 200 calculates a value of a current flowing through the battery module 1100. Details of the bus bar 40 and the amplifying circuit 1410 and details of calculation of the current value by the detecting circuit 80 and the battery ECU 200 will be described below.

The battery ECU 200 calculates the charged capacity of each battery cell 1 based on the voltage and temperature applied from each detecting circuit 20 and the detected current, for example, and controls charge/discharge of each battery module 1100 based on the charged capacity. In addition, the battery ECU 200 detects a state of each battery module 1100 such as the life of the battery cells 1, abnormality and so on based on the applied voltage and temperature and the detected current. The abnormality of the battery module 1100 includes overdischarge, overcharge or abnormal temperature of the battery cells 1, for example.

The contactor 1102 is inserted in the power supply line 1501 connected to the battery module 1100 at one end of the battery system 500. The battery ECU 200 turns off the contactor 1102 when it detects the abnormality of the battery module 1100. Since the current does not flow through each battery module 1100 in the case of an occurrence of the abnormality, the battery module 1100 is prevented from being abnormally heated.

The battery ECU 200 is connected to the vehicle-side controller 300 of the electric vehicle through the bus 1104. The charged capacity of each battery module 1100 (the charged capacity of each battery cell 1) is applied from the battery ECU 200 to the vehicle-side controller 300. The vehicle-side controller 300 controls power of the electric vehicle (a rotational speed of the motor, for example) based on the charged capacity. When the charged capacity of each battery module 1100 decreases, the vehicle-side controller 300 controls a power generating system, not shown, connected to the power supply line 1501 to cause each battery module 1100 to be charged.

(2) Details of the Battery Module

Figure 33:
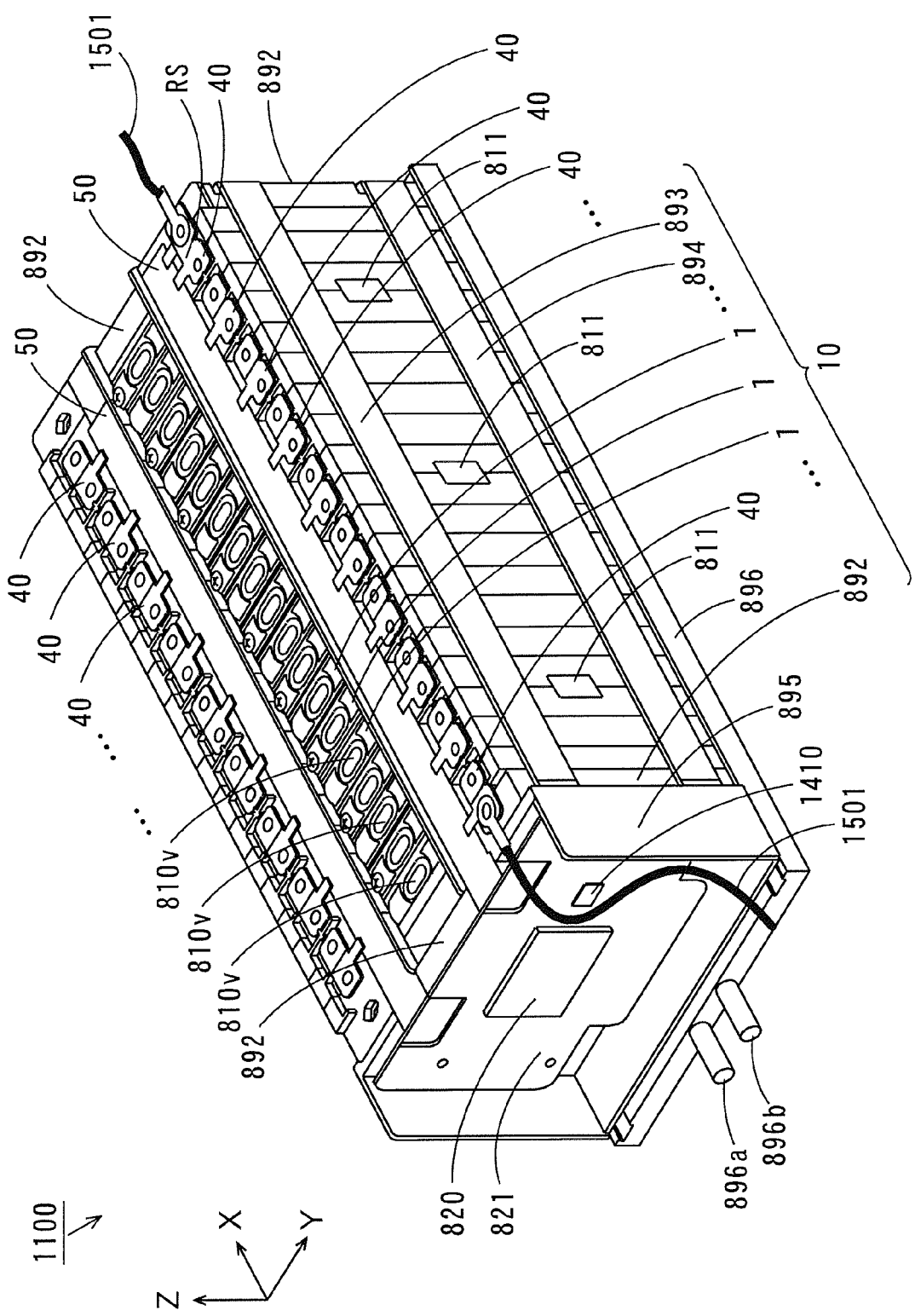
FIG. 33 is an external perspective view of the battery module.

Description will be made of details of the battery module 1100. FIG. 33 is an external perspective view of the battery module 1100, FIG. 34 is a plan view of the battery module 1100, and FIG. 35 is a side view of the battery module 1100.

Note that in FIGS. 33 to 35 and FIGS. 38 to 43 and 49, described below, three directions that are perpendicular to one another are defined as an X-direction, a Y-direction and a Z-direction as indicated by the arrows X, Y, Z. Note that the X-direction and the Y-direction are parallel to a horizontal plane, and the Z-direction is perpendicular to the horizontal plane in this example.

Figure 34:
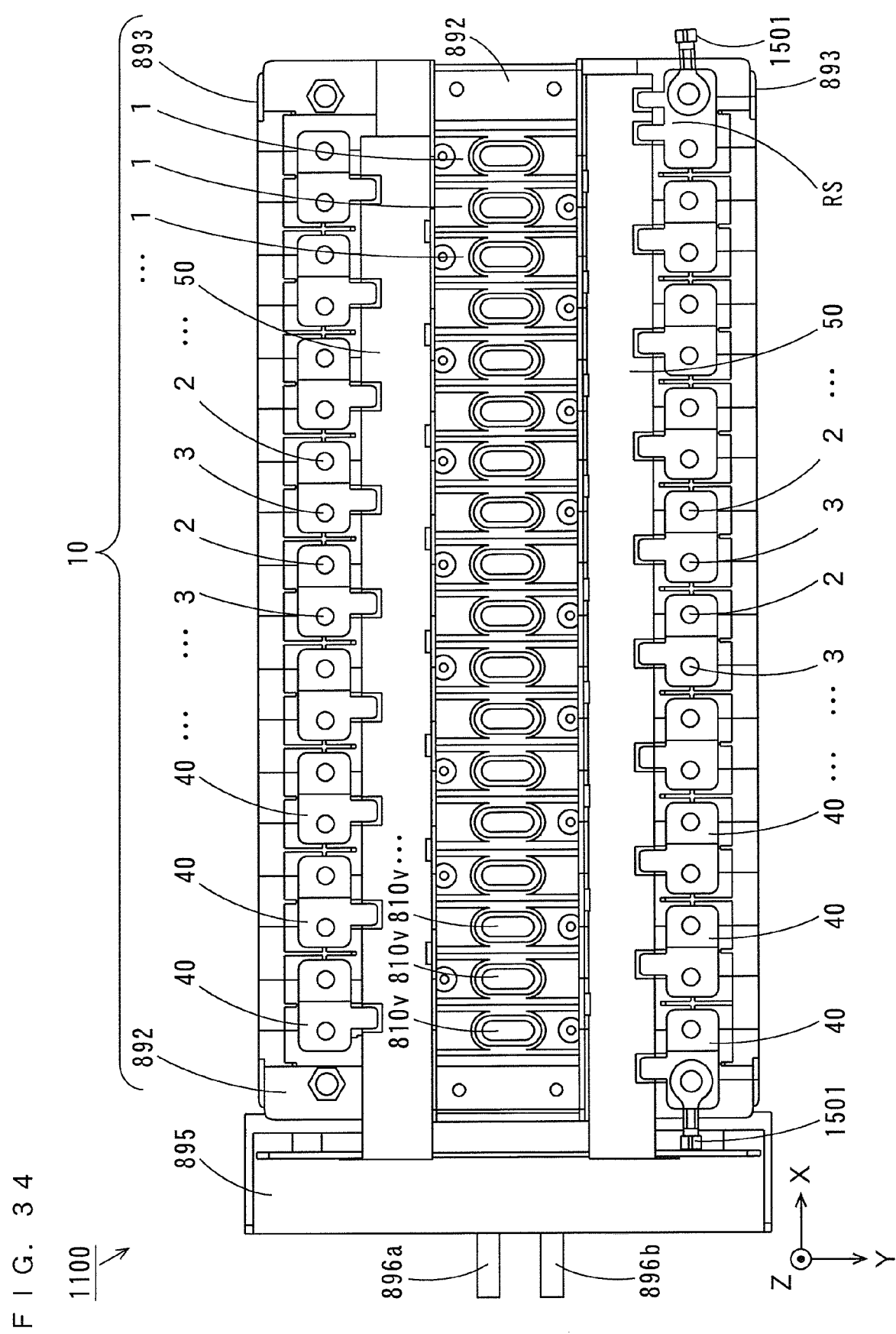
FIG. 34 is a plan view of the battery module.
Figure 35:
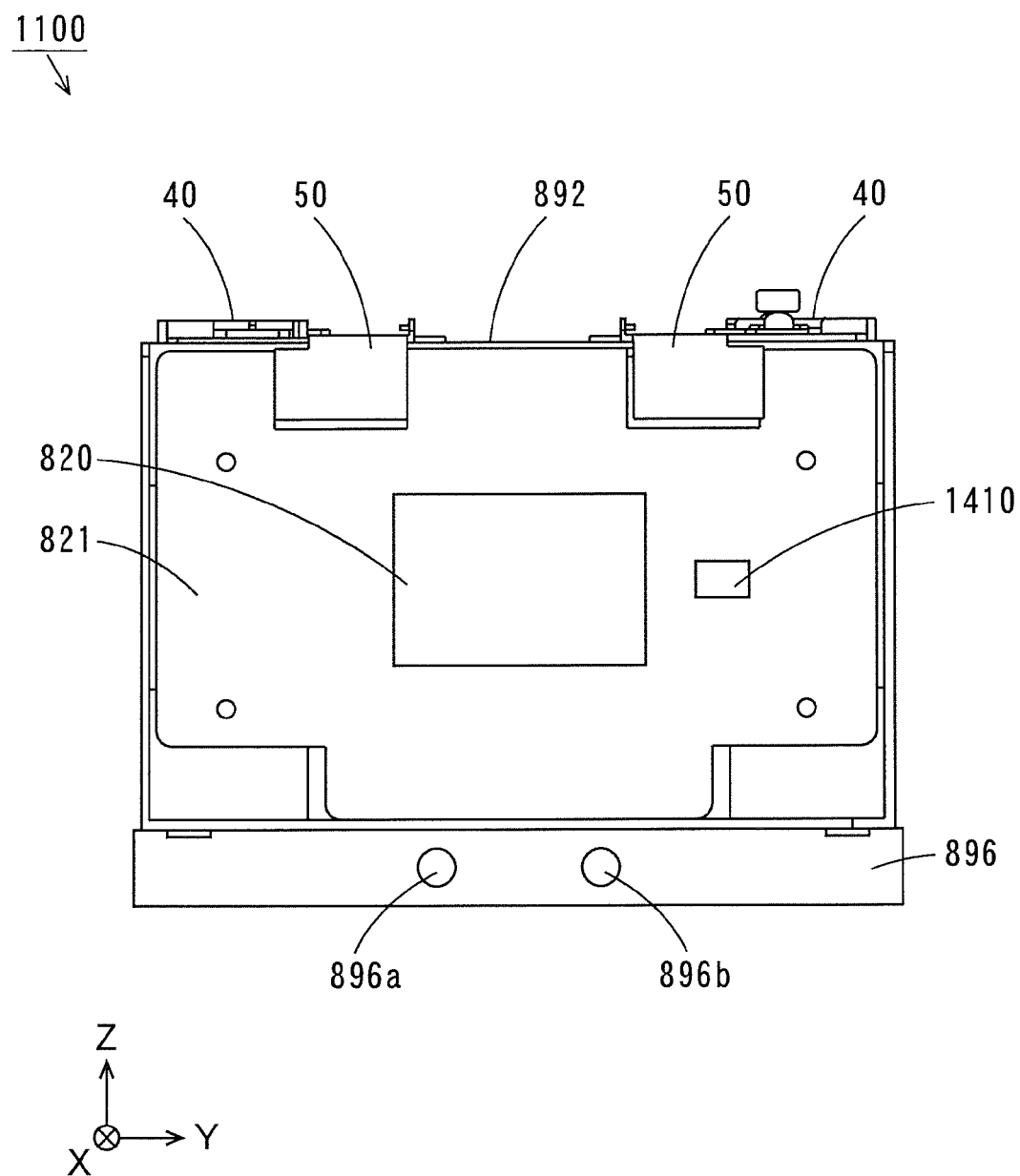
FIG. 35 is a side view of the battery module.

As shown in FIGS. 33 to 35, the plurality of battery cells 1 each having a flat and substantially rectangular parallelepiped shape are arranged along the X-direction in the battery module 1100. In this state, the plurality of battery cells 1 are integrally fixed by a pair of end plates 892, a pair of coupling fixtures 893 and a pair of coupling fixtures 894. In this manner, the battery block 10 is constituted by the plurality of battery cells 1, the pair of end plates 892, the pair of coupling fixtures 893 and the pair of coupling fixtures 894.

Each of the pair of end plates 892 has a substantially plate shape, and is arranged in parallel with the YZ plane. The pair of coupling fixtures 893 and the pair of coupling fixtures 894 are arranged to extend in the X-direction.

Connection portions for connecting the pair of coupling fixtures 893 and the pair of coupling fixtures 894 thereto are formed at four corners of each of the pair of end plates 892. The pair of coupling fixtures 893 is attached to the upper connection portions of the pair of end plates 892, and the pair of coupling fixtures 894 is attached to the lower connection portions of the pair of end plates 892 while the plurality of battery cells 1 are arranged between the pair of end plates 892. Accordingly, the plurality of battery cells 1 are integrally fixed while being arranged along the X-direction in the battery block 10.

A rigid printed circuit board (hereinafter abbreviated as printed circuit board) 821 is attached to one end plate 892. A protecting member 895 having a pair of side surface portions and a bottom surface portion is attached to the end plate 892 to protect both end portions and a lower portion of the printed circuit board 821. The printed circuit board 821 is protected by being covered with the protecting member 895. The detecting circuit 820 and the amplifying circuit 1410 are provided on the printed circuit board 821. The printed circuit board 821 corresponds to the circuit board 20b in the foregoing first to fourth embodiments. The printed circuit board 821 and the detecting circuit 820 constitute the voltage detecting circuit (state detecting circuit 20).

A cooling plate 896 is provided on the lower surface of the battery block 10 to come in contact with the plurality of battery cells 1. The cooling plate 896 has a refrigerant inlet 896a and a refrigerant outlet 896b. A circulation path that communicates with the refrigerant inlet 896a and the refrigerant outlet 896b is formed within the cooling plate 896. When a refrigerant such as cooling water flows in the refrigerant inlet 896a, the refrigerant passes through the circulation path within the cooling plate 896 and flows out from the refrigerant outlet 896b. This causes the cooling plate 896 to be cooled. As a result, the plurality of battery cells 1 are cooled.

Each of the plurality of battery cells 1 has the positive electrode terminal 2 on the upper surface portion thereof on either one end side or the other end side in the Y-direction, and has the negative electrode terminal 3 on the upper surface portion thereof on the opposite side. Each of the terminals 2, 3 is provided to project upward. The positive electrode terminals 2 of the battery cells 1 are formed of aluminum. The negative electrode terminals 3 of the battery cells 1 are formed of copper.

While the positive electrode terminals 2 of the battery cells 1 are formed of aluminum in this example, the terminals 2 may be formed of an alloy of aluminum and another metal instead. Similarly, while the negative electrode terminals 3 of the battery cells 1 are formed of copper, the terminals 3 may be formed of an alloy of copper and another metal instead.

Each of the battery cells 1 has a gas vent valve 810v at the center of its upper surface portion. When the internal pressure of the battery cell 1 rises to a given value, a gas in the battery cell 1 is discharged through the gas vent valve 810v. This prevents rise in the internal pressure of the battery cell 1.

In the present embodiment, a surface (upper surface) of the battery block 10 on which the positive electrode terminal 2, the negative electrode terminal 3 and the gas vent valve 810v of each battery cell 1 are arranged is an example of a first surface. The positive electrode terminals 2 and the negative electrode terminals 3 of the plurality of battery cells 1 are arranged to line up in two rows along the stacked direction (X-direction) of the plurality of battery cells 1. The positive electrode terminals 2 and the negative electrode terminals 3 in one row are an example of a first terminal row, and the positive electrode terminals 2 and the negative electrode terminals 3 in the other row are an example of a second terminal row.

In the following description, the battery cell 1 adjacent to one end plate 892 (the end plate 892 to which the printed circuit board 821 is attached) to the battery cell 1 adjacent to the other end plate 892 are referred to as first to eighteenth battery cells 1.

As illustrated in FIG. 34, in the battery module 1100, the battery cells 1 are arranged such that the respective positional relationships between the positive electrode terminals 2 and the negative electrode terminals 3 in the Y-direction in the adjacent battery cells 1 are opposite to each other.

Thus, between the two adjacent battery cells 1, the positive electrode terminal 2 and the negative electrode terminal 3 of one of the battery cells 1 are respectively in close proximity to the negative electrode terminal 3 and the positive electrode terminal 2 of the other battery cell 1. In this state, the bus bar 40 is attached to the two electrodes in close proximity to each other. Thus, the plurality of battery cells 1 are connected in series.

More specifically, the common bus bar 40 is attached to the negative electrode terminal 3 of the first battery cell 1 and the positive electrode terminal 2 of the second battery cell 1. The common bus bar 40 is attached to the negative electrode terminal 3 of the second battery cell 1 and the positive electrode terminal 2 of the third battery cell 1.

Similarly, the common bus bar 40 is attached to the negative electrode terminal 3 of each of the odd-numbered battery cells 1 and the positive electrode terminal 2 of each of the even-numbered battery cells 1 adjacent thereto. The common bus bar 40 is attached to the negative electrode terminal 3 of each of the even-numbered battery cells 1 and the positive electrode terminal 2 of each of the odd-numbered battery cells 1 adjacent thereto.

Meanwhile, the bus bars 40 for externally connecting the power supply line 1501 are respectively attached to the positive electrode terminal 2 of the first battery cell 1 and the negative electrode terminal 3 of the eighteenth battery cell 1. The bus bar 40 attached to the negative electrode terminal 3 of the eighteenth battery cell 1 is used as a shunt resistance RS for current detection, as described below.

In this manner, the plurality of bus bars 40 are arranged on the battery block 10 in two rows along the X-direction. The two rectangular flexible printed circuit boards (hereinaftef abbreviated as FPCs) 50 extending in the X-direction are arranged in a portion between the two rows of the bus bars 40.

One FPC 50 is arranged between the gas vent valves 810v of the plurality of battery cells 1 and the bus bars 40 in one row so as not to overlap the gas vent valves 810v of the plurality of battery cells 1. Similarly, the other FPC 50 is arranged between the gas vent valves 810v of the plurality of battery cells 1 and the bus bars 40 in the other row so as not to overlap the gas vent valves 810v of the plurality of battery cells 1.

The one FPC 50 is an example of a first FPC, and the other FPC 50 is an example of a second FPC in the present embodiment. That is, the one FPC 50 (the first FPC) is arranged to extend along the terminals 2, 3 in the one row on the same side as the terminals 2, 3 in the other row (the second terminal row) with respect to the terminals 2, 3 in the one row (the first terminal row). The other FPC 50 (the second FPC) is arranged to extend along the terminals 2, 3 in the other row on the same side as the terminals 2, 3 in the one row (the first terminal row) with respect to the terminals 2, 3 in the other row (the second terminal row).

When the first terminal row and the second terminal row are arranged on the common surface (the first surface) of the battery block as in the present embodiment, the first FPC may be provided between the first terminal row and the second terminal row, and the second FPC may be provided between the first terminal row and the second terminal row.

The one FPC 50 is connected in common to the plurality of bus bars 40 in the one row. Similarly, the other FPC 50 is connected in common to the plurality of bus bars 40 in the other row.

Each FPC 50 is mainly constituted by an insulating layer and a plurality of conductor lines 851, 852 (see FIG. 42, described below) formed thereon, and has bending characteristics and flexibility. Polyimide, for example, is used as the material for the insulating layer constituting the FPC 50, and copper, for example, is used as the material for the conductor lines 851, 852. The conductor lines 851, 852 are examples of the voltage detecting line.

While copper is used as the material for the conductor lines 851, 852 in this example, an alloy of copper and another metal may be used instead.

Each FPC 50 is bent downward at an upper end portion of one end plate 892 to be connected to the printed circuit board 821.

With the FPCs 50 connected to the printed circuit board 821, the plurality of bus bars 40 are connected to the detecting circuit 820 through the plurality of conductor lines 851. The bus bar 40 attached to the battery cell 1 on the one end (the eighteenth battery cell 1 in this example) is connected to the amplifying circuit 1410 through the conductor line 851 and the conductor line 852 that is described below. Details will be described below.

(3) Configurations of the Bus Bars and the FPCs

Next, description will be made of details of the configurations of the bus bars 40 and the FPCs 50. Hereinafter, the bus bar 40 for connecting the positive electrode terminal 2 and the negative electrode terminal 3 of the two adjacent battery cells 1 is referred to as a voltage bus bar 40x, and the bus bar 40 for connecting the battery cell 1 on the one end (the eighteenth battery cell 1 in this example) and the power supply line 1501 is referred to as a voltage/current bus bar 40y. The foregoing voltage bus bar 40x is used as the bus bar for connecting the battery cell 1 on the other end (the first battery cell 1 in this example) and the power supply line 1501.

Figure 36:
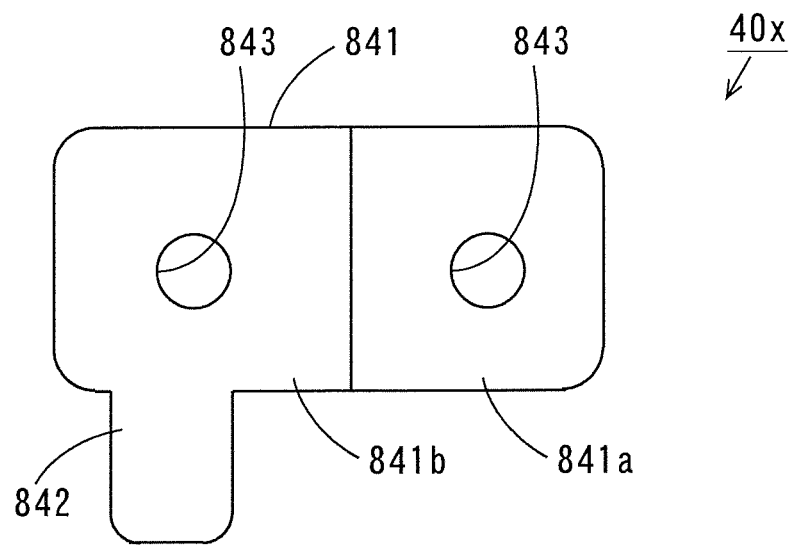
FIG. 36 is a plan view of a voltage bus bar.
Figure 37:
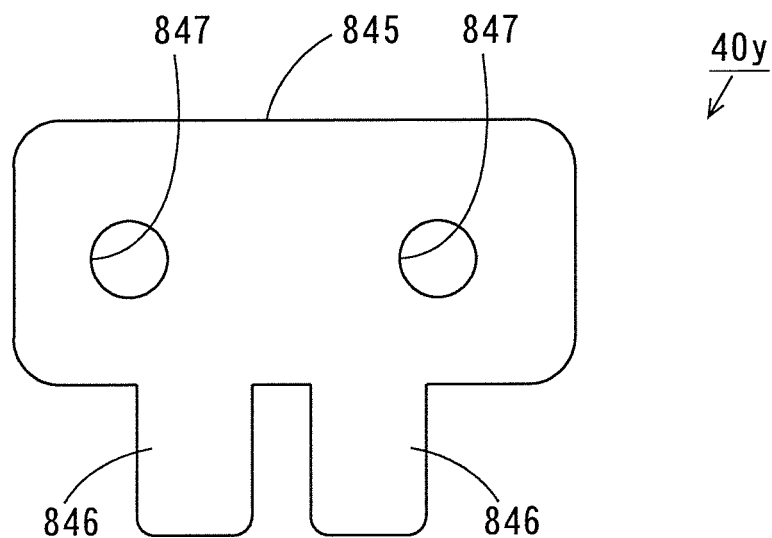
FIG. 37 is a plan view of a voltage/current bus bar.

FIG. 36 is a plan view of the voltage bus bar 40x, and FIG. 37 is a plan view of the voltage/current bus bar 40y.

As shown in FIG. 36, the voltage bus bar 40x includes a base portion 841 having a substantially rectangular shape and an attachment portion 842. The base portion 841 is formed of a clad material produced by subjecting two kinds of metal to contact bonding. The base portion 841 is divided into two regions 841a, 841b. The region 841a of the base portion 841 is formed of aluminum, and the region 841b of the base portion 841 is formed of copper.

While the region 841a of the base portion 841 is formed of aluminum in this example, the region 841a may be formed of an alloy of aluminum and another metal. Similarly, while the region 841b of the base portion 841 is formed of copper, the region 841b may be formed of an alloy of copper and another metal instead.

The attachment portion 842 is formed to project from a long side of the region 841b of the base portion 841. Electrode connection holes 843 are formed in the regions 841a, 841b of the base portion 841, respectively.

The voltage bus bar 40x of FIG. 36 with its one surface directed upward is arranged as each voltage bus bar 40x in the one row of FIGS. 33 and 34, and the voltage bus bar 40x of FIG. 36 with its other surface directed upward is arranged as each voltage bus bar 40x in the other row.

As shown in FIG. 37, the voltage/current bus bar 40y includes a substantially rectangular base portion 845 and a pair of attachment portions 846. The pair of attachment portions 846 is formed at a spacing to project from a long side of the base portion 845. A pair of electrode connection holes 847 is formed in the base portion 845. The voltage/current bus bar 40y is formed of copper. A region of the voltage/current bus bar 40y extending from one attachment portion 846 to the other attachment portion 846 via the base portion 845 is used as the shunt resistance RS (see FIGS. 33 and 34). Details will be described below.

While the voltage/current bus bar 40y is formed of copper in this example, the voltage/current bus bar 40y may be formed of an alloy of copper and another metal instead.

Figure 38:
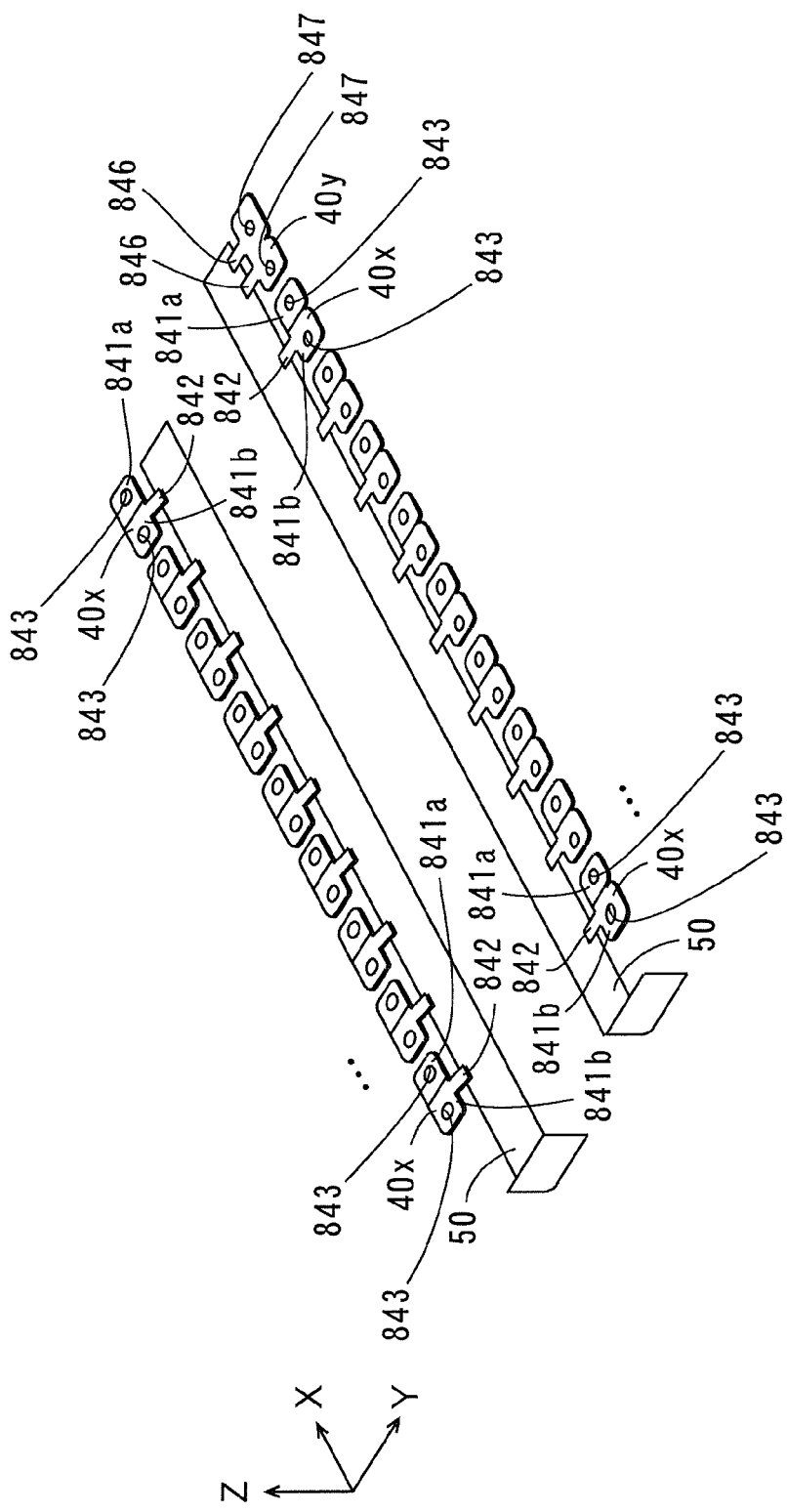
FIG. 38 is an external perspective view showing a state in which a plurality of voltage bus bars and the voltage/current bus bar are attached to the FPC.

FIG. 38 is an external perspective view showing a state in which a plurality of voltage bus bars 40x and the voltage/current bus bar 40y are attached to the FPCs 50. As shown in FIG. 38, the attachment portions 842 of the plurality of voltage bus bars 40x and the pair of attachment portions 846 of the voltage/current bus bar 40y are attached to the two FPCs 50 at given spacings along the X-direction.

In preparation of the battery module 1100, the two FPCs 50 to which the plurality of voltage bus bars 40x and the voltage/current bus bar 40y are attached in the foregoing manner are provided on the battery block 10.

The positive electrode terminal 2 and the negative electrode terminal 3 of the adjacent battery cells 1 are fitted in the electrode connection holes 843 of the regions 841a and 841b of the voltage bus bar 40x, respectively. In this state, the positive electrode terminal 2 and the negative electrode terminal 3 of the battery cell 1 are laser-welded to the regions 841a and 841b of the voltage bus bar 40x, respectively. This causes the plurality of battery cells 1 and the plurality of voltage bus bars 40x to be fixed to each other.

As described above, the positive electrode terminal 2 of the battery cell 1 is formed of aluminum, and the negative electrode terminal 3 is formed of copper. The positive electrode terminal 2 of the battery cell 1 is laser-welded to the region 841a of the voltage bus bar 40x made of aluminum, and the negative electrode terminal 3 of the battery cell 1 is laser-welded to the region 841b of the voltage bus bar 40x made of copper. In this case, bimetallic corrosion does not occur between the positive electrode terminal 2 of the battery cell 1 and the voltage bus bar 40x and between the negative electrode terminal 3 of the battery cell 1 and the voltage bus bar 40x. This results in improved durability and reliability of the battery module 1100.

Figure 39:
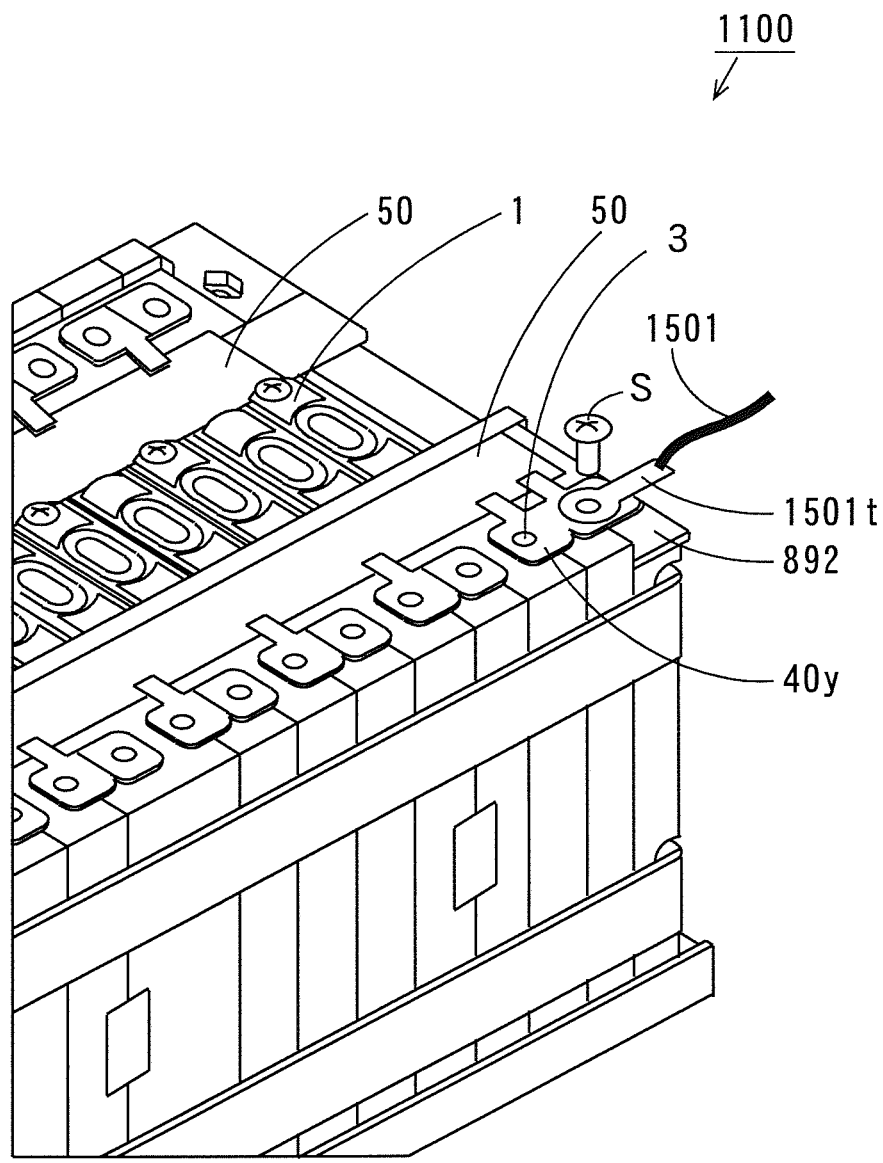
FIG. 39 is an external perspective view of one end of the battery module 1100.

FIG. 39 is an external perspective view of the one end of the battery module 1100. As shown in FIG. 39, the power supply line 1501 is connected to the negative electrode terminal 3 of the battery cell 1 (the eighteenth battery cell 1 in this example) at the one end through the voltage/current bus bar 40y. The power supply line 1501 has a ring terminal 1501t made of copper, for example, at its end.

While the power supply line 1501 and the ring terminal 1501t are formed of copper in this example, the power supply line 1501 and the ring terminal 1501t may be formed of an alloy of copper and another metal instead.

The negative electrode terminal 3 of the battery cell 1 at the one end is fitted in the one electrode connection hole 847 (see FIG. 37) of the voltage/current bus bar 40y. In this state, the negative electrode terminal 3 of the battery cell 1 at the one end is laser-welded to the voltage/current bus bar 40y. This causes the voltage/current bus bar 40y to be fixed to the negative electrode terminal 3 of the battery cell 1 at the one end and causes the voltage/current bus bar 40y to be electrically connected to the negative electrode terminal 3 of the battery cell 1.

A screw S is screwed in a screw hole formed in the one end plate 892 of the battery module 1100 through a through hole of the ring terminal 1501t of the power supply line 1501 and the other electrode connection hole 847 (see FIG. 37) of the voltage/current bus bar 40y. This causes the voltage/current bus bar 40y to be fixed to the one end plate 892 and causes the voltage/current bus bar 40y to be electrically connected to the ring terminal 1501t of the power supply line 1501.

As described above, the negative electrode terminal 3 of the battery cell 1 at the one end is laser-welded to the voltage/current bus bar 40y made of copper. The ring terminal 1501t of the power supply line 1501 is attached to the voltage/current bus bar 40y made of copper.

In this case, bimetallic corrosion does not occur between the negative electrode terminal 3 of the battery cell 1 at the one end and the voltage/current bus bar 40y and between the ring terminal 1501t of the power supply line 1501 and the voltage/current bus bar 40y. The voltage/current bus bar 40y is fixed to the one end plate 892 by the screw S, thus preventing the FPC 50 from being damaged and the voltage/current bus bar 40y from being separated from the FPC 50 even though a tensile force is applied on the power supply line 1501. This results in improved durability and reliability of the battery module 1100.

Figure 40:
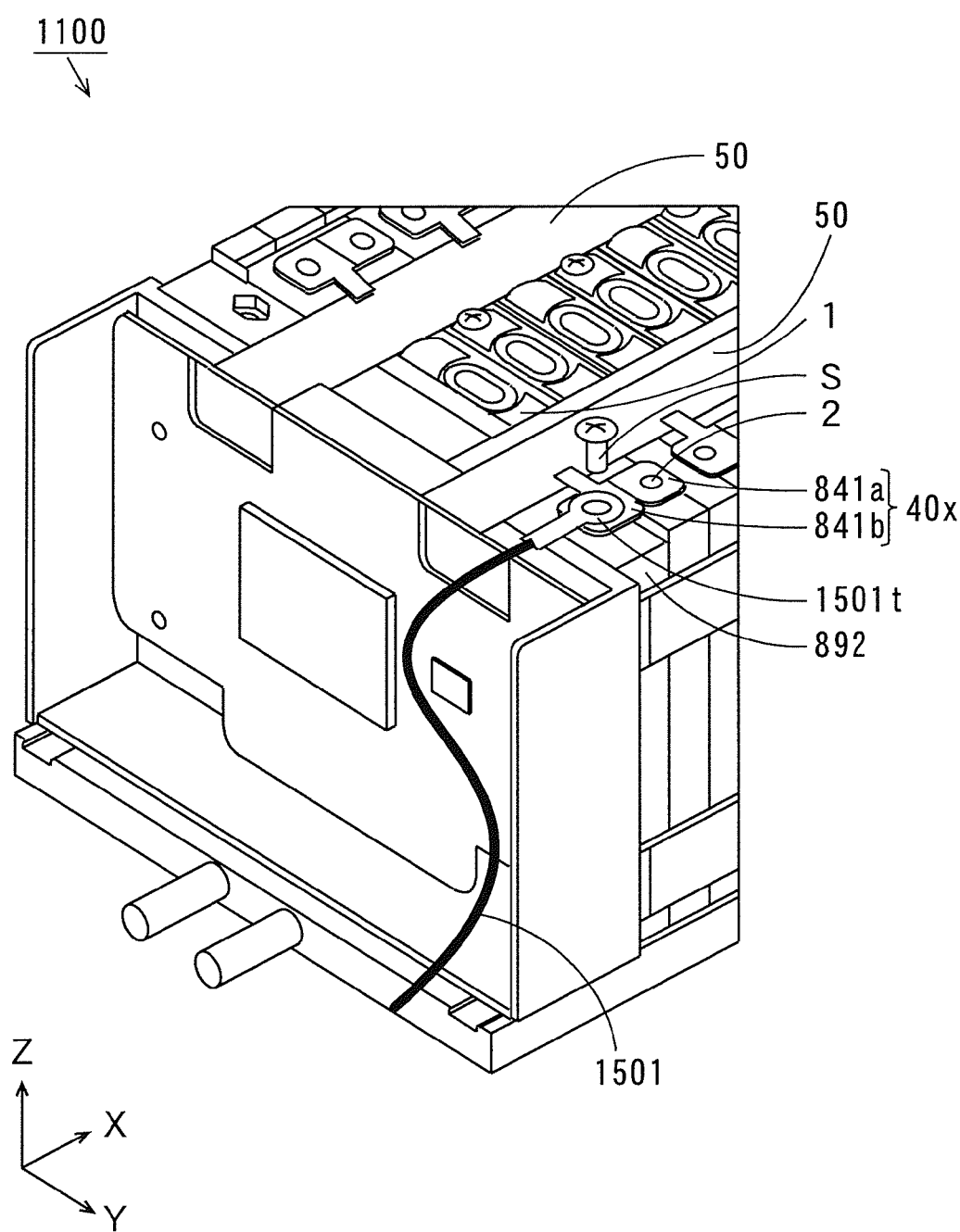
FIG. 40 is an external perspective view of the other end of the battery module 1100.

FIG. 40 is an external perspective view of the other end of the battery module 1100. As shown in FIG. 40, the power supply line 1501 is connected to the positive electrode terminal 2 of the battery cell 1 at the other end (the first battery cell 1 in this example) through the voltage bus bar 40x.

The positive electrode terminal 2 of the battery cell 1 at the other end is fitted in the electrode connection hole 843 (see FIG. 36) of the region 841a of the voltage bus bar 40x. In this state, the positive electrode terminal 2 of the battery cell 1 at the other end is laser-welded to the region 841a of the voltage bus bar 40x. This causes the voltage bus bar 40x to be fixed to the positive electrode terminal 2 of the battery cell 1 at the other end and causes the region 841a of the voltage bus bar 40x to be electrically connected to the positive electrode terminal 2 of the battery cell 1.

A screw S is screwed in a screw hole formed in the other end plate 892 of the battery module 1100 through a through hole of the ring terminal 1501t of the power supply line 1501 and the electrode connection hole 843 (see FIG. 36) of the region 841b of the voltage bus bar 40x. This causes the voltage bus bar 40x to be fixed to the other end plate 892 and causes the region 841b of the voltage bus bar 40x to be electrically connected to the ring terminal 1501t of the power supply line 1501.

As described above, the positive electrode terminal 2 of the battery cell 1 at the other end is laser-welded to the region 841a of the voltage bus bar 40x made of aluminum. The ring terminal 1501t of the power supply line 1501 is attached to the region 841b of the voltage bus bar 40x made of copper.

In this case, metallic corrosion does not occur between the positive electrode terminal 2 of the battery cell 1 at the other end and the voltage bus bar 40x and between the ring terminal 1501t of the power supply line 1501 and the voltage bus bar 40x. The voltage bus bar 40x is fixed to the other end plate 892 by the screw S, thus preventing the FPC 50 from being damaged and the voltage bus bar 40x from being separated from the FPC 50 even though a tensile force is applied on the power supply line 1501. This results in improved durability and reliability of the battery module 1100.

In this manner, the plurality of voltage bus bars 40x and the voltage/current bus bar 40y are attached to the plurality of battery cells 1, and the FPCs 50 are held in a substantially horizontal attitude by the plurality of voltage bus bars 40x and the voltage/current bus bar 40y.

Figure 41:
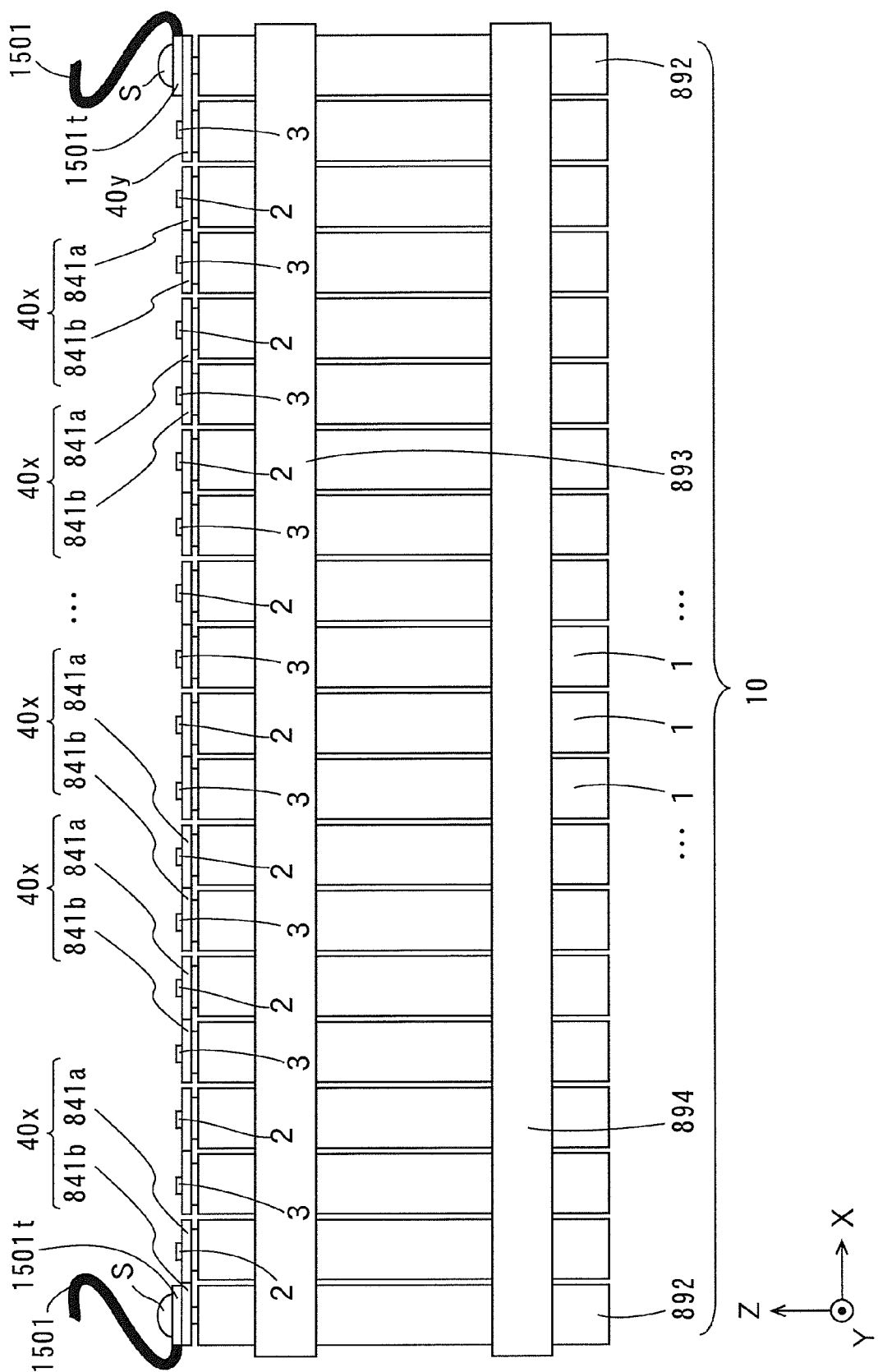
FIG. 41 is a side view of the battery block 10.

FIG. 41 is a side view of the battery block 10. As described above, the plurality of voltage bus bars 40x and the voltage/current bus bar 40y are laser-welded to the positive electrode terminals 2 and the negative electrode terminals 3 of the battery cells 1, thus eliminating the need for coupling members that couple the plurality of voltage bus bars 40x and the voltage/current bus bar 40y to the battery cells 1. This allows for reduced size of the battery block 10 in the height direction (Z-direction).

(4) Connection among the Bus Bars, the FPCs and the Detecting Circuit

Here, description will be made of details of soldering in the battery module 1100 of the present example. Description will be made of connection of the plurality of voltage bus bars 40x and the voltage/current bus bar 40y to the detecting circuit 820. FIGS. 42 and 43 are schematic plan views for illustrating connection of the plurality of voltage bus bars 40x and the voltage/current bus bar 40y to the detecting circuit 820.

Figure 42:
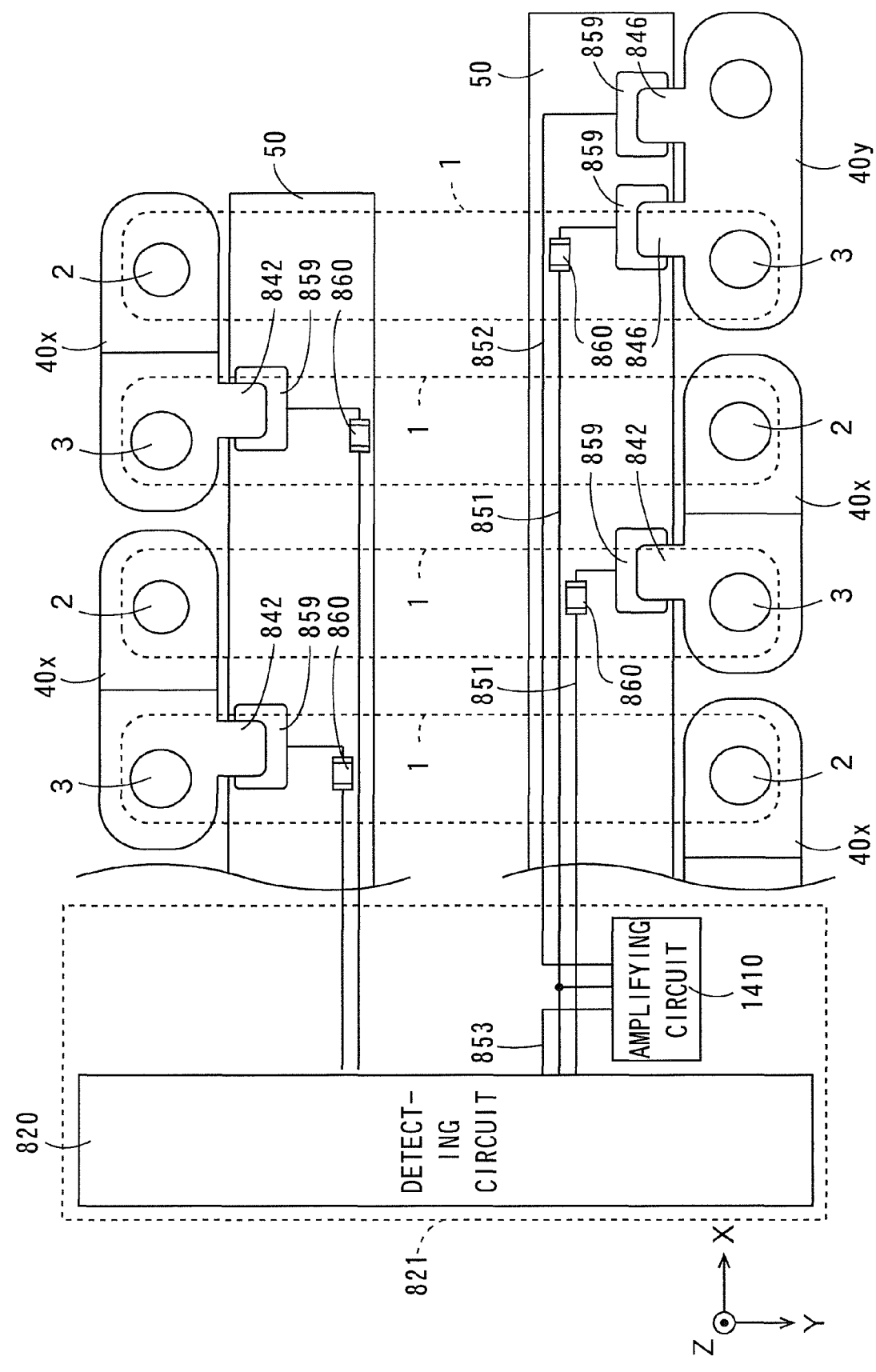
FIG. 42 is a schematic plan view for illustrating connection of the plurality of voltage bus bars and the voltage/current bus bar to a detecting circuit.
Figure 43:
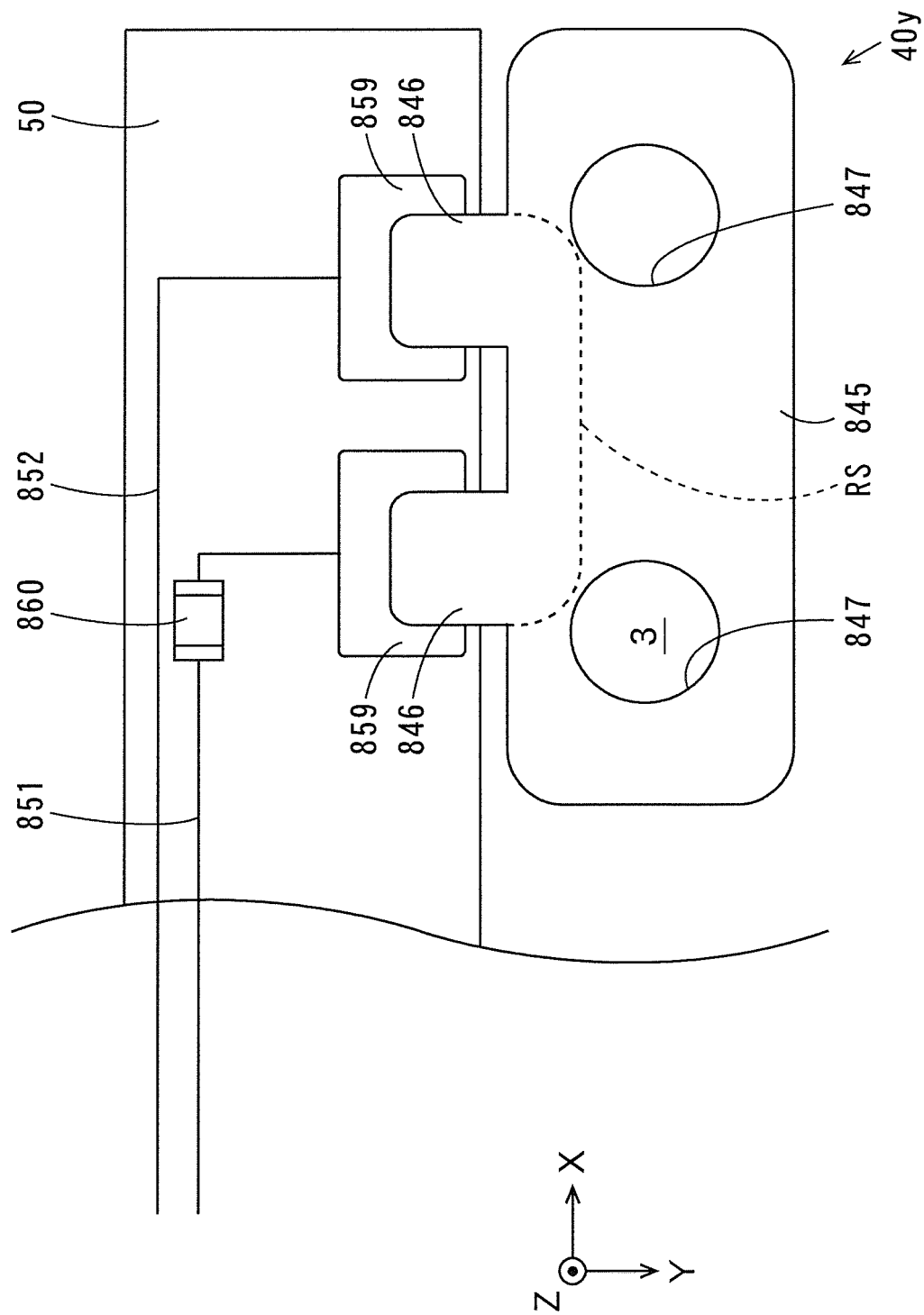
FIG. 43 is a schematic plan view for illustrating connection of the plurality of voltage bus bars and the voltage/current bus bar to the detecting circuit.

As shown in FIG. 42, the one FPC 50 is connected in common to the plurality of voltage bus bars 40x in the one row. The other FPC 50 is connected in common to the plurality of voltage bus bars 40x and the voltage/current bus bar 40y in the other row. A plurality of conductive plates 859, the plurality of conductor lines 851 and the plurality of PTC elements 860 corresponding to the attachment portions 842 of the plurality of voltage bus bars 40x, respectively, are provided in the one FPC 50. The attachment portions 842 of the plurality of voltage bus bars 40x are attached to the corresponding conductive plates 859 on the one FPC 50 by soldering.

The conductive plates 859 corresponding to the attachment portions 842 of the plurality of voltage bus bars 40x, respectively, are connected to the detecting circuit 820 through the conductor lines 851 and conductor lines on the printed circuit board 821. This causes the plurality of voltage bus bars 40x to be electrically connected to the detecting circuit 820.

Similarly, a plurality of conductive plates 859, the plurality of conductor lines 851 and the plurality of PTC elements 860 corresponding to the attachment portions 842 of the plurality of voltage bus bars 40x, respectively, are provided in the other FPC 50. The conductive plate 859, the conductor line 851 and the plurality of PTC elements 860 corresponding to the one attachment portion 846 of the voltage/current bus bar 40y are provided in the other FPC 50. The conductive plate 859, the conductor line 852 corresponding to the other attachment portion 846 of the voltage/current bus bar 40y are provided in the other FPC 50.

The attachment portions 842 of the plurality of voltage bus bars 40x and the pair of attachment portions 846 of the voltage/current bus bar 40y are attached to the corresponding conductive plates 859 on the other FPC 50 by soldering.

The conductive plates 859 corresponding to the attachment portions 842 of the plurality of voltage bus bars 40x, respectively, are connected to the detecting circuit 820 through the conductor lines 851 and the conductor lines on the printed circuit board 821. This causes the plurality of voltage bus bars 40x to be electrically connected to the detecting circuit 820.

The plurality of conductor lines 851 and the conductive plates 859 are formed of copper. While the conductive plates 859 are formed of copper in this example, the conductive plates 859 may be formed of an alloy of copper and another metal (a copper alloy) instead.

Also, the regions 841b of the base portions 841 of the voltage bus bars 40x and the voltage/current bus bar 40y soldered to the conductive plates 859 each are formed of copper or a copper alloy. In this case, the soldering of the conductive plates 859 of the FPCs 50 to the regions 841b of the base portions 841 of the voltage bus bars 40x and the voltage/current bus bar 40y is realized by connection between copper and copper or connection between the copper alloy and the copper alloy, which leads to stronger connection than soldering of aluminum or an alloy of aluminum and another metal (an aluminum alloy) to copper or the copper alloy.

Accordingly, in connection of the plurality of voltage bus bars 40x and the voltage/current bus bar 40y to the FPCs 50, the voltage bus bar 40x is used as a bus bar for connecting the battery cell 1 at the other end and the power supply line 1501.

That is, a bus bar formed of aluminum or an aluminum alloy can be used as the bus bar for connecting the power supply line 1501 and the positive electrode terminal 2 of the battery cell 1 at the other end; however, the voltage bus bar 40x made of the clad material is used as the bus bar for connecting the power supply line 1501 and the positive electrode terminal 2 of the battery cell 1 at the other end for stronger connection between the bus bar and the FPC 50 in this example.

As described above, the attachment portions 842 of the plurality of voltage bus bars 40x and the pair of attachment portions 846 of the voltage/current bus bar 40y made of copper or the copper alloy are soldered to the conductive plates 859 of the FPCs 50 in this example. Therefore, bimetallic corrosion does not occur between the conductive plates 859 of the FPCs 50 and the attachment portions 842 and the attachment portions 846 of the plurality of voltage bus bars 40x and the voltage/current bus bar 40y. This improves durability and reliability of the battery module 1100.

The PTC element 860 is inserted in the conductor line 851. The PTC element 860 has such resistance temperature characteristics as to have a resistance value rapidly increasing when its temperature exceeds a certain value. Therefore, if a short occurs in the detecting circuit 820 and the conductor line 851, for example, the temperature of the PTC element 860 that rises because of the current flowing through the short-circuited path causes the resistance value of the PTC element 860 to increase. Accordingly, a large current is inhibited from flowing through the short-circuited path including the PTC element 860.

The region of the voltage/current bus bar 40y extending from one attachment portion 846 to the other attachment portion 846 via the base portion 845 is used as the shunt resistance RS as shown in FIG. 43. The resistance value of the shunt resistance RS between the one conductive plate 859 and the other conductive plate 859 is preset.

As shown in FIG. 42, the conductor line 851 corresponding to the voltage/current bus bar 40y is connected to one input terminal of the amplifying circuit 1410 and the detecting circuit 820 through the conductor lines on the printed circuit board 821. Meanwhile, the conductor line 852 corresponding to the voltage/current bus bar 40y is connected to the other input terminal of the amplifying circuit 1410 through the conductor line on the printed circuit board 821. An output terminal of the amplifying circuit 1410 is connected to the detecting circuit 820 through a conductor line 853 on the printed circuit board 821.

In this manner, the detecting circuit 820 detects the voltage between the terminals of each battery cell 1 based on the voltages of the plurality of voltage bus bars 40x and the voltage/current bus bar 40y.

The detecting circuit 820 detects the voltage value at both ends of the shunt resistance RS based on the output voltage from the amplifying circuit 1410. The voltage value detected by the detecting circuit 820 is applied to the battery ECU 200 of FIG. 32.

The battery ECU 200 includes a CPU (Central Processing Unit) and a memory, for example. In the present embodiment, the memory of the battery ECU 200 previously stores the resistance value of the shunt resistance RS in the voltage/current bus bar 40y.

The battery ECU 200 calculates the value of the current flowing through the voltage/current bus bar 40y by dividing the voltage value at the both ends of the shunt resistance RS applied from the detecting circuit 820 by the resistance value of the shunt resistance RS stored in the memory. In this manner, the value of the current flowing among the plurality of battery cells 1 is detected.

Here, the resistance value of the shunt resistance RS may be previously calculated based on the length and cross sectional area of the path of the current, and the calculated value may be stored in the memory in the battery ECU 200. Alternatively, the resistance value of the shunt resistance RS may be previously measured, and the measured value may be stored in the memory in the battery ECU 200. The temperature of the voltage/current bus bar 40y may be detected by the temperature detecting element 811, and the resistance value of the shunt resistance RS stored in the memory in the battery ECU 200 may be corrected by the detected temperature.

Figure 44:
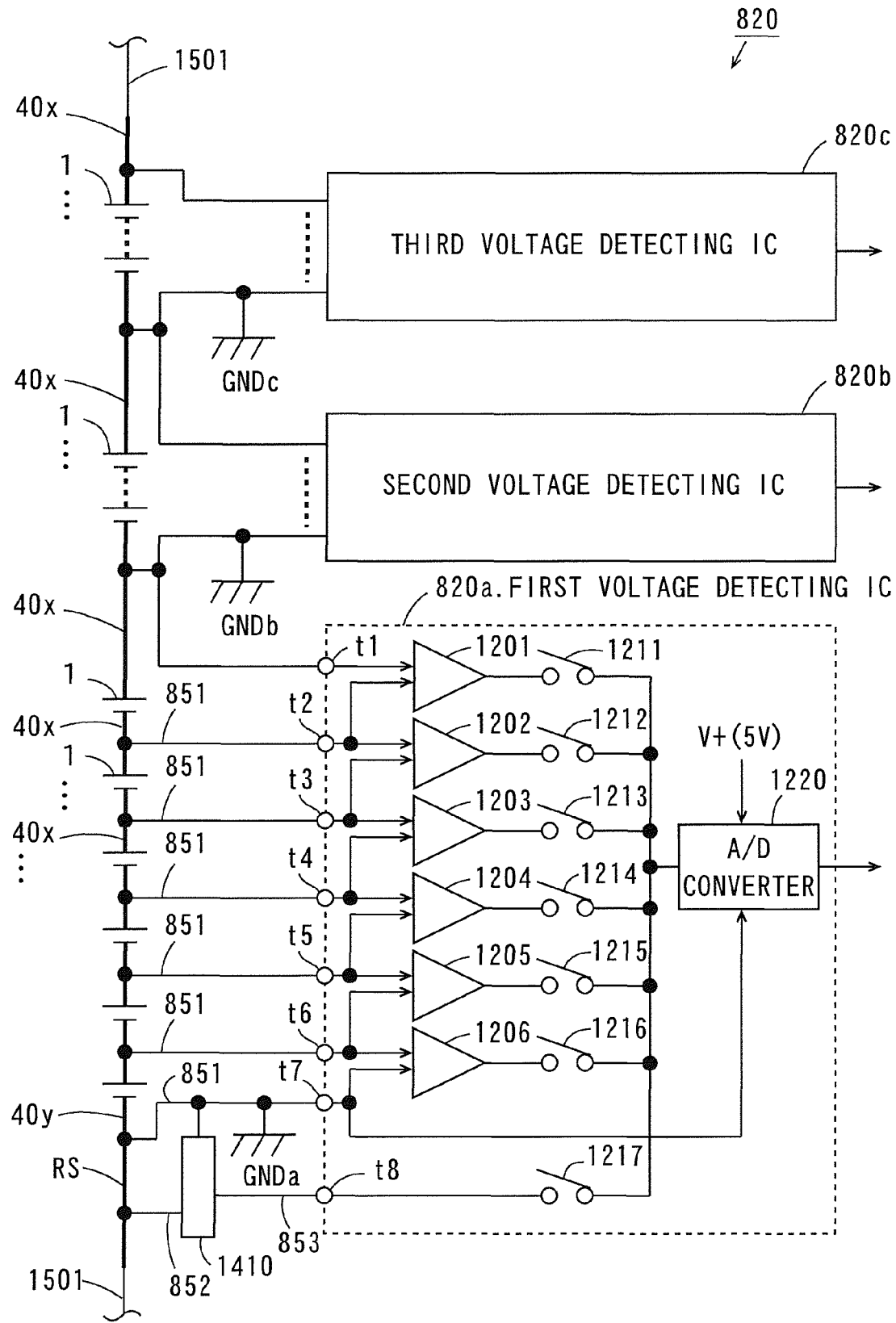
FIG. 44 is a circuit diagram showing one example of the configuration of the detecting circuit.

(5) Example of the Configurations of the Detecting Circuit and the Amplifying Circuit FIG. 44 is a circuit diagram showing one example of the configuration of the detecting circuit 820 of FIG. 32. The detecting circuit 820 shown in FIG. 44 includes first, second and third voltage detecting ICs (Integrated Circuits) 820a, 820b, 820c. In this example, the first voltage detecting IC 820a is provided corresponding to the eighteenth to thirteenth battery cells 1, the second voltage detecting IC 820b is provided corresponding to the twelfth to seventh battery cells 1, and the third voltage detecting IC 820c is provided corresponding to the sixth to first battery cells 1. The amplifying circuit 1410 is connected to the first voltage detecting IC 820a. Reference voltages GNDa, GNDb, GNDc of the first to third voltage detecting ICs 820a, 820b, 820c are electrically independent from one another.

In the following paragraphs, the first voltage detecting IC 820a is representatively described. The second and third voltage detecting ICs 820b, 820c each have the same configuration as the first voltage detecting IC 820a.

The first voltage detecting IC 820a includes eight input terminals t1 to t8. The input terminal t7 is held at the reference voltage GNDa. The input terminals t7 to t1 are connected to the voltage bus bars 40x provided among the eighteenth to thirteenth battery cell 1 and the voltage/current bus bar 40y provided in the eighteenth battery cell 1, respectively, through the conductor lines 851. In addition, the input terminal t8 is connected to the output terminal of the amplifying circuit 1410 of FIG. 42 through the conductor line 853. The one input terminal of the amplifying circuit 1410 is connected to one end of the shunt resistance RS of the voltage/current bus bar 40y through the conductor line 851, and the other input terminal of the amplifying circuit 1410 is connected to the other end of the shunt resistance RS of the voltage/current bus bar 40y through the conductor line 852.

The first voltage detecting IC 820a includes voltage detectors 1201 to 1206, switching elements 1211 to 1217 and an A/D (Analog/Digital) converter 1220.

The voltage detector 1201 differentially amplifies a voltage between the input terminals t1, t2, the voltage detector 1202 differentially amplifies a voltage between the input terminals t2, t3, the voltage detector 1203 differentially amplifies a voltage between the input terminals t3, t4, the voltage detector 1204 differentially amplifies a voltage between the input terminals t4, t5, the voltage detector 1205 differentially amplifies a voltage between the input terminals t5, t6, and the voltage detector 1206 differentially amplifies a voltage between the input terminals t6, t7. Furthermore, the amplifying circuit 1410 amplifies the voltage between the both ends of the shunt resistance RS.

Output terminals of the voltage detectors 1201 to 1206 and the input terminal t8 are connected to an input terminal of the ND converter 1220 through the switching elements 1211 to 1217, respectively. The reference voltage GNDa of the input terminal t7 is applied to a reference terminal of the ND converter 1220, and a power supply voltage V+ is applied to a power supply terminal of the ND converter 1220.

While the reference voltage GNDa of the input terminal t7 is applied in common to the voltage detector 1206 and the ND converter 1220 in this example, the reference voltage GNDa may be applied to the reference terminal of the ND converter 1220 separately from the voltage detector 1206 instead.

The switching elements 1211 to 1217 are sequentially turned on, so that the voltages amplified by the voltage detectors 1201 to 1206 and the amplifying circuit 1410 are sequentially applied to the ND converter 1220. The ND converter 1220 converts the applied voltages to digital voltage values. The digital voltage values obtained by the ND converter 1220 are given to the battery ECU 200 of FIG. 32.

The charged capacity of each battery cell 1 is calculated in the battery ECU 200 based on the voltage value between the terminals of each battery cell 1, as described above. The value of the current flowing through the voltage/current bus bar 40y is calculated based on the voltage value between the both ends of the shunt resistance RS and the resistance value of the shunt resistance RS.

Figure 45:
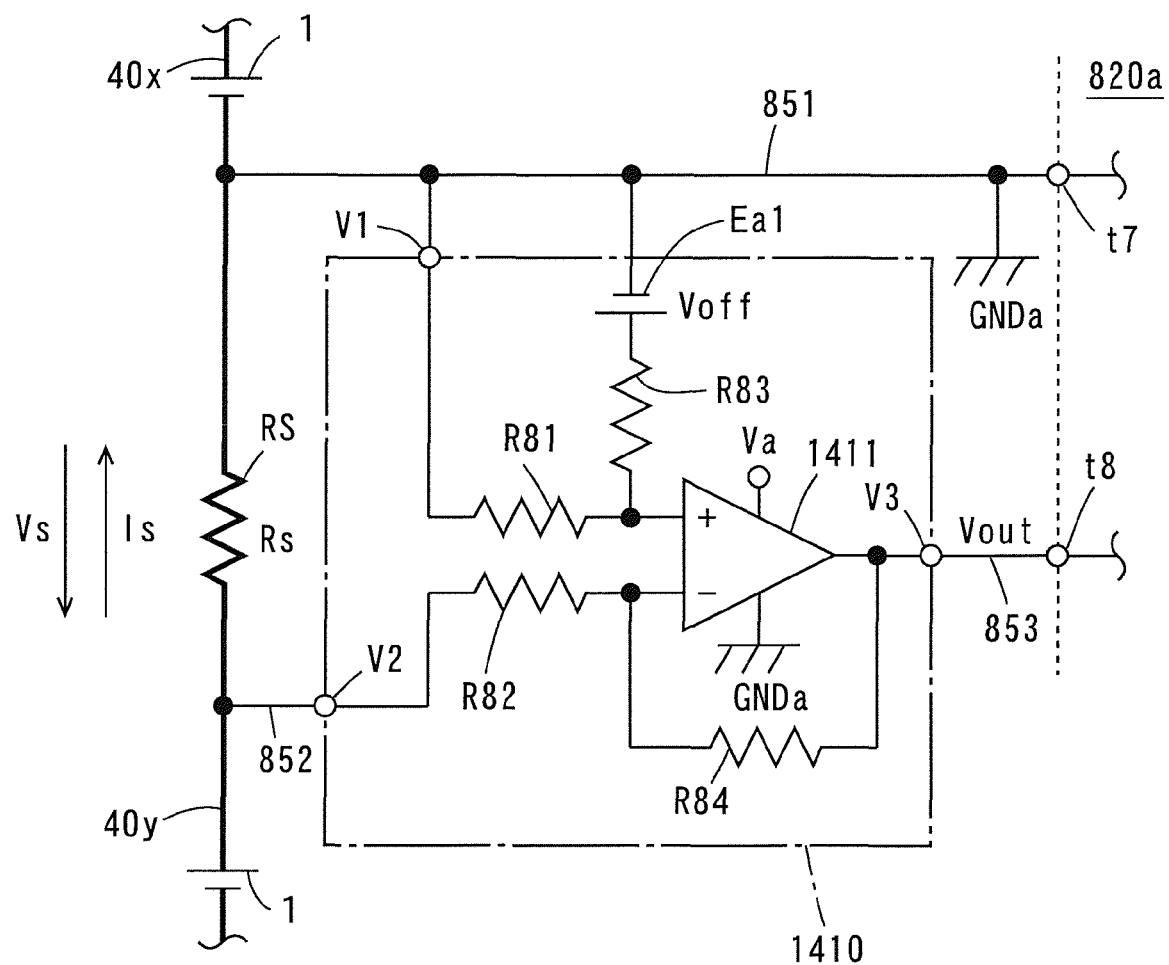
FIG. 45 is a circuit diagram showing one example of the configuration of an amplification circuit.

FIG. 45 is a circuit diagram showing one example of the configuration of the amplifying circuit 1410 of FIG. 44. Here, description is made of details of the amplifying circuit 1410 provided corresponding to the first voltage detecting IC 820a of FIG. 44. Hereinafter, the resistance value of the shunt resistance RS is referred to as a shunt resistance value Rs, the value of the voltage between the both ends of the shunt resistance RS is referred to as a voltage value Vs, and the value of the current flowing through the shunt resistance RS is referred to as a current value Is.

When the shunt resistance value Rs is known, the current value Is can be calculated by detecting the voltage value Vs.

As described above, the voltage/current bus bar 40y has a small shunt resistance value Rs (about 1 mΩ, for example), because its main constituent is copper. In this case, the current value Is changes in a range from −100 A to 100 A, and the voltage value Vs changes in a range from −0.1 V to 0.1 V, for example. The direction of the current flowing through the voltage/current bus bar 40y at the time of charge is opposite to that at the time of discharge, so that a negative current value Is and a negative voltage value Vs are obtained.

Here, the first voltage detecting IC 820a detects the voltage between the terminals of each battery cell 1 changing in a range from 2.5 V to about 4.2 V, for example. Meanwhile, the voltage value Vs between the both ends of the shunt resistance RS is lower than the voltage between the terminals of each battery cell 1. Therefore, the voltage value Vs between the both ends of the shunt resistance RS is amplified by the amplifying circuit 1410 in the present embodiment.

The input terminals V1, V2 and the output terminal V3 of the amplifying circuit 1410 are connected to the conductor lines 851, 852 and 853, respectively. The amplifying circuit 1410 is constituted by an operational amplifier 1411, a DC power supply Ea1 and resistances R81 to R84.

A non-inverting input terminal of the operational amplifier 1411 is connected to the input terminal V1 through the resistance R81 while being connected to a positive electrode of the DC power supply Ea1 through the resistance R83. An inverting input terminal of the operational amplifier 1411 is connected to the input terminal V2 through the resistance R82. The resistance R84 is connected between the inverting input terminal of the operational amplifier 1411 and the output terminal V3. The reference voltage GNDa is applied to the reference terminal of the operational amplifier 1411, and a power supply voltage Va is applied to a power supply terminal.

A voltage (hereinafter referred to as an offset voltage) Voff of the positive electrode of the DC power supply Ea1 is set to an intermediate value between the reference voltage GNDa and the power supply voltage Va. Thus, when the voltage value Vs changes in a range between a negative value and a positive value, a voltage value Vout of the output terminal of the amplifying circuit 1410 changes in a range between 0 V and the power supply voltage Va, centered at the offset voltage Voff.

For example, the values of the resistances R81, R82 are each set to 10 kΩ, and the values of the resistances R83, R84 are each set to 250 kΩ. In this case, an amplifier gain of the amplifying circuit 1410 is 25. Moreover, the power supply voltage Va is set to 5 V, and the offset voltage Voff is set to 2.5 V. As described above, when the shunt resistance value Rs is about 1 mΩ, the amplifying circuit 1410 amplifies the voltage value Vs changing in the range from −0.1 V to 0.1 V to a voltage in a range from 0 V to 5 V, centered at 2.5 V.

When the voltage value Vs is −0.1 V, the output voltage of the amplifying circuit 1410 is 5 V. In this case, the current value Is is calculated as −100 A. In addition, when the voltage value Vs is 0 V, the output voltage of the amplifying circuit 1410 is 2.5 V. In this case, the current value Is is calculated as 0 A. Furthermore, when the voltage value Vs is 0.1 V, the output voltage of the amplifying circuit 1410 is 0 V. In this case, the current value Is is calculated as 100 A.

Next, description is made of the reason why the voltage/current bus bar 40y connected to the negative electrode terminal 3 of the battery cell 1 at the one end (the eighteenth battery cell 1 in this example) is used as the shunt resistance RS for current detection.

Here, it would be possible to use the voltage bus bar 40x as the shunt resistance RS. As described above, however, the voltage bus bar 40x connecting the positive electrode terminal 2 and the negative electrode terminal 3 of the two adjacent battery cells 1 is formed of the clad material that is made of aluminum and copper, which are also used for forming the positive electrode terminal 2 and the negative electrode terminal 3, respectively. The voltage bus bar 40x formed of the clad material is more expensive than a bus bar formed of one kind of metal. Therefore, the voltage/current bus bar 40y that is inexpensive and made of the one kind of metal and is used as the shunt resistance RS for current detection in the present embodiment.

The shunt resistance value Rs is set by adjusting the material and dimensions of the bus bar. Here, the dimensions refer to the length and cross sectional area of the path of the current. That is, the shunt resistance value Rs is limited by the dimensions of the bus bar. The dimensions of the voltage bus bar 40x are limited by the distance between the positive electrode terminal 2 and the negative electrode terminal 3 of the two adjacent battery cells 1. When the thickness of each battery cell 1 is small, the length of the voltage bus bar 40x also becomes small. This makes it difficult to optimally set the shunt resistance value RS when the voltage bus bar 40x is used as the shunt resistance RS. Therefore, the voltage/current bus bar 40y is attached to the battery cell 1 at the one end such that the dimensions of the shunt resistance RS are not limited by the thickness of the battery cell 1 in the present embodiment.

Meanwhile, it would be possible to form the bus bar connected to the positive electrode terminal 2 of the battery cell 1 at the other end using aluminum, and use the bus bar as the shunt resistance RS. In this case, however, the ring terminal 1501t of the power supply line 1501 is connected to the bus bar made of aluminum. Here, the ring terminal 1501t and the power supply line 1501 made of aluminum need to be used in order to prevent bimetallic corrosion from occurring between the ring terminal 1501t of the power supply line 1501 and the bus bar 40. Therefore, the voltage/current bus bar 40y made of copper is attached to the negative electrode terminal 3 of the battery cell 1 at the one end, not the positive electrode terminal 2 of the battery cell 1 at the other end, in the present embodiment.

(6) Another Example of the Configuration of the Detecting Circuit

Figure 46:
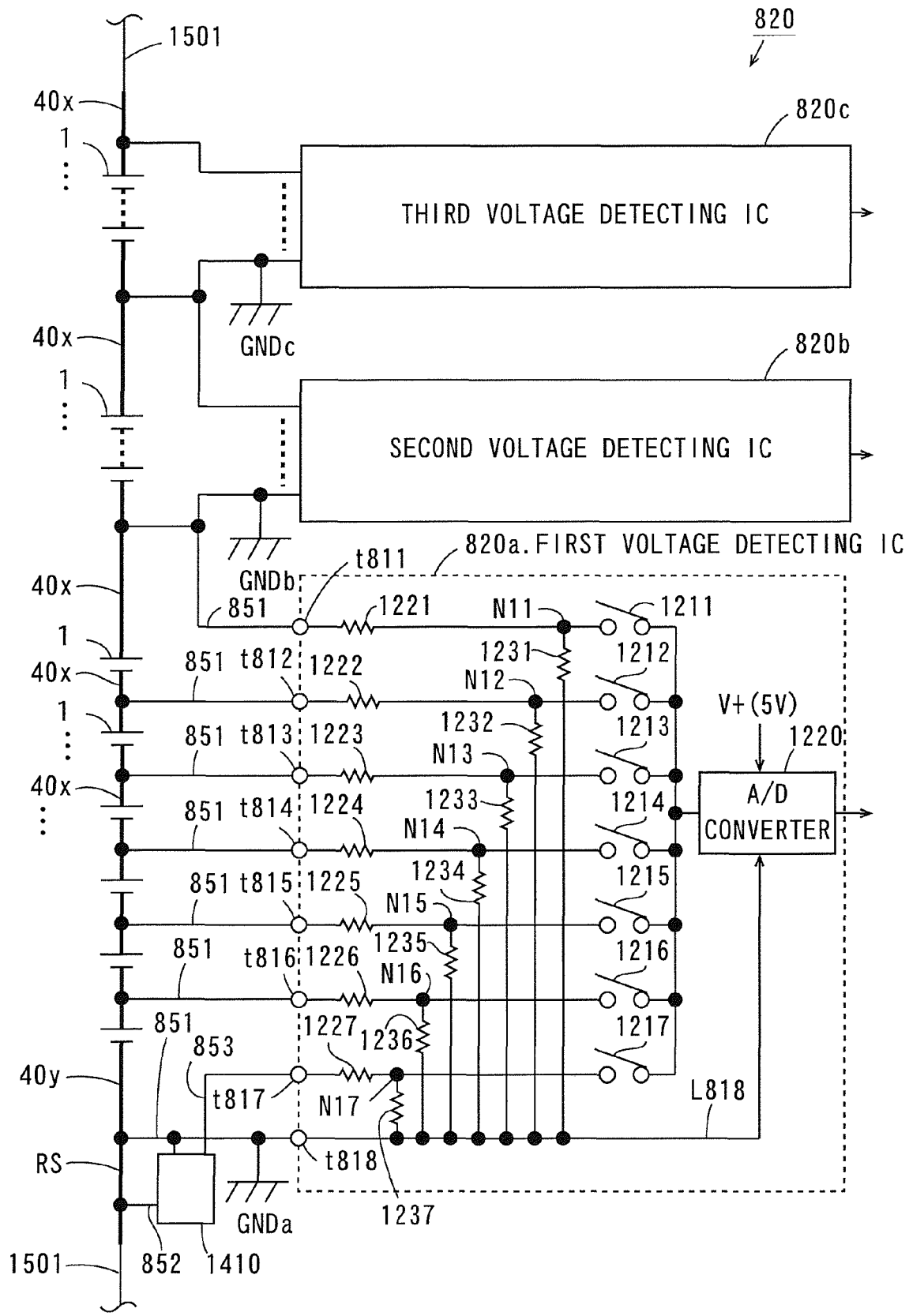
FIG. 46 is a circuit diagram showing another example of the configuration of the detecting circuit.

The detecting circuit 820 of FIG. 32 may have the following configuration instead of the configuration shown in FIG. 44. FIG. 46 is a circuit diagram showing another example of the configuration of the detecting circuit 820 of FIG. 1.

The detecting circuit 820 of FIG. 46 includes the first, second and third voltage detecting ICs 820a, 820b, 820c having the same configurations. Hereinafter, description will be made of details of the first voltage detecting IC 820a of this example.

The first voltage detecting IC 820a has eight input terminals t811 to t818. The input terminal t18 is held at the reference voltage GNDa. The input terminals t18, t16 to t11 are connected to the voltage bus bars 40x provided among the eighteenth to thirteenth battery cells 1 and the voltage/current bus bar 40y provided in the eighteenth battery cell 1, respectively, through the conductor lines 851. The input terminal t17 is connected to the output terminal of the amplifying circuit 1410 of FIG. 42 through the conductor line 853.

The amplifying circuit 1410 of FIG. 46 has the same configuration as the amplifying circuit 1410 of FIG. 45. Accordingly, the voltage value Vs between the both ends of the shunt resistance RS amplified by the amplifying circuit 1410 is input to the input terminal t17.

The first voltage detecting IC 820a includes resistances 1221 to 1227, 1231 to 1237, the switching elements 1211 to 1217 and the A/D converter 1220.

The resistances 1221, 1231 are connected in series between the input terminal t11 and the input terminal t18, the resistances 1222, 1232 are connected in series between the input terminal t12 and the input terminal t18, and the resistances 1223, 1233 are connected in series between the input terminal t13 and the input terminal t18.

The resistances 1224, 1234 are connected in series between the input terminal t14 and the input terminal t18, the resistances 1225, 1235 are connected in series between the input terminal t15 and the input terminal t18, the resistances 1226, 1236 are connected in series between the input terminal t16 and the input terminal t18, and the resistances 1227, 1237 are connected in series between the input terminal t17 and the input terminal t18. Accordingly, each of the voltages of the input terminals t11 to t17 is divided.

A node N11 between the resistance 1221 and the resistance 1231, a node N12 between the resistance 1222 and the resistance 1232, a node N13 between the resistance 1223 and the resistance 1233, a node N14 between the resistance 1224 and the resistance 1234, a node N15 between the resistance 1225 and the resistance 1235, a node N16 between the resistance 1226 and the resistance 1236, and a node N17 between the resistance 1227 and the resistance 1237 are connected to the input terminal of the A/D converter 1220 through the switching elements 1211 to 1217, respectively. The reference voltage GNDa of the input terminal t18 is applied to the reference terminal of the A/D converter 1220, and the power supply voltage V+ is applied to the power supply terminal of the A/D converter 1220.

The switching elements 1211 to 1217 are sequentially turned on, so that voltages of the nodes N11 to N17 are sequentially applied to the A/D converter 1220.

Here, the resistances 1221 to 1227 and the resistances 1231 to 1237 are set such that the voltages of the nodes N11 to N17 change from the reference voltage GNDa to not more than the power supply voltage V+ of the A/D converter 1220.

The A/D converter 1220 converts the applied voltages to digital voltage values. The digital voltage values obtained by the A/D converter 1220 are applied to the battery ECU 200 of FIG. 32.

Thus, the charged capacity of each battery cell 1 is calculated by the battery ECU 200 based on the voltage value of each battery cell 1 similarly to the one example of the configuration of the detecting circuit 820 of FIG. 44. In addition, the value Is of the current flowing through the voltage/current bus bar 40y is calculated based on the voltage value Vs between the both ends of the shunt resistance RS and the shunt resistance value Rs.

(7) Effects

In the battery module 1100 according to the fifth embodiment, the part of the voltage/current bus bar 40y attached to the negative electrode terminal 3 of the battery cell 1 at the one end is used as the shunt resistance RS for current detection. Therefore, the shape and dimensions of the shunt resistance RS is not limited by the spacing between the adjacent battery cells 1. This allows the shunt resistance RS to be easily set to an optimum value. In addition, a shunt resistance need not be separately provided in the battery module 1100. This allows for detection of the current flowing through the battery module 1100 with a simple configuration without increasing the size of the battery module 1100.

In the fifth embodiment, the one attachment portion 846 of the voltage/current bus bar 40y corresponding to the one end of the shunt resistance RS is electrically connected to the detecting circuit 820 through the conductor line 851 of the FPC 50, and the other attachment portion 846 of the voltage/current bus bar 40y corresponding to the other end of the shunt resistance RS is electrically connected to the detecting circuit 820 through the conductor line 852 of the FPC 50. This allows the detecting circuit 820 to detect the voltage between the both ends of the shunt resistance RS.

The FPC 50 is provided to extend along the plurality of voltage bus bars 40x and the voltage/current bus bar 40y. In this case, the plurality of voltage bus bars 40x and the voltage/current bus bar 40y can be easily connected to the FPC 50. This allows the voltage between the terminals of each battery cell 1 to be detected by the detecting circuit 820 without complicating the wiring.

The current flowing through the shunt resistance RS is calculated by the battery ECU 200 of the battery system 1500 based on the voltage between the both ends of the shunt resistance RS detected by the detecting circuit 820. This allows the current flowing through the battery module 1100 to be detected with a simpler configuration.

The voltage/current bus bar 40y is laser-welded to the negative electrode terminal 3 of the battery cell 1 at the one end and fixed to the one end plate 892 by the screw S. The screw S is used as the output terminal for externally outputting the power of the battery module 1100. Therefore, a terminal for connecting the shunt resistance RS need not be additionally provided in the battery block 10. This allows the shunt resistance RS to be provided in the battery module 1100 without increasing the number of manufacturing steps and manufacturing cost.

The negative electrode terminal 3 of each battery cell 1, the regions 841b of the voltage bus bars 40x and the voltage/current bus bar 40y are formed of copper, and the positive electrode terminal 2 of each battery cell 1 and the regions 841a of the voltage bus bars 40x are formed of aluminum. Bimetallic corrosion does not occur between the region 841b of the voltage bus bar 40x and the negative electrode terminal 3 of one battery cell 1, between the region 841a of the voltage bus bar 40x and the positive electrode terminal 2 of the other battery cell 1, and between the voltage/current bus bar 40y and the one electrode of the battery cell 1 at the one end. This results in improved durability and reliability of the battery module 1100.

In this case, the ring terminal 1501t and the power supply line 1501 can be formed of copper. This eliminates the need to employ special configurations in the ring terminal 1501t and the power supply line 1501 for preventing bimetallic corrosion. As a result, an increase in cost to be caused by providing the shunt resistance RS in the voltage/current bus bar 40y can be suppressed.

(8) Modifications in the Fifth Embodiment (a) While the positive electrode terminals 2 of the battery cells 1 are formed of aluminum in the fifth embodiment, the present invention is not limited to this. The positive electrode terminals 2 of the battery cells 1 may be formed of an aluminum alloy having high strength and low resistivity, for example. In this case, the regions 841a of the voltage bus bars 40x are preferably formed of the same aluminum alloy as the positive electrode terminals 2 of the battery cells 1.

Similarly, while the negative electrode terminals 3 of the battery cells 1 are formed of copper, the present invention is not limited to this. The negative electrode terminals 3 of the battery cells 1 may be formed of silver, gold or an alloy thereof having high strength and low resistivity, for example. In this case, the regions 841b of the voltage bus bars 40x and the conductive plates 859 of the FPCs 50 are preferably formed of silver, gold or the alloy thereof that is the same material as the negative electrode terminals 3 of the battery cells 1.

The voltage/current bus bar 40y may be formed of a copper alloy such as copper manganese or copper nickel. This allows the part of the voltage/current bus bar 40y to be easily used as the shunt resistance RS.

(b) While the part of the bus bar attached to the negative electrode terminal 3 of the battery cell 1 at the one end is used as the shunt resistance RS in the battery module 1100 according to the fifth embodiment, the present invention is not limited to this. Part of the bus bar attached to the positive electrode terminal 2 of the battery cell 1 at the other end may be used as the shunt resistance RS.

Figure 47:
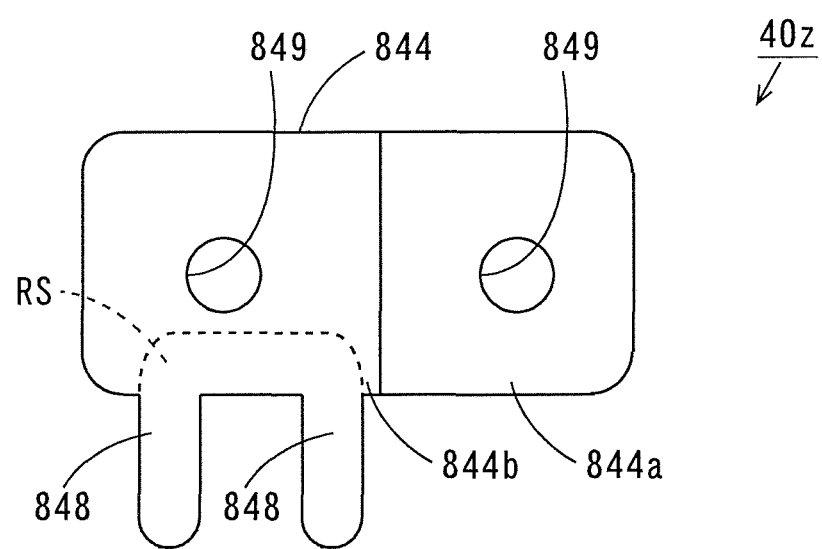
FIG. 47 is a plan view of the voltage/current bus bar in another example.

FIG. 47 is a plan view of a voltage/current bus bar 40z in another example. As shown in FIG. 47, the voltage/current bus bar 40z includes a substantially rectangular base portion 844 and attachment portions 848. The base portion 844 is formed of a clad material produced by subjecting two kinds of metal to contact bonding. The base portion 844 is divided into two regions 844a, 844b. The region 844a of the base portion 844 is formed of aluminum, and the region 844b of the base portion 844 is formed of copper.

The pair of attachment portions 848 is formed at a spacing to project from a long side of the region 844b of the base portion 844. An electrode connection hole 849 is formed in each of the regions 844a, 844b of the base portion 844. In the example of FIG. 47, a region extending from one attachment portion 848 to the other attachment portion 848 via the base portion 844 of the voltage/current bus bar 40z is used as the shunt resistance RS.

The electrode connection hole 849 formed in the region 844a of the voltage/current bus bar 40z is attached to the positive electrode terminal 2 of the battery cell 1 at the other end (see FIG. 40). A screw S is screwed in a screw hole formed in the other end plate 892 of the battery module 1100 through the through hole of the ring terminal 1501t of the power supply line 1501 and the electrode connection hole 849 of the region 844b of the voltage/current bus bar 40z (see FIG. 40). Accordingly, the current flowing through the battery module 1100 is detected based on the voltage between the both ends of the shunt resistance RS.

(c) While the voltage/current bus bar 40y attached to the negative electrode terminal 3 of the battery cell 1 at the one end and the ring terminal 1501t of the power supply line 1501 are fixed to the one end plate 892 by the screw S in the fifth embodiment, the present invention is not limited to this. An output terminal may be provided in the one end plate 892, and the voltage/current bus bar 40y attached to the negative electrode terminal 3 of the battery cell 1 at the one end and the end of the power supply line 1501 may be laser-welded to the output terminal, for example.

Similarly, while the voltage bus bar 40x attached to the positive electrode terminal 2 of the battery cell 1 at the other end and the ring terminal 1501t of the power supply line 1501 are fixed to the other end plate 892 by the screw S, the present invention is not limited to this. An output terminal may be provided in the other end plate 892, and the voltage bus bar 40x attached to the positive electrode terminal 2 of the battery cell 1 at the other end and the end of the power supply line 1501 may be laser-welded to the output terminal, for example.

(d) While the positive electrode terminal 2 of the battery cell 1 and the region 841a of the voltage bus bar 40x are fixed to each other by laser welding in the fifth embodiment, the present invention is not limited to this. The positive electrode terminal 2 of the battery cell 1 and the region 841a of the voltage bus bar 40x may be fixed to each other by another kind of welding, caulking or using a screw.

While the negative electrode terminal 3 of the battery cell 1 and the region 841b of the voltage bus bar 40x are fixed to each other by laser welding, the present invention is not limited to this. The negative electrode terminal 3 of the battery cell 1 and the region 841b of the voltage bus bar 40x may be fixed to each other by another kind of welding, caulking or using a screw.

While the negative electrode terminal 3 of the battery cell 1 at the one end and the voltage/current bus bar 40y are fixed to each other by laser welding, the present invention is not limited to this. The negative electrode terminal 3 of the battery cell 1 at the one end and the voltage/current bus bar 40y may be fixed to each other by another kind of welding, caulking or using a screw.

(e) While the attachment portions 842 of the plurality of voltage bus bars 40x and the pair of attachment portions 846 of the voltage/current bus bar 40y are attached to the corresponding conductive plates 859 on the FPCs 50 by soldering in the fifth embodiment, the present invention is not limited to this. The attachment portions 842 of the plurality of voltage bus bars 40x and the pair of attachment portions 846 of the voltage/current bus bar 40y may be attached to the corresponding conductive plates 859 on the FPCs 50 by welding.

(f) While the battery ECU 200 has the current calculation function of calculating the current value Is of the voltage/current bus bar 40y based on the voltage value Vs between the both ends of the shunt resistance RS of the voltage current bus bar 40y and the shunt resistance value Rs in the fifth embodiment, the present invention is not limited to this. The detecting circuit 820 instead of the battery ECU 200 may have the current calculation function.

Figure 48:
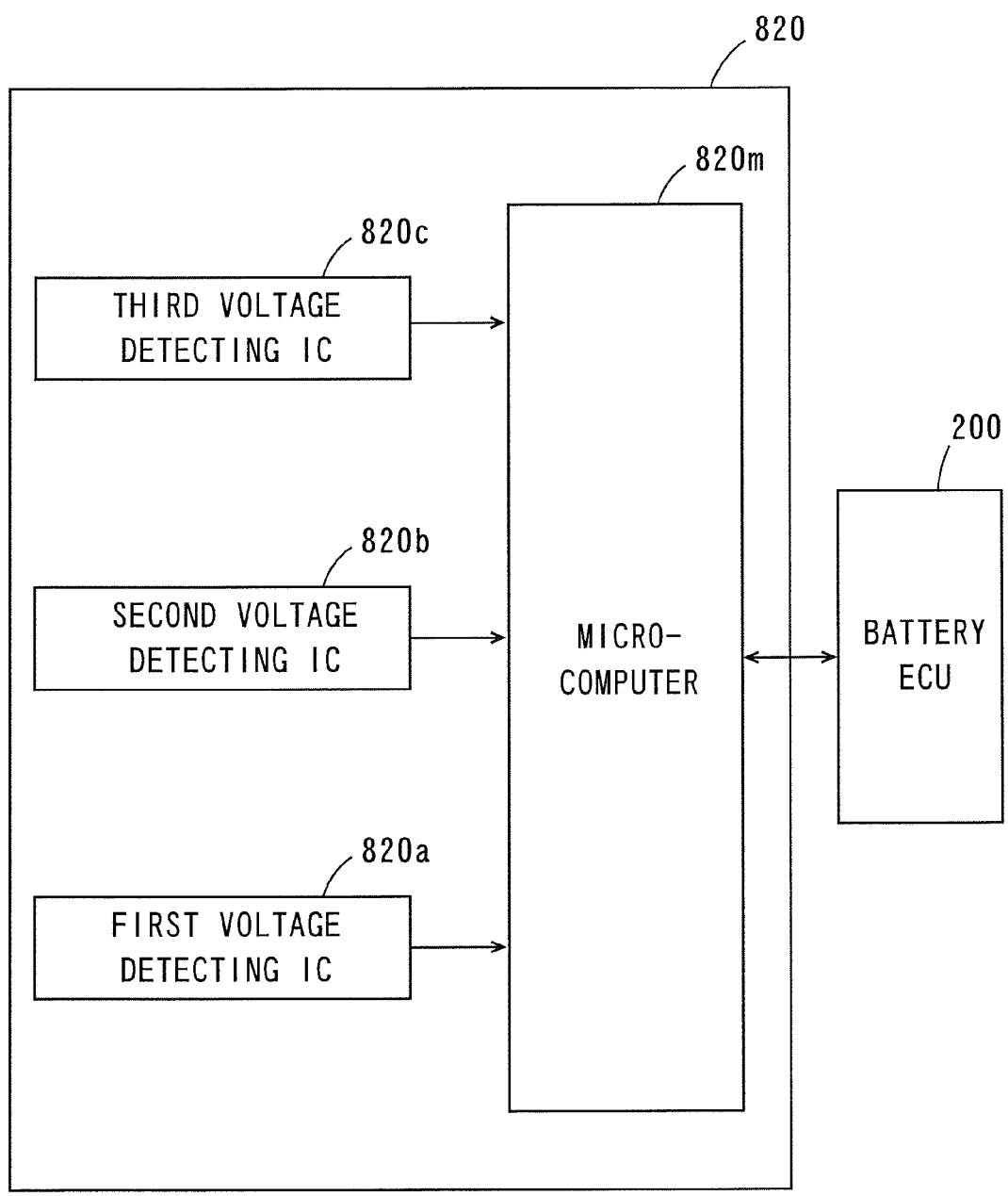
FIG. 48 is a diagram showing an example of the configuration of the detecting circuit having a current calculation function.

FIG. 48 is a diagram showing an example of the configuration of the detecting circuit 820 having the current calculation function. As shown in FIG. 48, the detecting circuit 820 is provided with a microcomputer 820m, for example, in addition to the configuration shown in FIG. 44. Then, the shunt resistance value Rs in the voltage/current bus bar 40y is previously stored in the microcomputer 820m of the detecting circuit 820.

Thus, the microcomputer 820m of the detecting circuit 820 may calculate the current value Is of the voltage/current bus bar 40y based on the voltage value Vs between the both ends of the shunt resistance output from the first voltage detecting IC 820a of FIG. 44 and the shunt resistance value Rs.

In this case, the microcomputer 820m of the detecting circuit 820 may calculate the voltage between the terminals of each battery cell 1 based on the output from the first to third voltage detecting ICs 820a to 820c.

As described above, the calculated current value IS and voltage between the terminals of each battery cell 1 are applied to the battery ECU 200.

In addition, the microcomputer 820m of the detecting circuit 820 may calculate the charged capacity of each battery cell 1 based on the calculated current value Is, the calculated voltage between the terminals of each battery cell 1, and the temperature of each battery cell 1 detected by the temperature detecting element 811 of FIG. 32.

In this case, the calculated current value Is, the calculated voltage between the terminals of each battery cell 1, the detected temperature of each battery cell 1 and the charged capacity of each battery cell 1 are applied from the microcomputer 820m to the battery ECU 200.

While the microcomputer 820m is provided in the detecting circuit 820 in this example, the current calculation function may be realized by providing a CPU and a memory instead of the microcomputer 820m.

The microcomputer 820m of this example or the CPU and the memory can be provided on the printed circuit board 821 of FIG. 35, for example.

(g) The region extending from one attachment portion 846 to the other attachment portion 846 of the voltage/current bus bar 40y via the base portion 845 is used as the shunt resistance RS in the fifth embodiment. Instead, the voltage/current bus bar 40y and its peripheral member may have the following configuration.

Figure 49:
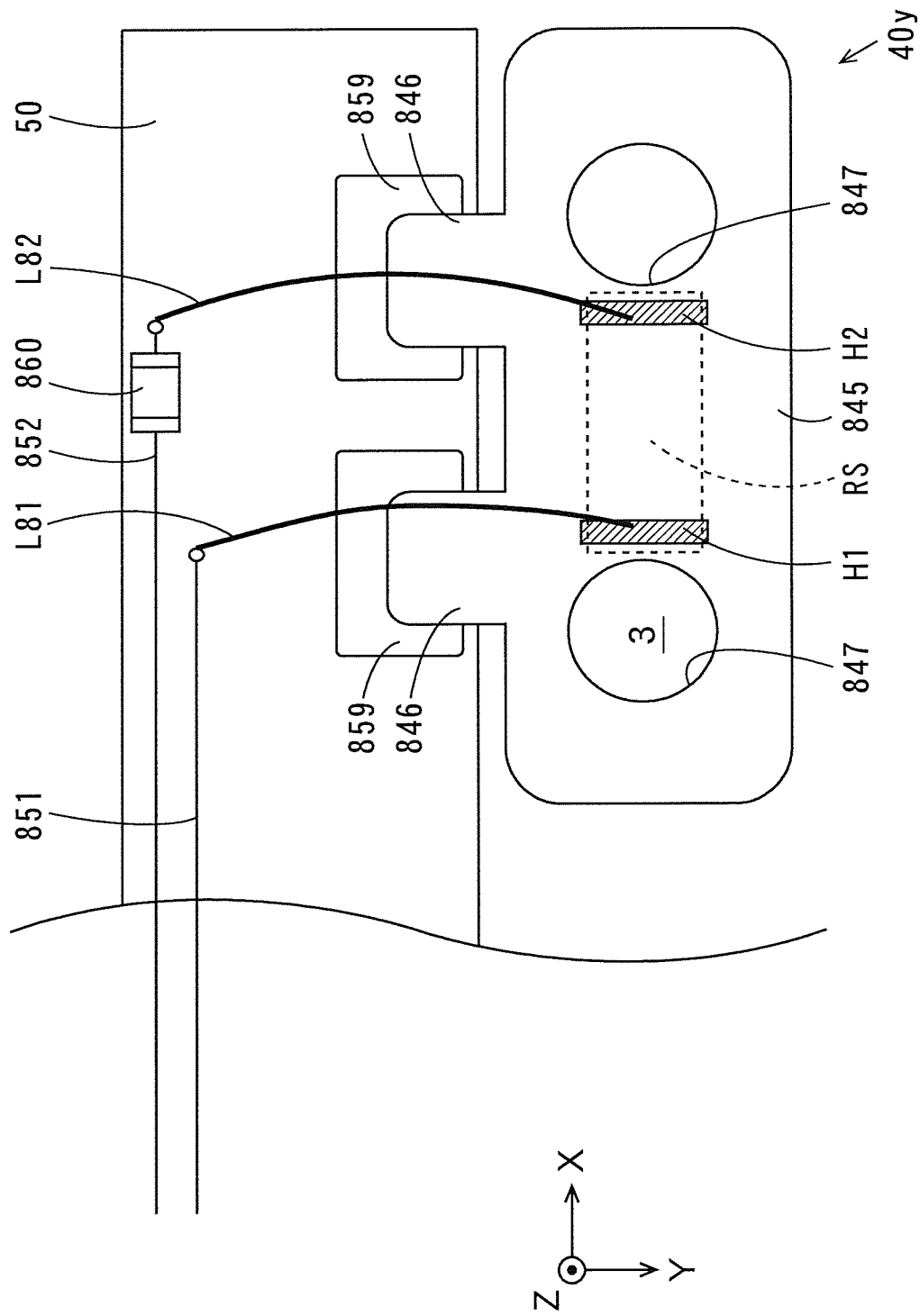
FIG. 49 is a schematic plan view showing the configuration of the voltage/current bus bar and its peripheral member according to a modification.

FIG. 49 is a schematic plan view showing the configurations of the voltage/current bus bar 40y and its peripheral member according to a modification. Description will be made of the voltage/current bus bar 40y according to the modification by referring to differences from the voltage/current bus bar 40y of FIG. 43.

As shown in FIG. 49, a pair of solder traces H1, H2 is formed in parallel with each other at a regular spacing on the base portion 845 of the voltage/current bus bar 40y. The solder trace H1 is arranged in the vicinity of one electrode connection hole 847 between the pair of electrode connection holes 847, and the solder trace H2 is arranged in the vicinity of the other electrode connection hole 847 between the electrode connection holes 847.

The solder trace H1 of the voltage/current bus bar 40y is connected to the corresponding conductor line 851 on the detecting circuit 820 (see FIG. 42) through a wire L81. The PTC element 860 is inserted in the conductor line 851. The solder trace H2 of the voltage/current bus bar 40y is connected to the corresponding conductor line 852 on the detecting circuit 820 through a wire L82. Note that the PTC element 860 may be inserted in the conductor line 852. In the example of FIG. 49, the PTC element 860 is inserted in the conductor line 852.

A resistance formed between the solder traces H1, H2 of the voltage/current bus bar 40y works as the shunt resistance RS for current detection in this example. Here, the shunt resistance value Rs is calculated based on the length, cross sectional area and resistivity of the path of the current. Therefore, the solder traces H1, H2 are preferably formed such that the value of the shunt resistance RS in the voltage/current bus bar 40y is accurately calculated.

The current mainly flows through a region between the pair of electrode connection holes 847 at the time of charge/discharge of the battery cell 1. Therefore, the solder traces H1, H2 are preferably formed so as to be in close proximity to the electrode connection holes 847, respectively, and extend in a direction perpendicular to a straight line connecting the centers of the electrode connection holes 847. Furthermore, it is preferable that the length of each of the solder traces H1, H2 is substantially equal to the diameter of each of the electrode connection holes 847.

The value of the shunt resistance RS may be previously calculated based on the length of each of the solder traces H1, H2, the distance between the solder traces H1, H2, the thickness of the base portion 845 and the resistivity of the base portion 845, and the calculated value may be stored in the memory in the battery ECU 200.

Alternatively, the value of the shunt resistance RS between the solder traces H1, H2 may be previously measured, and the measured value may be stored in the memory in the battery ECU 200.

In this manner, the resistance between the solder traces H1, H2 formed in the voltage/current bus bar 40y is used as the shunt resistance RS in this example. Thus, the shunt resistance value Rs can be easily set to an optimum value by adjusting the dimensions of each of the solder traces H1, H2.

Figure 50:
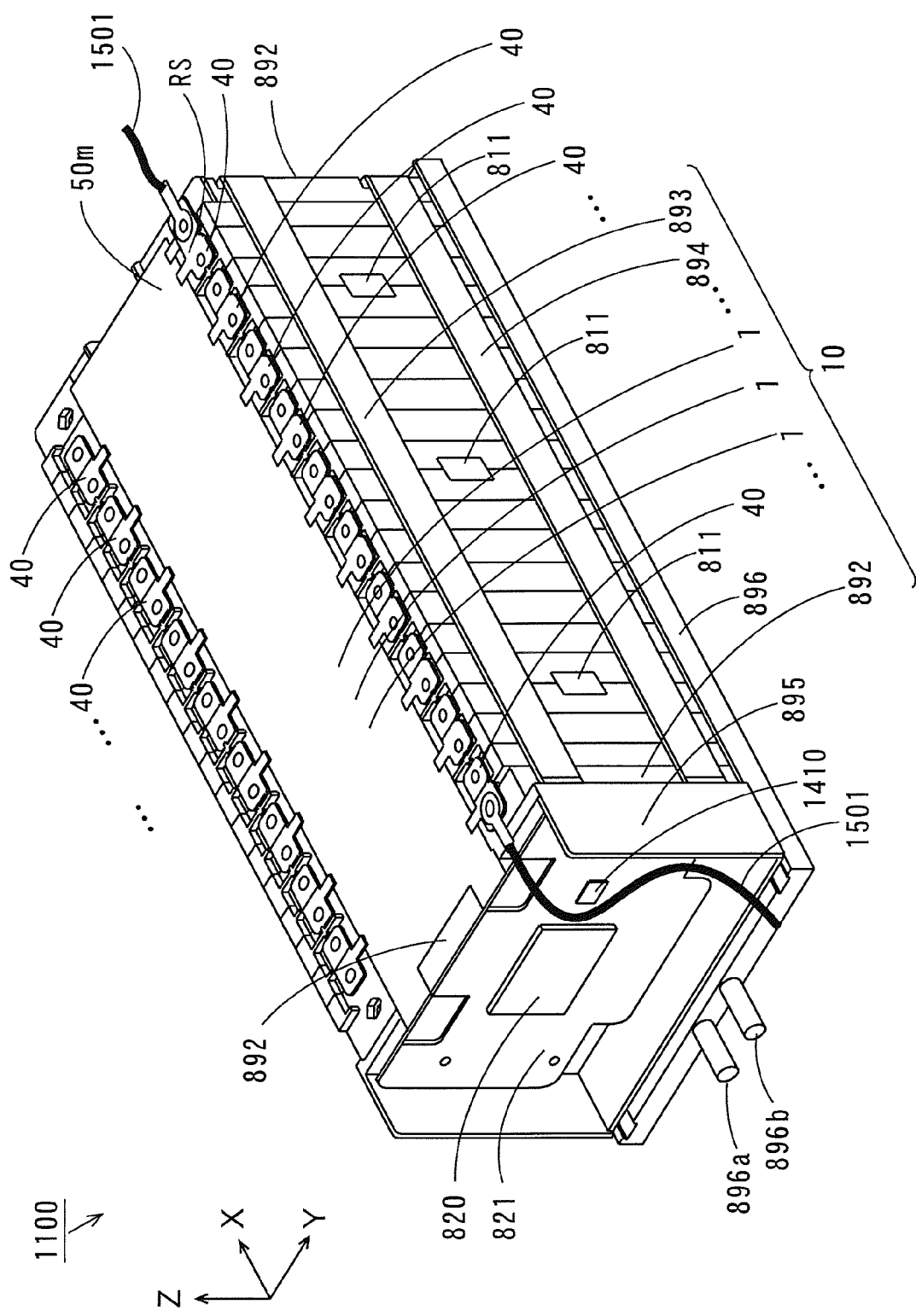
FIG. 50 is an external perspective view showing a modification of the FPC.

(h) FIG. 50 is an external perspective view showing a modification of the FPC 50 in the fifth embodiment. In the example of FIG. 50, an FPC 50m formed by integrating the two FPCs 50 is used instead of the two FPCs 50. The FPC 50m extends in the X-direction between the plurality of bus bars 40 in the one row and the plurality of bus bars 40 in the other row, and is connected in common to the plurality of bus bars 40 in the one row and the plurality of bus bars 40 in the other row.

The common FPC may be provided between the first terminal row and the second terminal row as shown in the example of FIG. 50.

In this case, both side portions of the FPC 50m are held by the plurality of bus bars 40 in the one row and the plurality of bus bars 40 in the other row, thus preventing the FPC 50m from being shifted in position or removed. The FPC 50m has a larger area than the areas of the two FPCs 50, thus improving design flexibility of the conductor lines 851, 852 and allowing various elements to be arranged on the FPC 50m.

One or a plurality of holes may be provided in a region of the FPC 50m above the gas vent valves 810v (FIG. 33) of the battery cells 1. In this case, when the internal pressure of the battery cells 1 rises to the given value, the internal gas of the battery cells 1 can be discharged from the gas vent valves 810v through the holes of the FPC 50m. The FPC 50m does not inhibit the gas from being discharged from the gas vent valves 810v, thus allowing the internal gas of each battery cell 1 to be more reliably discharged.

The gas vent valves 810v may be provided on surfaces of the battery cells 1 along the XZ plane. Also in this case, the FPC 50m does not inhibit the gas from being discharged from the gas vent valves 810v, thus allowing the internal gas of each battery cell 1 to be more reliably discharged.

Figure 51:
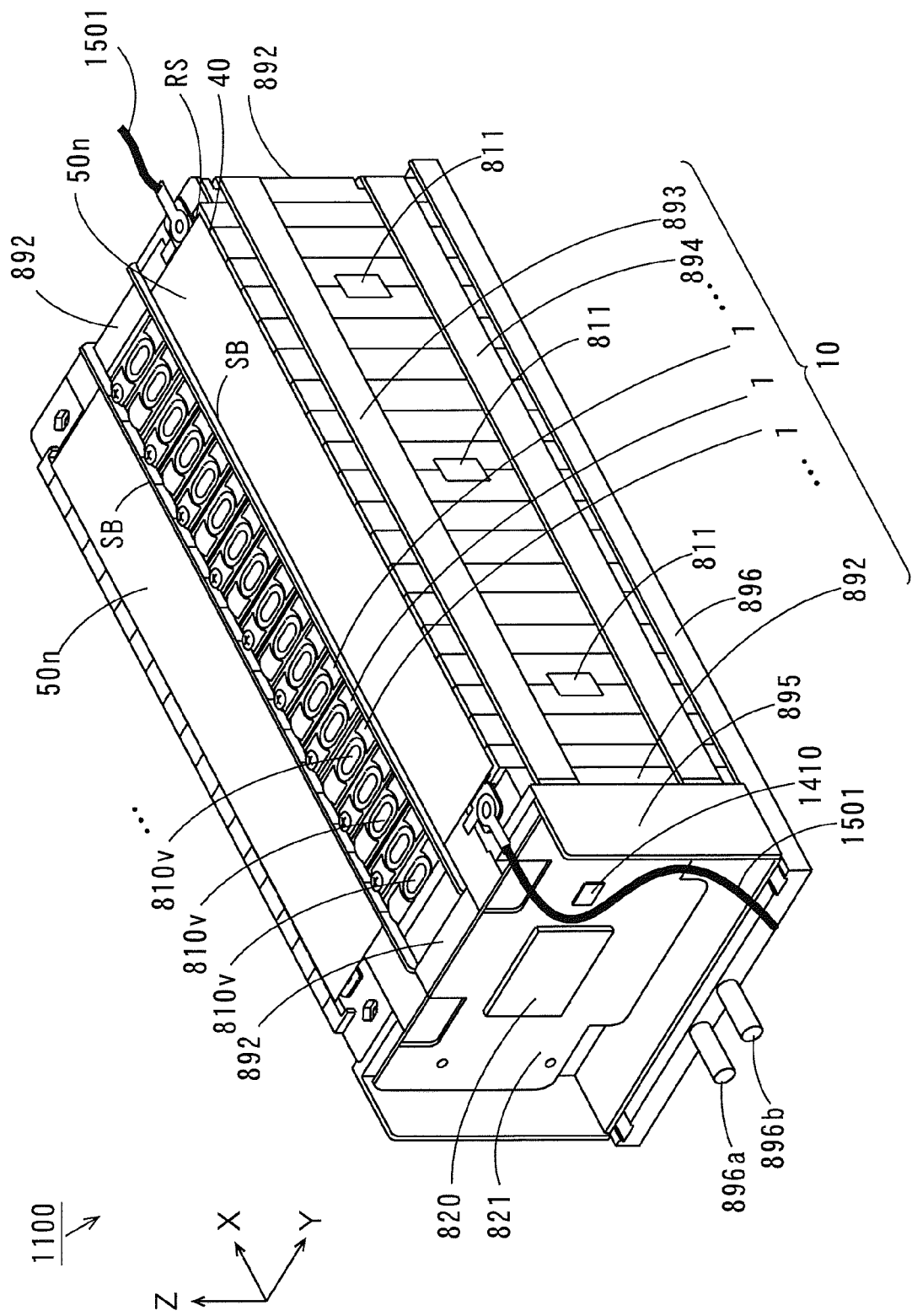
FIG. 51 is an external perspective view showing another modification of the FPC.
Figure 52:
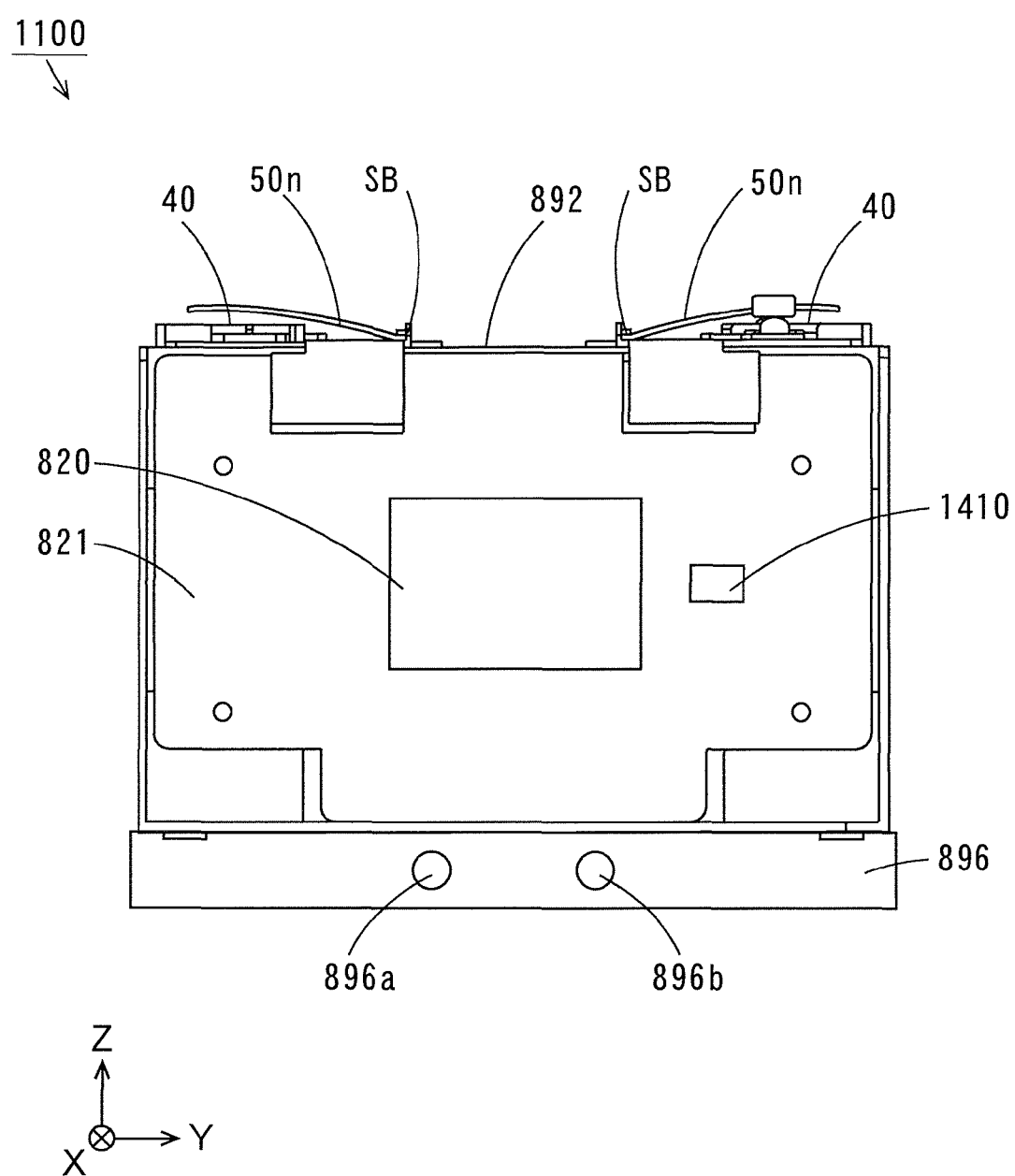
FIG. 52 is a side view showing the FPC of FIG. 51.

(i) FIG. 51 is an external perspective view showing another modification of the FPCs 50 in the fifth embodiment. FIG. 52 is a side view showing the FPCs of FIG. 51.

In the example of FIGS. 51 and 52, two FPCs 50n are used instead of the two FPCs 50. The width of each FPC 50n is larger than the width of each FPC 50 in the Y-direction. Each FPC 50n is bent at a bend portion SB that is parallel to the X-direction. Therefore, the plurality of bus bars 40 in the one row and the positive electrode terminals 2 and the negative electrode terminals 3 to which the bus bars 40 are attached are covered with the bent portion of the one FPC 50n. The plurality of bus bars 40 in the other row and the positive electrode terminals 2 and the negative electrode terminals 3 to which the bus bars 40 are attached are covered with the bent portion of the other FPC 50n.

The one FPC 50n is an example of the first FPC and the other FPC 50n is an example of the second FPC in this example. That is, the one FPC 50n (the first FPC) is provided to extend while overlapping the terminals 2, 3 in the one row (the first terminal row), and the other FPC 50n (the second FPC) is provided to extend while overlapping the terminals 2, 3 in the other row (the second terminal row).

In this case, the other members are prevented from coming in contact with the bus bars 40 and the terminals 2, 3. This prevents the bus bars 40 and the terminals 2, 3 from being damaged. In the case of exchange of the battery module 1100 mounted in a vehicle, for example, the bus bars 40 or the terminals 2, 3 are prevented from being touched by hands of workers. This prevents the workers from receiving an electric shock.

Each FPC 50n has a larger area than each FPC 50, thus improving design flexibility of the conductor lines 851, 852 and allowing various elements to be arranged on the FPC 50n. Moreover, a reduced space occupied by the FPCs 50n is realized by bending the FPCs 50n.

[6] Another Example of the Battery Module

Figure 53:
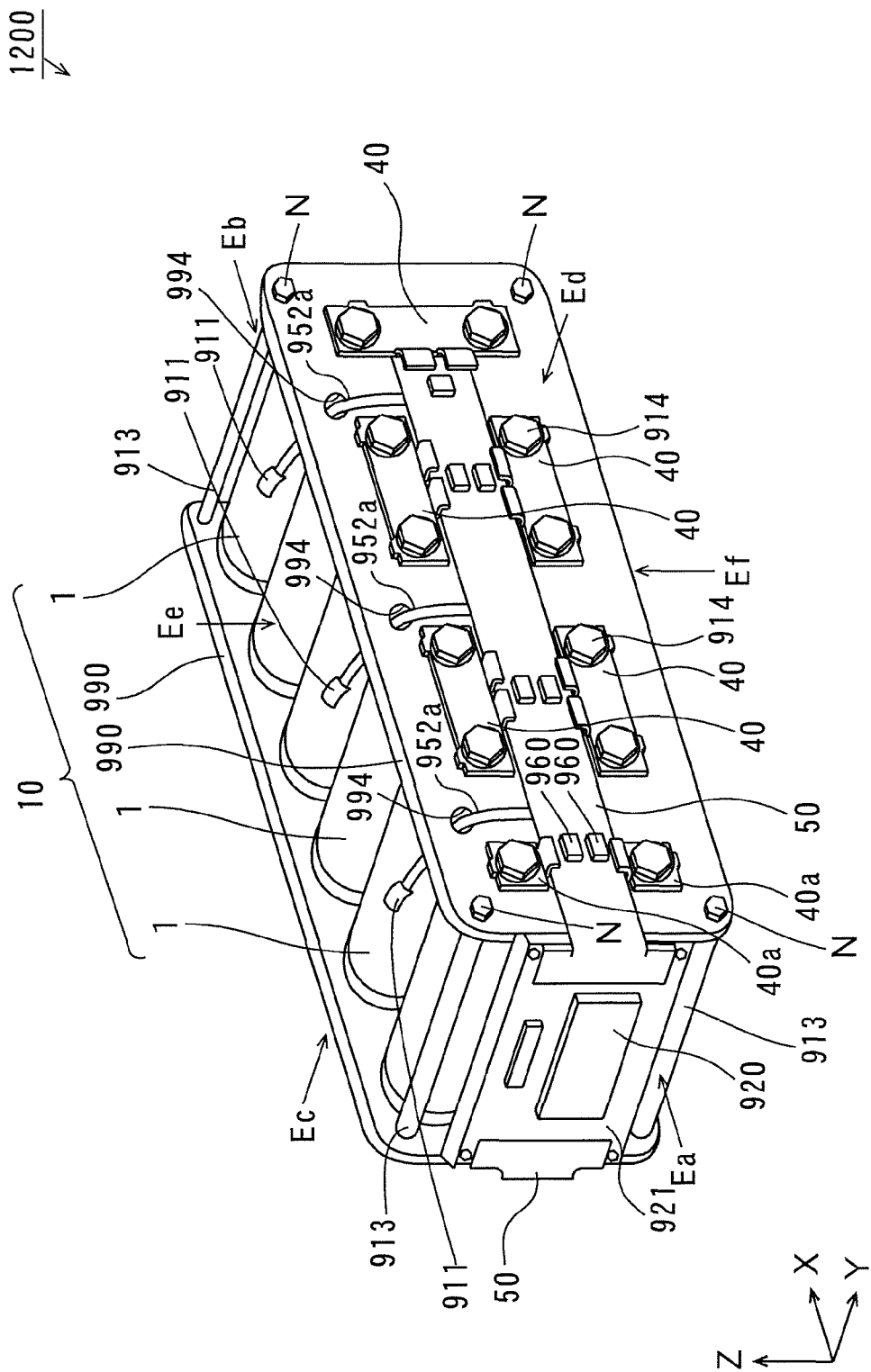
FIG. 53 is an external perspective view showing another example of the battery module.

Next, description will be made of another example of the battery module. FIG. 53 is an external perspective view showing another example of the battery module, FIG. 54 is a side view of one side of the battery module of FIG. 53, and FIG. 55 is a side view of the other side of the battery module of FIG. 53.

Figure 54:
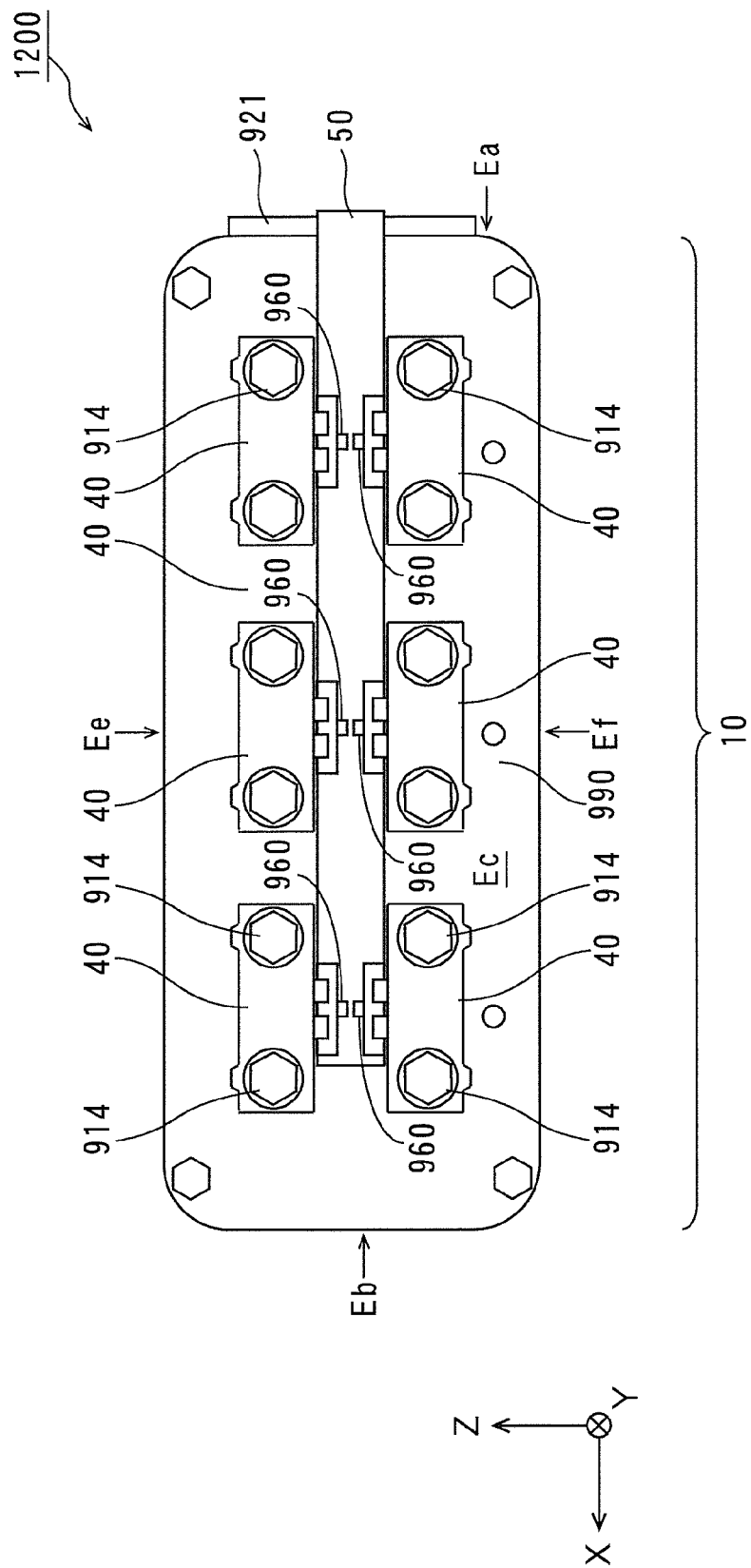
FIG. 54 is a side view of one side of the battery module of FIG. 53.
Figure 55:
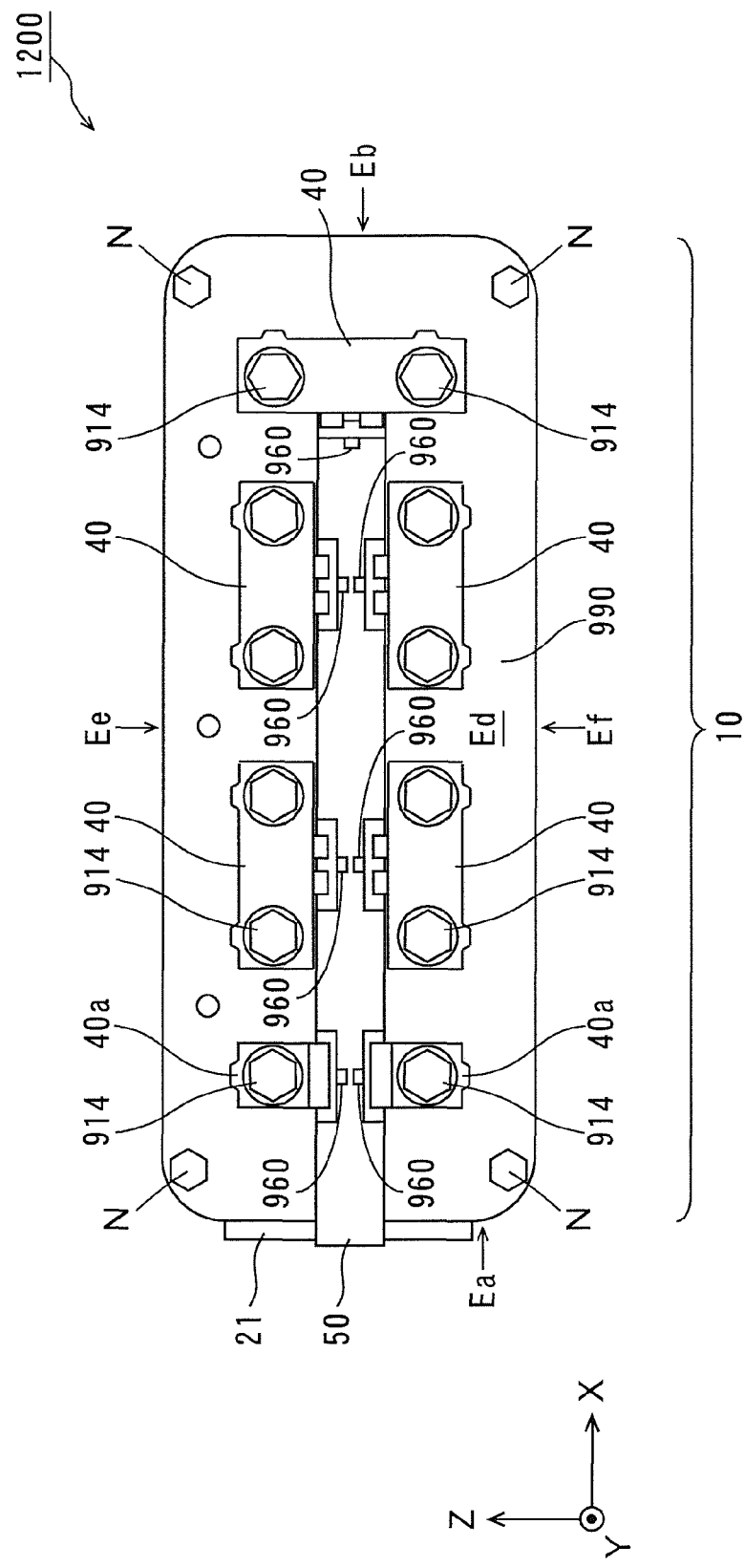
FIG. 55 is a side view of the other side of the battery module of FIG. 53.

Note that in FIGS. 53 to 55, three directions that are perpendicular to one another are defined as an X-direction, a Y-direction and a Z-direction as indicated by the arrows X, Y, Z. Note that the X-direction and the Y-direction are parallel to a horizontal plane, and the Z-direction is perpendicular to the horizontal plane in this example.

As shown in FIGS. 53 to 55, the battery module 1200 includes the battery block 10, a printed circuit board 921 and the FPCs 50. The printed circuit board 921 corresponds to the circuit board 20b in the foregoing first to fourth embodiments.

The battery block 10 is composed of a plurality of cylindrical battery cells 1, and a pair of battery holders 990 that holds the plurality of battery cells 1. Each of the battery cell 1 has a cylindrical outer shape having opposite end surfaces (a so-called columnar shape). A positive electrode terminal is formed on one end surface of the battery cell 1, and a negative electrode terminal is formed on the other end surface of the battery cell 1.

The plurality of battery cells 1 are arranged in parallel such that their axial centers are parallel to one another. Half (six in this example) of the plurality of battery cells 1 are arranged on an upper stage, and the remaining half (six in this example) of the battery cells 1 are arranged on a lower stage.

The plurality of battery cells 1 are arranged on the upper stage and the lower stage such that a positional relationship between the positive electrode terminal and the negative electrode terminal of each of the battery cell 1 is opposite to that of the adjacent battery cell 1. Thus, the positive electrode terminal and the negative electrode terminal of one of the two adjacent battery cell 1 are respectively adjacent to the negative electrode terminal and the positive electrode terminal of the other battery cell 1.

Each battery holder 990 is composed of a substantially rectangular plate-shaped member made of resin, for example. The battery holder 990 has one surface and the other surface. The one surface and the other surface of the battery holder 990 are referred to as an outer surface and an inner surface, respectively. The pair of battery holders 990 is arranged such that the plurality of battery cells 1 are sandwiched therebetween. In this case, the one battery holder 990 is opposite to one end surface of each of the battery cells 1, and the other battery holder 990 is opposite to the other end surface of each of the battery cells 1.

Holes are formed at respective four corners of the battery holders 990, and both ends of bar-shaped fastening members 913 are respectively inserted into the holes. In this state, male threads are formed at the both ends of each of the fastening members 913. The plurality of battery cells 1 and the pair of battery holders 990 are integrally fixed by attaching nuts N to the both ends of the fastening members 913. In the battery holder 990, three holes 994 are formed at equal spacings in its longitudinal direction (X-direction). Conductor lines 952a are inserted through the holes 994, respectively.

Here, it is assumed that a virtual rectangular parallelepiped surrounds the battery block 10. When the rectangular parallelepiped has six virtual planes, a virtual plane opposite to outer peripheral surfaces of the respective battery cells 1 positioned on the upper stage and the lower stage at one end is referred to as a side surface Ea of the battery block 10, and a virtual plane opposite to outer peripheral surfaces of the respective battery cells 1 positioned on the upper stage and the lower stage at the other end is referred to as a side surface Eb of the battery block 10. Out of six virtual planes of the rectangular parallelepiped, a virtual plane opposite to one end surfaces of the plurality of battery cells 1 is referred to as a side surface Ec of the battery block 10, and a virtual plane opposite to the other end surfaces of the plurality of battery cells 1 is referred to as a side surface Ed of the battery block 10. Out of six virtual planes of the rectangular parallelepiped, a virtual plane opposite to outer peripheral surfaces of the plurality of battery cells 1 on the upper stage is referred to as a side surface Ee of the battery block 10, and a virtual plane opposite to outer peripheral surfaces of the plurality of battery cells 1 on the lower stage is referred to as a side surface Ef of the battery block 10.

The side surfaces Ea, Eb of the battery block 10 are perpendicular to a direction in which the plurality of battery cells 1 on the upper or lower stage are arranged (the X-direction). The side surfaces Ec, Ed of the battery block 10 are perpendicular to an axial direction of each battery cell 1 (the Y-direction). The side surfaces Ee, Ef of the battery block 10 are parallel to the direction in which the plurality of battery cells 1 on the upper or lower stage are arranged (the X-direction) and the axial direction of each battery cell 1 (the Y-direction).

One of the positive electrode terminal and the negative electrode terminal of each battery cell 1 is arranged at the side surface Ec of the battery block 10, and the other is arranged at the side surface Ed of the battery block 10.

In the battery block 10, the plurality of battery cells 1 are connected in series through the plurality of bus bars 40, 40a and hexagon head bolts 914. More specifically, a plurality of holes corresponding to the plurality of battery cells 1 on the upper stage and the lower stage are formed in each of the battery holders 990. The positive electrode terminal and the negative electrode terminal of each battery cell 1 are fitted in the corresponding holes formed in the pair of battery holders 990. This causes the positive electrode terminal and the negative electrode terminal of each battery cell 1 to project from the outer surfaces of the pair of battery holders 990.

As described above, the battery cells 1 are arranged such that the positional relationship between the positive electrode terminal and the negative electrode terminal of each battery cell 1 is opposite to that of the adjacent battery cell 1 in the battery block 10. Therefore, in two adjacent battery cells 1, the positive electrode terminal of one battery cell 1 is in close proximity to the negative electrode terminal of the other battery cell 1, and the negative electrode terminal of the one battery cell 1 is in close proximity to the positive electrode terminal of the other battery cell 1. In this state, the bus bar 40 is attached to the positive electrode terminal and the negative electrode terminal being in close proximity to each other such that the plurality of battery cells 1 are connected in series.

In the following description, the closest battery cell 1 to the side surface Ea to the closest battery cell 1 to the side surface Eb of the six battery cells 1 arranged on the upper stage of the battery block 10 are referred to as first to sixth battery cells 1. The closest battery cell 1 to the side surface Eb to the closest battery cell 1 to the side surface Ea of the six battery cells 1 arranged on the lower stage of the battery block 10 are referred to as seventh to twelfth battery cells 1.

In this case, the common bus bar 40 is attached to the negative electrode terminal of the first battery cell 1 and the positive electrode terminal of the second battery cell 1. The common bus bar 40 is attached to the negative electrode terminal of the second battery cell 1 and the positive electrode terminal of the third battery cell 1. Similarly, the common bus bar 40 is attached to the negative electrode terminal of each of the odd-numbered battery cells 1 and the positive electrode terminal of each of the even-numbered battery cells 1 adjacent thereto. The common bus bar 40 is attached to the negative electrode terminal of each of the even-numbered battery cells 1 and the positive electrode terminal of each of the odd-numbered battery cells 1 adjacent thereto.

The bus bars 40a for connecting the power lines 500 from the exterior are respectively attached to the positive electrode terminal of the first battery cell 1 and the negative electrode terminal of the twelfth battery cell 1.

The printed circuit board 921 is attached to the side surface Ea of the battery block 10. The detecting circuit 920 for detecting the cell information of each battery cell 1 is mounted on the printed circuit board 921. The detecting circuit 920 corresponds to the semiconductor integrated circuit 20a in the foregoing first to fourth embodiments. The printed circuit board 921 and the detecting circuit 920 constitute the voltage detecting circuit (state detecting circuit 20).

The long-sized FPC 50 is provided to extend from the side surface Ec to the side surface Ea of the battery block 10. The long-sized FPC 50 is provided to extend from the side surface Ed to the side surface Ea of the battery block 10.

As in this example, the terminals of the plurality of battery cells may be arranged on the first and third surfaces that are different from each other of the battery block, the voltage detecting circuit may be arranged on the second surface that is different from the first and third surfaces of the battery block, and the FPCs may be arranged to extend from the first surface to the second surface of the battery block 10 and extend from the third surface to the second surface of the battery block 10, respectively. In this example, the side surface Ec of the battery block 10 is an example of a first surface, the side surface Ed is an example of a third surface, and the side surface Ea is an example of a second surface.

Each FPC 50 has a configuration in which the conductor lines (voltage detecting lines) are integrally formed on the substrate made of the flexible material, and has bending characteristics and flexibility. For example, polyimide is used as the material for the insulating layer constituting the FPC 50, and copper is used as the material for the conductor lines 51. Each PTC element 960 is arranged to be in close proximity to each of the bus bars 40, 40a on the FPCs 50.

As shown in FIG. 54, one FPC is arranged to extend in the direction in which the plurality of battery cells 1 are arranged (X-direction) at the center on the side surface Ec of the battery block 10. The FPC 50 is connected in common to the plurality of bus bars 40. As shown in FIG. 55, the other FPC 50 is arranged to extend in the direction in which the plurality of battery cells 1 are arranged (X-direction) at the center on the side surface Ed of the battery block 10. The FPC 50 is connected in common to the plurality of bus bars 40, 40a.

The FPC 50 on the side surface Ec is bent at a right angle toward the side surface Ea at one end of the side surface Ec of the battery block 10 to be connected to the printed circuit board 921. The FPC 50 on the side surface Ed is bent at a right angle toward the side surface Ea at one end of the side surface Ed of the battery block 10 to be connected to the printed circuit board 921.

As shown in FIG. 53, the plurality of temperature detecting elements 911 are attached to the battery block 10. Each temperature detecting element 911 is connected to the FPC 50 through the conductor line 952a. The bus bars 40, 40a and the temperature detecting elements 911 of the battery module 1200 are each electrically connected to the printed circuit board 921 through the conductor lines formed on the FPCs 50.

[7] Electric Vehicle

Hereinafter, description will be made of an electric vehicle including any of the foregoing battery systems 1000, 1000A, 1000B, 1000C, 1500. In the following paragraphs, an electric automobile is described as one example of the electric vehicle.

Figure 56:
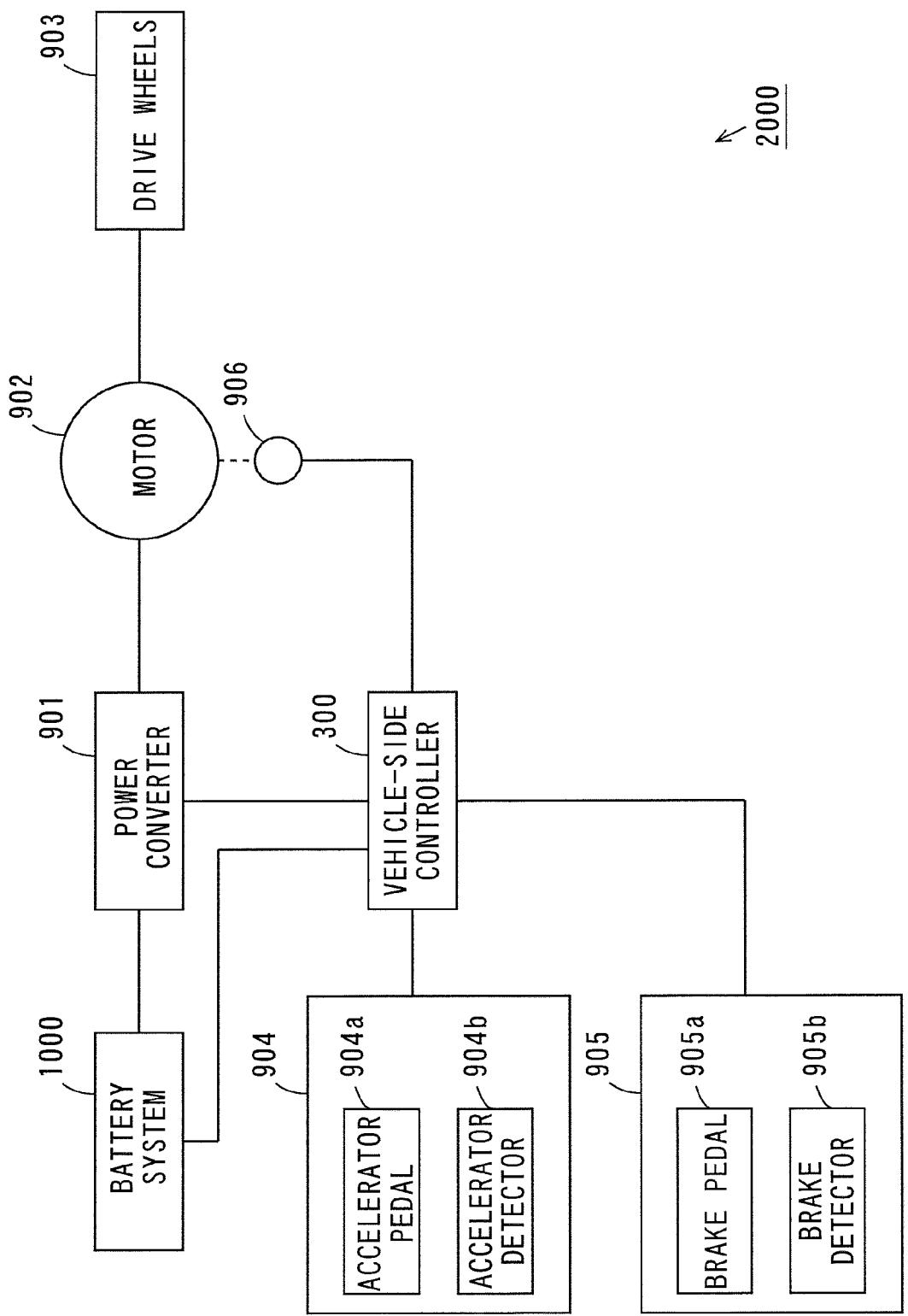
FIG. 56 is a block diagram showing the configuration of an electric vehicle.

FIG. 56 is a block diagram showing the configuration of the electric automobile including the battery system 1000 of FIG. 1. Any of the battery systems 1000A, 1000B, 1000C, 1500 may be mounted in the electric automobile of FIG. 56 instead of the battery system 1000.

As shown in FIG. 56, the electric automobile 2000 according to the present embodiment includes the vehicle-side controller 300 and the battery system 1000 of FIG. 1, a power converter 901, a motor 902, drive wheels 903, an accelerator system 904, a brake system 905, and a rotational speed sensor 906. When the motor 902 is an alternating current (AC) motor, the power converter 901 includes an inverter circuit.

The battery system 1000 is connected to the motor 902 via the power converter 901 while being connected to the vehicle-side controller 300 in the present embodiment. The charged capacities of the plurality of battery modules 100 (FIG. 1) and the value of the current flowing through the battery modules 100 are applied from the battery ECU 200 (FIG. 1) constituting the battery system 1000 to the vehicle-side controller 300. Each of the accelerator system 904, the brake system 905 and the rotational speed sensor 906 is connected to the vehicle-side controller 300. The vehicle-side controller 300 is composed of a CPU and a memory or composed of a microcomputer, for example.

The accelerator system 904 includes an accelerator pedal 904a included in the electric automobile 2000 and an accelerator detector 904b that detects an operation amount (depression amount) of the accelerator pedal 904a. When the accelerator pedal 904a is operated by a driver, the accelerator detector 904b detects the operation amount of the accelerator pedal 904a. Note that a state of the accelerator pedal 904a when not being operated by the driver is set as a reference. The detected operation amount of the accelerator pedal 904a is applied to the vehicle-side controller 300.

The brake system 905 includes a brake pedal 905a provided in the electric automobile 2000 and a brake detector 905b that detects an operation amount (depression amount) of the brake pedal 905a by the driver. When the brake pedal 905a is operated by the driver, the operation amount is detected by the brake detector 905b. The detected operation amount of the brake pedal 905a is applied to the vehicle-side controller 300.

The rotational speed sensor 906 detects a rotational speed of the motor 902. The detected rotational speed is applied to the vehicle-side controller 300.

As described above, the charged capacity of the battery modules 100, the value of the current flowing through the battery modules 100, the operation amount of the accelerator pedal 904a, the operation amount of the brake pedal 905a and the rotational speed of the motor 902 are applied to the vehicle-side controller 300. The vehicle-side controller 300 performs charge/discharge control of the battery modules 100 and power conversion control by the power converter 901 based on the information.

Electric power generated by the battery modules 100 is supplied from the battery system 1000 to the power converter 901 at the time of start-up and acceleration of the electric automobile 2000 based on the accelerator operation, for example.

Furthermore, the vehicle-side controller 300 calculates a torque (commanded torque) to be transmitted to the drive wheels 903 based on the applied operation amount of the accelerator pedal 904a, and applies a control signal based on the commanded torque to the power converter 901.

The power converter 901 receives the control signal, and then converts the electric power supplied from the battery system 1000 into electric power (driving power) required for driving the drive wheels 903. Accordingly, the driving power converted by the power converter 901 is supplied to the motor 902, and the torque of the motor 902 based on the driving power is transmitted to the drive wheels 903.

Meanwhile, the motor 902 functions as a power generation system at the time of deceleration of the electric automobile 2000 based on the brake operation. In this case, the power converter 901 converts regenerated electric power generated by the motor 902 to electric power suitable for charging the battery modules 100 of the battery system 1000, and supplies the electric power to the battery system 1000. This causes the battery modules 100 to be charged.

As each of various elements recited in the claims, not only the elements described in the foregoing embodiments but also various other elements having configurations or functions described in the claims can be used.

INDUSTRIAL APPLICABILITY

The present invention can effectively be used for various mobile objects using electric power as driving sources, mobile devices or the like.

The invention claimed is:

1. A battery module comprising:
a battery block composed of a plurality of battery cells; and
a voltage detecting circuit for detecting a voltage between terminals of each of said battery cells, wherein
a flexible printed circuit board, in which a voltage detecting line for electrically connecting a positive electrode terminal or a negative electrode terminal of each of said battery cells and said voltage detecting circuit is integrated with a substrate made of a flexible material, is attached to said battery block,
said battery block includes said plurality of battery cells that are stacked, a first terminal row in which one of the positive electrode terminal and the negative electrode terminal of each of the battery cells is arranged in a direction in which said battery cells are stacked is constituted, and a second terminal row in which the other terminal of each of the battery cells is arranged in the direction in which said battery cells are stacked is constituted, and
said flexible printed circuit board is composed of a first flexible printed circuit board having a plurality of voltage detecting lines each connecting the terminal constituting said first terminal row and said voltage detecting circuit, and a second flexible printed circuit board having a plurality of voltage detecting lines each connecting the terminal constituting said second terminal row and said voltage detecting circuit, wherein
said first flexible printed circuit board is arranged along said first terminal row, and said second flexible printed circuit board is arranged along said second terminal row.

2. The battery module according to claim 1, wherein terminal of each of said plurality of battery cells is arranged on a first surface of said battery block, said voltage detecting circuit is arranged on a second surface that is different from said first surface of said battery block, and said flexible printed circuit board is arranged to extend from said first surface to said second surface of the battery block.

3. The battery module according to claim 1, comprising a frame that fixes said plurality of battery cells, and a circuit accommodating housing that accommodates said voltage detecting circuit, wherein said circuit accommodating housing is attached to said frame.

4. The battery module according to claim 1, wherein each of said first and second terminal rows includes the positive electrode terminal and the negative electrode terminal that are alternatively arranged, a wiring member formed by coupling a bus bar made of a metal part to each of said first and second flexible printed circuit boards in order to connect the positive electrode terminal or the negative electrode terminal of said battery cell and said voltage detecting circuit is provided, the positive electrode terminal and the negative electrode terminal that are adjacent to each other in said first and second terminal rows are connected to each other by said bus bar, and the voltage detecting lines of said first and second flexible printed circuit boards each connect said bus bar and said voltage detecting circuit.

5. The battery module according to claim 4, wherein said bus bar includes:
   a coupling portion that couples the adjacent positive electrode terminal and negative electrode terminal in said first and second terminal rows to each other; and
   a linking portion provided to overlap said first or second flexible printed circuit board, and connected to said voltage detecting line of said first or second flexible printed circuit board, and
   one or a plurality of cutouts are formed in said linking portion.

6. The battery module according to claim 4, wherein said bus bar includes:
   a coupling portion that couples the adjacent positive electrode terminal and negative electrode terminal in said first and second terminal rows to each other; and
   a linking portion provided to overlap said first or second flexible printed circuit board, and connected to said voltage detecting line of said first or second flexible printed circuit board, and
   one or a plurality of openings are formed in said linking portion.

7. A battery system comprising a plurality of battery modules, wherein
   each of said plurality of battery modules includes:
   a battery block composed of a plurality of battery cells;
   a voltage detecting circuit for detecting a voltage between terminals of each of said battery cells; and
   a flexible printed circuit board, and
   said flexible printed circuit board has a configuration in which a voltage detecting line for electrically connecting a positive electrode terminal or a negative electrode terminal of each of said battery cells and said voltage detecting circuit is integrated with a substrate made of a flexible material,
   said battery block includes said plurality of battery cells that are stacked, a first terminal row in which one of the positive electrode terminal and the negative electrode terminal of each of the battery cells is arranged in a direction in which said battery cells are stacked is constituted, and a second terminal row in which the other terminal of each of the battery cells is arranged in the direction in which said battery cells are stacked is constituted, and
   said flexible printed circuit board is composed of a first flexible printed circuit board having a plurality of voltage detecting lines each connecting the terminal constituting said first terminal row and said voltage detecting circuit, and a second flexible printed circuit board having a plurality of voltage detecting lines each connecting the terminal constituting said second terminal row and said voltage detecting circuit, wherein
   said first flexible printed circuit board is arranged along said first terminal row, and said second flexible printed circuit board is arranged along said second terminal row.

8. The battery system according to claim 7, wherein
said plurality of battery modules include a plurality of first battery modules that form a first module row along the direction in which said plurality of battery cells are stacked, and a plurality of second battery modules that form a second module row along the direction in which said plurality of battery cells are stacked, and said first and second module rows are arranged in parallel with each other,
   a positive electrode terminal having a highest potential and a negative electrode terminal having a lowest potential in each first battery module are positioned at one end and the other end, respectively, of a terminal row of said first and second terminal rows that is closer to said second module row, and
   a positive electrode terminal having a highest potential and a negative electrode terminal having a lowest potential in each second battery module are positioned at one end and the other end, respectively, of a terminal row of said first and second terminal rows that is closer to said first module row.

9. The battery system according to claim 7, further comprising:
   a controller that manages states of said battery modules; and
   a communication line for performing communication between at least one battery module and said controller, wherein
   said communication line is connected to the voltage detecting circuit of said at least one battery module.

10. The battery system according to claim 9, wherein
said plurality of battery modules include a plurality of first battery modules that form a first module row along the direction in which said plurality of battery cells are stacked, and a plurality of second battery modules that form a second module row along the direction in which said plurality of battery cells are stacked, and said first and second module rows are arranged in parallel with each other,
   said communication line includes a first communication line connected to said voltage detecting circuit of at least one first battery module, and a second communication line connected to said voltage detecting circuit of at least one second battery module,
   said first communication line is arranged along a terminal row of said first and second terminal rows, which is closer to said second module row, of the at least one first battery module, and
   said second communication line is arranged along a terminal row of said first and second terminal rows, which is closer to said first module row, of the at least one second battery module.

11. An electric vehicle comprising:
   a battery system including a plurality of battery modules;
   a motor driven by electric power supplied from said plurality of battery modules of said battery system; and
   drive wheels rotated by a torque of said motor, wherein
   each of said plurality of battery modules includes:
   a battery block composed of a plurality of battery cells;
   a voltage detecting circuit for detecting a voltage between terminals of each of said battery cells; and
   a flexible printed circuit board, and
   said flexible printed circuit board has a configuration in which a voltage detecting line for electrically connecting a positive electrode terminal or a negative electrode terminal of each of said battery cells and said voltage detecting circuit is integrated with a substrate made of a flexible material,
   said battery block includes said plurality of battery cells that are stacked, a first terminal row in which one of the positive electrode terminal and the negative electrode terminal of each of the battery cells is arranged in a direction in which said battery cells are stacked is constituted, and a second terminal row in which the other terminal of each of the battery cells is arranged in the direction in which said battery cells are stacked is constituted, and said flexible printed circuit board is composed of a first flexible printed circuit board having a plurality of voltage detecting lines each connecting the terminal constituting said first terminal row and said voltage detecting circuit, and a second flexible printed circuit board having a plurality of voltage detecting lines each connecting the terminal constituting said second terminal row and said voltage detecting circuit, wherein said first flexible printed circuit board is arranged along said first terminal row, and said second flexible printed circuit board is arranged along said second terminal row.

* * * * *